US012607879B2

(12) United States Patent
Ota et al.

(10) Patent No.: US 12,607,879 B2
(45) Date of Patent: Apr. 21, 2026

(54) PERFORMANCE EVALUATION METHOD FOR SPECTACLE LENS AND NON-TRANSITORY COMPUTER-READABLE STORAGE MEDIUM

(71) Applicant: TOKAI OPTICAL CO., LTD., Okazaki (JP)

(72) Inventors: Keisuke Ota, Okazaki (JP); Hitoshi Miura, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 758 days.

(21) Appl. No.: 17/814,892

(22) Filed: Jul. 26, 2022

(65) Prior Publication Data

US 2022/0365369 A1      Nov. 17, 2022

Related U.S. Application Data

(63) Continuation of application No. PCT/JP2021/002879, filed on Jan. 27, 2021.

(30) Foreign Application Priority Data

Feb. 3, 2020     (JP) ................................. 2020-016449

(51) Int. Cl.
G02C 7/06          (2006.01)

(52) U.S. Cl.
CPC ............. G02C 7/065 (2013.01); G02C 7/068 (2013.01)

(58) Field of Classification Search
CPC ........ G02C 7/065; G02C 7/068; G02C 7/028; G02C 7/066; G02C 7/06; G02C 13/00; G01M 11/0228
See application file for complete search history.

(56) References Cited

U.S. PATENT DOCUMENTS

| | | | |
|---|---|---|---|
| 5,510,860 A | * | 4/1996 | Ueno ...................... G02C 7/061 |
| | | | 351/159.42 |
| 6,652,097 B2 | | 11/2003 | Shirayanagi |

| | | | |
|---|---|---|---|
| 7,399,080 B2 | | 7/2008 | Kitani et al. |
| 9,772,511 B2 | | 9/2017 | Izaw et al. |
| 2007/0035696 A1 | | 2/2007 | Altheimer et al. |
| 2017/0363883 A1 | * | 12/2017 | Fricker .................. G02C 7/024 |

FOREIGN PATENT DOCUMENTS

| | | | |
|---|---|---|---|
| JP | S55-146412 A | 11/1980 |
| JP | 2000-047153 A | 2/2000 |
| JP | 2002-107679 A | 4/2002 |
| JP | 2003-121801 A | 4/2003 |
| JP | 2005-084595 A | 3/2005 |
| JP | 2012-141221 A | 7/2012 |
| WO | 2005/066696 A1 | 7/2005 |
| WO | 2015/041327 A1 | 3/2015 |

OTHER PUBLICATIONS

International Search Report and Written Opinion (Application No. PCT/JP2021/002879) dated Apr. 27, 2021 (with English translation).
Japanese Office Action (Application No. 2021-575748) dated Jun. 6, 2023 (with English translation) (8 pages).
Extended European Search Report dated Jul. 20, 2023 (Application No. 21750431.5).
The Essilor of America, Inc., "*Effect of Progressive Lens Shape on Space Perception*," (Dec. 31, 2012) (2 pages).
Korean Office Action (with English translation) dated Aug. 26, 2025 (Application No. 10-2022-7026722).

* cited by examiner

*Primary Examiner* — Bumsuk Won
*Assistant Examiner* — Ray Alexander Dean
(74) *Attorney, Agent, or Firm* — BURR PATENT LAW, PLLC

(57)          ABSTRACT

A performance evaluation method for a spectacle lens comprising calculating a change rate of a first component and a change rate of a second component with a computer to calculate at least one of a distortion evaluation value and a shaking evaluation value, the first component being a component in a first direction of a prism refractive index, the second component being a component in a second direction of the prism refractive index, the distortion evaluation value being a value for evaluating a distortion regarding a spectacle lens, the shaking evaluation value being a value for evaluating a shaking regarding the spectacle lens.

6 Claims, 69 Drawing Sheets

50  mm 50 mm 50 mm 50 mm 50 mm 50 mm 50 mm 50 mm 50 mm 50 mm 50 mm 50 mm

PERFORMANCE EVALUATION METHOD FOR SPECTACLE LENS AND NON-TRANSITORY COMPUTER-READABLE STORAGE MEDIUM

CROSS REFERENCE TO RELATED APPLICATION

This application is a Continuation of International Application No. PCT/JP2021/002879, filed on Jan. 27, 2021, which claims the benefit of Japanese Patent Application Number 2020-016449 filed on Feb. 3, 2020, the disclosures of which are incorporated by reference herein in their entireties.

FIELD OF THE INVENTION

The present invention relates to a method and a non-transitory computer-readable storage medium storing a program for evaluating a performance relating to at least one of a distortion and a shaking for a spectacle lens including a progressive-power lens.

BACKGROUND OF THE INVENTION

As a performance evaluation method for a lens, one disclosed in JP 2002-107679 A has been known.

In this method, an aberration of a single-vision lens is calculated, and an aberration of an evaluation target lens, such as a progressive multifocal lens, is calculated, thus expressing visual field images (see FIG. 11 to FIG. 14) of the evaluation target lens based on an aberration difference between both lenses.

As an experience device for a visual field of glasses configured to display a visual field image of a view when wearing a progressive multifocal lens, one disclosed in JP 2000-47153 A has been known.

In this device, performing a process of applying a distortion aberration of the progressive multifocal lens to image data that changes in association with a change of a visual field direction forms the visual field image of the view when wearing the progressive multifocal lens.

In the performance evaluation method of JP 2002-107679 A, the visual field image of the progressive multifocal lens or the like can be obtained.

By the visual field experience device of JP 2000-47153 A, the visual field corresponding to the distortion aberration of the progressive multifocal lens can be experienced.

However, the method or the device cannot numerically express or numerically compare a performance relating to at least one of the distortion and the shaking of the progressive multifocal lens or the like.

Therefore, it is a main object of the present invention to provide a performance evaluation method for a spectacle lens and a non-transitory computer-readable storage medium storing a program that can appropriately evaluate a quantitative performance relating to at least one of a distortion and a shaking for a spectacle lens including a progressive-power lens.

SUMMARY OF THE INVENTION

To achieve the above-described object, the invention according to a first aspect is a performance evaluation method for a spectacle lens including calculating a change rate of a first component and a change rate of a second component with a computer to calculate at least one of a distortion evaluation value and a shaking evaluation value, the first component is a component in a first direction of a prism refractive index, the second component is a component in a second direction of the prism refractive index, the distortion evaluation value is a value for evaluating a distortion regarding a spectacle lens, and the shaking evaluation value is a value for evaluating a shaking regarding the spectacle lens.

In the invention according to a second aspect, which is in the above-described invention, the distortion evaluation value at any point (x, y) of the spectacle lens is calculated by calculating a formula (1) below with the computer. In the formula (1), an X-axis is taken in a horizontal direction (nose-ear direction), and a Y-axis is taken in an up-down direction when the spectacle lens is stood similarly to a case of wearing. $P_h$ is a horizontal prismatic power as the prismatic power in the X-axis direction, and $P_v$ is a vertical prismatic power as the prismatic power in the Y-axis direction. These conditions are similarly applied to formulas (2), (14), and (15) below.

In the invention according to a third aspect, which is in the above-described invention, the shaking evaluation value at any point (x, y) of the spectacle lens is calculated by calculating a formula (2) below with the computer.

In the invention according to a fourth aspect, which is in the above-described invention, the distortion evaluation value is calculated by calculating a first derivation of the prismatic power with the computer.

In the invention according to a fifth aspect, which is in the above-described invention, the shaking evaluation value is calculated by calculating a second derivation of the prismatic power with the computer.

In the invention according to a sixth aspect, which is in the above-described invention, the distortion evaluation value at any point (x, y) of the spectacle lens is calculated by calculating a formula (14) below with the computer.

In the invention according to a seventh aspect, which is in the above-described invention, the shaking evaluation value at any point (x, y) of the spectacle lens is calculated by calculating a formula (15) below with the computer.

To achieve the above-described object, the invention according to an eighth aspect is a non-transitory computer-readable storage medium storing a performance evaluation program for a spectacle lens that causes a computer to form control means by execution. The control means calculates a change rate of a first component and a change rate of a second component to evaluate at least one of a distortion and a shaking regarding a spectacle lens. The first component is a component in a first direction of a prism refractive index. The second component is a component in a second direction of the prism refractive index.

In the invention according to a ninth aspect, which is in the above-described invention, the control means is configured to refer to a stored formula (1) below, and calculates the formula (1) to evaluate a distortion at any point (x, y) of the spectacle lens.

In the invention according to a tenth aspect, which is in the above-described invention, the control means is configured to refer to a stored formula (2) below, and calculates the formula (2) to evaluate a shaking at any point (x, y) of the spectacle lens.

In the invention according to an eleventh aspect, which is in the above-described invention, the control means calculates a first derivation of the prismatic power to evaluate the distortion.

In the invention according to a twelfth aspect, which is in the above-described invention, the control means calculates a second derivation of the prismatic power to evaluate the shaking.

In the invention according to a thirteenth aspect, which is in the above-described invention, the control means is configured to refer to a stored formula (14) below, and calculates the formula (14) to evaluate the distortion at any point (x, y) of the spectacle lens.

In the invention according to a fourteenth aspect, which is in the above-described invention, the control means is configured to refer to a stored formula (15) below, and calculates the formula (15) to evaluate the shaking at any point (x, y) of the spectacle lens.

It is a main effect of the present invention to provide the performance evaluation method for a spectacle lens and the non-transitory computer-readable storage medium storing the program that can appropriately evaluate the quantitative performance relating to at least one of the distortion and the shaking for a spectacle lens including a progressive-power lens.

BRIEF DESCRIPTION OF THE DRAWINGS

FIG. 10 is surrounded in a rim shape of an example of lens shape processing.

FIG. 11 is surrounded in a rim shape of an example of lens shape processing.

FIG. 47 is surrounded in a rim shape of an example of lens shape processing.

FIG. 48 is surrounded in a rim shape of an example of lens shape processing.

DETAILED DESCRIPTION OF THE INVENTION

The following describes examples of embodiments according to the present invention based on the drawings as necessary. The embodiments of the present invention are not limited to the examples.

First Embodiment is described below.

Figure 1A:
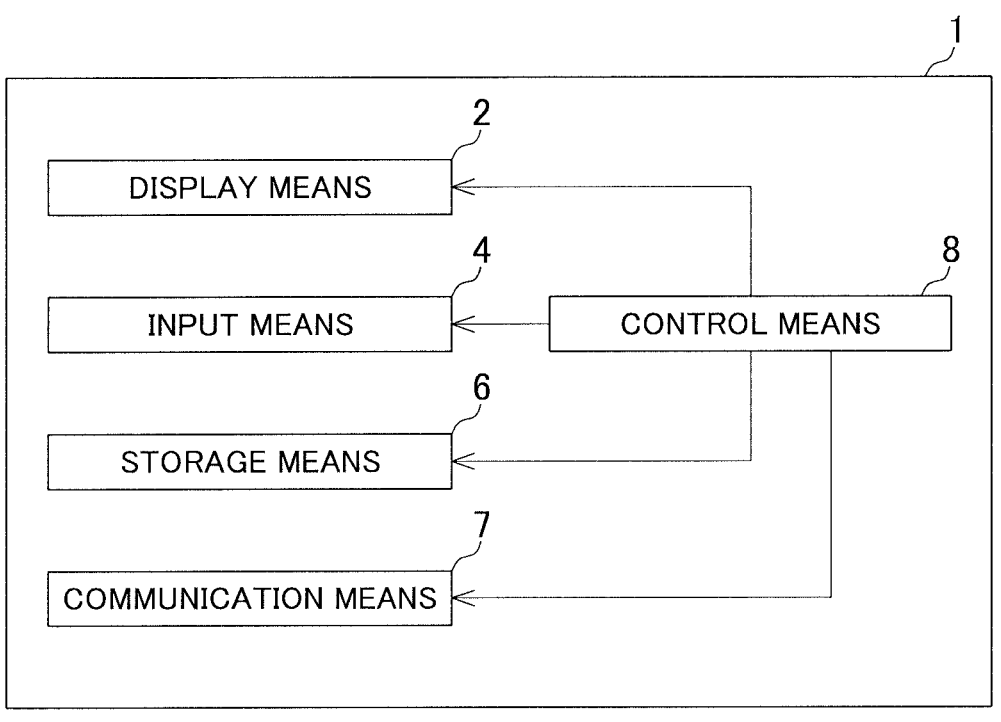
FIG. 1A is a block diagram of a performance evaluation device for a spectacle lens according to a first embodiment of the present invention.

A performance evaluation device 1 for a spectacle lens according to the first embodiment of the present invention includes a computer, and as illustrated in FIG. 1A, includes display means 2, input means 4, storage means 6, communication means 7, and control means 8.

The performance evaluation device 1 is installed in, for example, a spectacle lens manufacturer.

The display means 2 displays various kinds of information, and is, for example, a liquid crystal display or an organic electroluminescence display.

The input means 4 accepts inputs of the various kinds of information, and is, for example, at least one of a keyboard and a pointing device.

The display means 2 and the input means 4 may be integrated like a touch panel.

The storage means 6 stores the various kinds of information, and is, for example, at least any of a hard disk, a memory, and a disk drive.

The communication means 7 communicates the various kinds of information with external equipment, and here, communicates with equipment connected to a local area network (LAN).

The control means 8 controls the means, and is, for example, a central processing unit (CPU). The control means 8 sequentially reads a performance evaluation program stored in the storage means 6, and performs a process regarding a quantitative evaluation of a performance in accordance with the program.

The storage means 6 stores formulas (1) and (2) below for the quantitative evaluation of the performance of a spectacle lens GL as a part of the performance evaluation program (in a state where the performance evaluation program is referenceable).

That is, a calculation of the performance of spectacle lens GL is performed by the formulas (1) and (2) below.

In the formulas (1) and (2) below, with an optical center as an origin, an X-axis is taken in a horizontal direction (nose-ear direction), a Y-axis is taken in an up-down direction, and a Z-axis is taken in an optical axis direction when the spectacle lens GL is stood similarly to a case of wearing. $P_h$ is a horizontal prismatic power as a prismatic power in the X-axis direction, and $P_v$ is a vertical prismatic power as a prismatic power in the Y-axis direction. Units of $P_h$ and $P_v$ are each $\Delta$ (prism diopter). $P_h$ and $P_v$ are each determined for each point on the spectacle lens GL (typically, point on a front surface GLF of the spectacle lens GL). Accordingly, a prism vector P ($P_h$, $P_v$) as a vector including $P_h$ and $P_v$ is determined for each point on the spectacle lens GL. The way of having the coordinate can be appropriately changed, for example, having the origin other than the optical center.

$$E_d = \frac{\partial P_h}{\partial x} + \frac{\partial P_v}{\partial y} \tag{1}$$

$$E_s = \frac{\partial P_v}{\partial x} - \frac{\partial P_h}{\partial y} \tag{2}$$

The performance of the spectacle lens GL here is at least one of a shaking and a distortion.

Currently, while the shaking and the distortion are collectively considered as a change in shape and size of an image when a line of sight moves in some cases, they are distinguished as follows here.

That is, the shaking is a phenomenon that an image looks to be protruded or depressed when a line of sight relatively moves with respect to the spectacle lens GL while the line of sight is fixed to an object, and is viewable by wearing the spectacle lens GL and shaking the head while the line of sight is fixed.

Meanwhile, the distortion is a phenomenon that an image looks to be deformed when the line of sight moves with respect to the object and moves also with respect to the spectacle lens GL, and is viewable by wearing the spectacle lens GL and moving the line of sight while the head is fixed.

The formula (1) relates to a distortion evaluation value $E_d$ as a value for evaluating the distortion.

The formula (2) relates to a shaking evaluation value $E_s$ as a value for evaluating the shaking.

The right side of the formula (1) is a part (front two terms) of $$\mathrm{div}P' = \nabla \cdot P' = \partial P_h/\partial x + \partial P_v/\partial y + \partial P_z/\partial z \tag{3}$$

as an inner product of P' ($P_h$, $P_v$, $P_z$) obtained by provisionally three-dimensionally extending a prism vector P ($P_h$, $P_v$) and a vector differential operator $\nabla$ ($\partial/\partial x$, $\partial/\partial y$, $\partial/\partial z$).

The right side of the formula (2) is a part (third component) of $$\mathrm{rot}P' = \nabla \times P' = (\partial P_z/\partial y - \partial P_v/\partial z,\ \partial P_h/\partial z - \partial P_z/\partial x,\ \partial P_v/\partial x - \partial P_h/\partial y) \tag{4}$$

as a cross product of P' and $\nabla$.

Further, the storage means 6 stores a known lens design program so as to be executable.

By the lens design program, the spectacle lens GL having a shape that satisfies a predetermined optical performance (for example, at least any of an average power distribution, an astigmatism distribution, and a prismatic power distribution) can be designed.

The lens design program allows a ray tracing to simulate a state of a ray trace or the like by virtually irradiating a model of the spectacle lens GL having a predetermined shape with a ray. The ray tracing function may be included in not the lens design program but the performance evaluation program, or may be included in an independent ray tracing program.

Here, the type of ray includes a parallel light, a back surface vertical light, and a transmitted light. The type of ray may be a part of them, or may be another type (include another type).

The parallel light is a ray that enters the front surface GLF (front side surface, surface in object side) of the spectacle lens GL so as to be parallel to an optical axis (Z-axis).

The back surface vertical light is a ray perpendicular to a back surface GLB (backside surface, surface in face side) of the spectacle lens GL. The calculation of dioptric power at each position on the front surface GLF of the spectacle lens GL by the back surface vertical light is similar to the calculation of dioptric power by a lens-meter.

The transmitted light is a ray passing through a center point of eye rotation. Generally, the dioptric power at each position on the lens surface by the transmitted light is calculated by a simulation, and is not measured by a measurement device.

The prism vector P ($P_h$, $P_v$) may be calculated by any method, and the performance evaluation device 1 calculates the vertical prismatic power $P_v$ as follows. The horizontal prismatic power $P_h$ is calculated similar to the vertical prismatic power $P_v$ excluding that the axial direction is the X-axis direction instead of the Y-axis direction.

Figure 2:
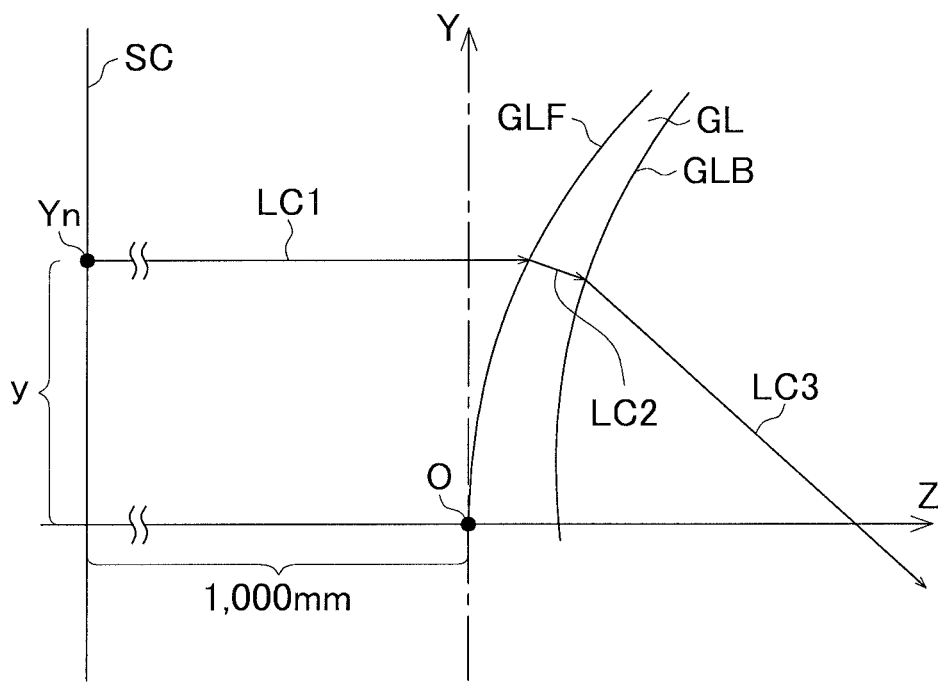
FIG. 2 is a schematic diagram of a spectacle lens, a screen, and a trajectory of a light relating to a calculation of a vertical prismatic power in the performance evaluation device for a spectacle lens that executes a performance evaluation program according to the first embodiment of the present invention.

As illustrated in FIG. 2, in the calculation of the vertical prismatic power $P_v$, a screen SC is assumed forward from an origin O by 1000 mm (millimeters) having a vertex of the front surface GLF (front side surface) of the spectacle lens GL as the origin O in a YZ plane. The screen SC is parallel to an XY plane.

Then, a locus of a light starting from a point $Y_n$ having a Y-axis coordinate y on the screen SC, entering the front surface GLF of the spectacle lens GL so as to be parallel to the optical axis (Z-axis) (incident locus LC1), passing through the inside of the spectacle lens GL to the back surface GLB (backside surface) (inside locus LC2), and reaching the optical axis (output locus LC3) is assumed.

Then, the vertical prismatic power $P_v$ is expressed by formulas (5) to (7) below. Here, MaeWy is a tangent regarding the Y-axis with respect to the optical axis in the incident locus LC1 as indicated by a formula (8), MaeWx is a tangent regarding the X-axis with respect to the optical axis in the incident locus LC1, AtoWy is a tangent regarding the Y-axis with respect to the optical axis in the output locus LC3, and AtoWx is a tangent regarding the X-axis with respect to the optical axis in the output locus LC3. CalcOmSag (x, y) is an amount of sag calculated at a point (x, y) on the front surface GLF of the spectacle lens GL, CalcUrSag (x, y) is an amount of sag calculated at a point (x, y) on the back surface GLB of the spectacle lens GL, and m_CT is a thickness at the center of the spectacle lens GL (size on Z-axis of spectacle lens GL).

$$P_v = (Ato\_y - Mae\_y) * 0.1 \quad (5)$$

$$Ato\_y = y + \{1000 + m\_CT + CalcUrSag(x,y)\} * AtoWy \quad (6)$$

$$Mae\_y = y + \{1000 + CalcOmSag(x,y)\} * MaeWy \quad (7)$$

Initial values of MaeWy, MaeWx depend on the type of the ray set in the calculation of the vertical prismatic power $P_v$.

That is, in the calculation of the vertical prismatic power $P_v$ by the parallel light, formulas (8), (9) below are satisfied. In the calculation of the vertical prismatic power $P_v$ by the back surface vertical light, formulas (10), (11) below are satisfied. Further, in the calculation of the vertical prismatic power $P_v$ by the transmitted light, formulas (12), (13) below are satisfied.

$$MaeWy = 0 \quad (8)$$

$$MaeWx = 0 \quad (9)$$

MaeWy=tangent regarding Y-axis with respect to optical axis in incident locus LC1 when inside locus LC2 matches output locus LC3 (10)

MaeWx=tangent regarding X-axis with respect to optical axis in incident locus LC1 when inside locus LC2 matches output locus LC3 (11)

MaeWy=tangent regarding Y-axis with respect to optical axis in incident locus LC1 when output locus LC3 passes through center point of *eye* rotation (12)

MaeWx=tangent regarding X-axis with respect to optical axis in incident locus LC1 when output locus LC3 passes through center point of *eye* rotation (13)

The control means 8 is configured to design the spectacle lens GL having a shape in which at least one of the shaking evaluation value $E_s$ and the distortion evaluation value $E_d$ becomes in a predetermined range with the combination of the performance evaluation program and the lens design program.

For example, the control means 8 is configured to design the spectacle lens GL having a shape in which the shaking evaluation value $E_s$ becomes equal to or less than a first predetermined value, and the distortion evaluation value $E_d$ becomes equal to or less than a second predetermined value.

Figure 1B:
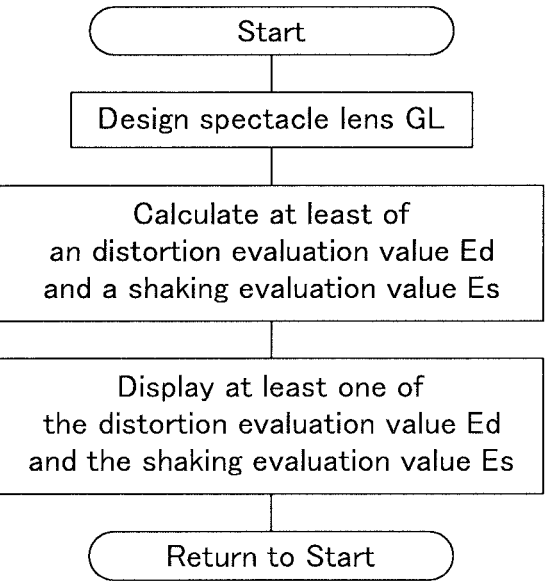
FIG. 1B is a flowchart of a performance evaluation method for a spectacle lens and a designing method for the spectacle lens according to the first embodiment of the present invention.

As illustrated in FIG. 1B, the control means 8 may calculate at least one of the shaking evaluation value $E_s$ and the distortion evaluation value $E_d$ (Step S2) regarding the spectacle lens GL under designing (Step S2) corresponding to the predetermined input from the input means 4, and then, may command its output (Step S3). Alternatively, the control means 8 may command the output of at least one of the shaking evaluation value $E_s$ and the distortion evaluation value $E_d$ to appropriately evaluate the performance of the spectacle lens GL whose design has been completed corresponding to the predetermined input from the input means 4. Alternatively, the control means 8 may command the output of a representative design example or options of a plurality of design examples having shapes in which at least one of the shaking evaluation value $E_s$ and the distortion evaluation value $E_d$ becomes in the predetermined range corresponding to the predetermined input from the input means 4 in designing the spectacle lens GL. In this case, the control means 8 may accept the input of the selection of the option, or may accept the input of the representative design example, the selected design example, or a change of design for another design example.

The performance evaluation program and the lens design program may be configured as one program, for example, by integrating the latter into the former. The shaking evaluation value $E_s$, the distortion evaluation value $E_d$, and the like may be calculated or displayed prior to the predetermined input or constantly during the designing or the like.

By executing the performance evaluation program, the control means 8 below is formed in the performance evaluation device 1 as a computer. That is, the control means 8 configured to refer to at least one of the stored formula (1) and formula (2) and calculate the formula to evaluate at least one of the distortion and the shaking at any point (x, y) of the spectacle lens GL is formed.

Then, by executing the performance evaluation program and the lens design program, the control means 8 below is formed in the performance evaluation device 1 as a computer. That is, the control means 8 configured to refer to at least one of the stored formula (1) and formula (2), calculate the formula to evaluate at least one of the distortion and the shaking at any point (x, y) of the spectacle lens GL, and design the spectacle lens GL based on the evaluation is formed.

Both of the formula (1) and the formula (2) include a change rate of the horizontal prismatic power $P_h$ as a component (first component) in the X-axis direction as a first direction of the prismatic power and a change rate of the vertical prismatic power $P_v$ as a component (second component) in the Y-axis direction as a second direction of prismatic power. Accordingly, the control means 8 calculates the change rate of the first component and the change rate of the second component of the prismatic power, thereby evaluating the distortion and the shaking of the spectacle lens GL.

Second Embodiment is described below.

A performance evaluation device for a spectacle lens according to the second embodiment of the present invention is configured similarly to the performance evaluation device 1 of the first embodiment excluding the formulas regarding the distortion and the shaking in the storage means 6 and the control means 8.

The reference numerals the same as those in the first embodiment are attached to the similarly configured parts, and the description will be omitted as necessary.

In the second embodiment, the distortion evaluation value $E_d$ is a first derivation of the prismatic power.

The shaking evaluation value $E_s$ is a second derivation of the prismatic power. Formulas for differential operations regarding the distortion evaluation value $E_d$ and the shaking evaluation value $E_s$ are both stored in the storage means 6, and referred to and calculated by the control means 8.

The first derivation of the prismatic power indicates a change amount of the prismatic power.

The second derivation of the prismatic power indicates a change amount of the change amount of the prismatic power.

As the prismatic power, a scalar quantity of the prismatic power may be used, the horizontal prismatic power $P_h$ may be used, and the vertical prismatic power $P_v$ may be used.

Third Embodiment is described below.

A performance evaluation device for a spectacle lens according to the third embodiment of the present invention is configured similarly to the performance evaluation device 1 of the first embodiment excluding the formulas regarding the distortion and the shaking in the storage means 6 and the control means 8.

The reference numerals the same as those in the first embodiment are attached to the similarly configured parts, and the description will be omitted as necessary.

In the third embodiment, the distortion evaluation value $E_d$ is expressed by a formula (14) below.

The shaking evaluation value $E_s$ is expressed by a formula (15) below.

The way of taking the axes and various kinds of signs in the formulas (14) and (15) are similar to those in the formulas (1) and (2) of the first embodiment.

$$E_d = \frac{\partial P_h}{\partial x} - \frac{\partial P_v}{\partial y} \tag{14}$$

$$E_s = \frac{\partial P_v}{\partial x} + \frac{\partial P_h}{\partial y} \tag{15}$$

The formulas (14) and (15) regarding the distortion evaluation value $E_d$ and the shaking evaluation value $E_s$ of the third embodiment are both stored in the storage means 6, and referred to and calculated by the control means 8.

In the formula (14), $\partial P_h/\partial x$, $\partial P_v/\partial y$ regarding the change amount of the prismatic power are used.

In the formula (15), $\partial P_v/\partial x$, $\partial P_h/\partial_y$ regarding the change amount of the prismatic power are used.

The formulas (14) and (15) can be considered to be derived from an astigmatism component in a Zernike polynomial. That is, for a sag S, $$P_h = \partial S/\partial x \tag{16}$$

$$P_v = \partial S/\partial y \tag{17}$$

are satisfied, and from the Zernike polynomial and the formulas (16) and (17), an astigmatism $J_{45}$ in a diagonal direction and an astigmatism $J_{00}$ in a vertical/longitudinal direction satisfy formulas below.

$$J_{45} = \partial^2 S/\partial xy = \partial P_h/\partial y + \partial P_v/\partial x \tag{18}$$

$$J_{00} = \partial^2 S/\partial x^2 - \partial^2 S/\partial y^2 = \partial P_h/\partial x - \partial P_v/\partial y \tag{19}$$

The rightmost side of the formula (19) is the same as the right side of the formula (14), and the rightmost side of the formula (18) is the same as the right side of the formula (15).

The second embodiment and the third embodiment have modification examples similar to that of the first embodiment as necessary.

At least any two of the first embodiment to the third embodiment may be combined. In this case, the distortion evaluation value $E_d$ and the shaking evaluation value $E_s$ may be selectable by the input through the input means 4.

Further, at least one of the first direction and the second direction regarding the prism refractive index may be a direction other than the horizontal direction (X-axis direction) or the vertical direction (Y-axis direction).

Fourth Embodiment is described below.

A performance evaluation device for a spectacle lens according to the fourth embodiment of the present invention is configured similarly to the performance evaluation device 1 of the first embodiment excluding the formulas regarding the distortion and the shaking in the storage means 6 and the control means 8.

The reference numerals the same as those in the first embodiment are attached to the similarly configured parts, and the description will be omitted as necessary.

In the fourth embodiment, the formulas regarding the distortion and the shaking are similar to those of the first embodiment excluding that a formula (5A) below is substituted for the formula (5).

In the formula (5A), the positive and the negative (signs) of the formula (5) are reversed. As described in the first embodiment, the way of taking the coordinate in the first embodiment can be appropriately changed, and in the fourth embodiment, the positive and the negative of the first embodiment are reversed for the vertical prismatic power $P_v$. With the signs like the fourth embodiment, the vertical prismatic power $P_v$ matches general signs of a prism. Needless to say, even with the way of taking the signs of the vertical prismatic power $P_v$ in the first embodiment, the performance relating to at least one of the distortion and the shaking can be evaluated.

$$P_v = (\text{Ato\_y} - \text{Mae\_y})^* - 0.1 \tag{5A}$$

That is, in the fourth embodiment, the distortion and the shaking are evaluated similarly to the first embodiment by the formulas (1) and (2), (5A), and (6) to (13).

Fifth Embodiment is described below.

A performance evaluation device for a spectacle lens according to the fifth embodiment of the present invention is configured similarly to the performance evaluation device 1 of the third embodiment excluding the formulas regarding the distortion and the shaking in the storage means 6 and the control means 8.

The reference numerals the same as those in the third embodiment are attached to the similarly configured parts, and the description will be omitted as necessary.

In the fifth embodiment, the formulas regarding the distortion and the shaking are similar to those of the third embodiment excluding that a formula (5A) below is substituted for the formula (5).

That is, in the fifth embodiment, the distortion and the shaking are evaluated similarly to the third embodiment by the formulas (14) and (15), (5A), and (6) to (13).

The following describes a plurality of examples according to the present invention based on the drawings as necessary. The embodiments of the present invention are not limited to the examples.

Examples 1 to 5 are a single-vision lens or a progressive-power lens evaluated and designed by the performance evaluation device 1 of the first embodiment.

Examples 6 and 7 are a single-vision lens or a progressive-power lens evaluated and designed by the performance evaluation device of the second embodiment.

Example 8 is a single-vision lens evaluated and designed by the performance evaluation device of the third embodiment.

Examples 11 to 15 are a single-vision lens or a progressive-power lens evaluated and designed by the performance evaluation device of the fourth embodiment.

Example 18 is a single-vision lens evaluated and designed by the performance evaluation device of the fifth embodiment.

Examples 9 and 10, 16 and 17 are unused numbers.

Example 1 is described below.

The spectacle lens GL of Example 1 relates to a single-vision lens. The spectacle lens GL of Example 1 has a refractive index of 1.60, an S power of −5.00, and a curve value of the front surface GLF of 7.50.

Figure 3:
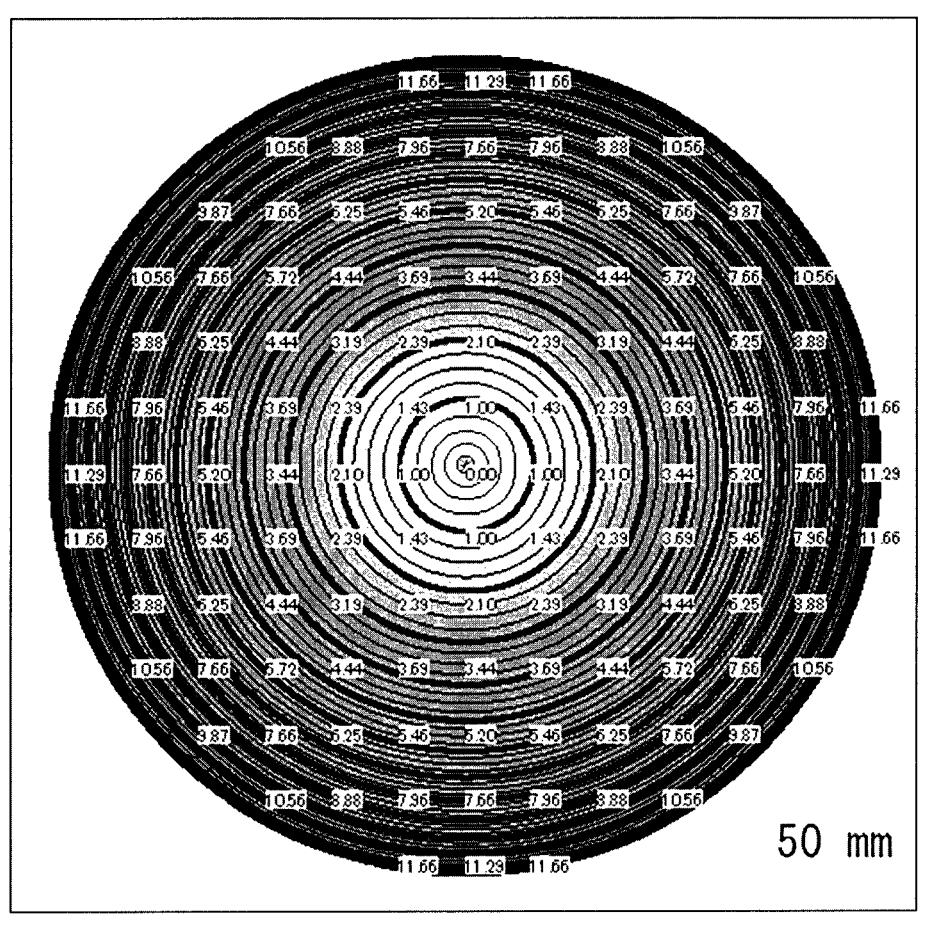
FIG. 3 is a schematic diagram illustrating scalar quantities of a prismatic power by a transmitted light at respective points on a front surface of a spectacle lens according to Example 1 of the present invention by numerical values at corresponding points.

FIG. 3 illustrates scalar quantities of a prismatic power by a transmitted light at respective points on the front surface GLF of the spectacle lens GL by numerical values at corresponding points. The respective points are intersection points of a virtual grid when the grid is overlapped on a front vision of the spectacle lens GL, and the origin O is included. The scalar quantities of the prismatic power are obtained by a synthetic formula (20) of the horizontal prismatic power $P_h$ and the vertical prismatic power $P_v$ indicated below.

$$\text{scalar quantity of prismatic power}=\sqrt{P_h{}^2+P_v{}^2} \qquad (20)$$

The vertical prismatic power $P_v$ is calculated by a calculation using the formulas (5) to (7), (12), and (13). The value of the vertical prismatic power $P_v$ increases corresponding to a distance from the origin O. The horizontal prismatic power $P_h$ is calculated similarly to the vertical prismatic power $P_v$ excluding that the axial direction is the X-axis direction instead of the Y-axis direction. FIG. 3 is a view from the front surface GLF, the up and the down correspond to those during wearing, the left is an ear side, the right is a nose side, and the same applies to the following. Further, in FIG. 3, a contour line connecting points at which the scalar quantities of the prismatic power have the same value is illustrated for each predetermined value, and the same applies to the following.

Figure 4:
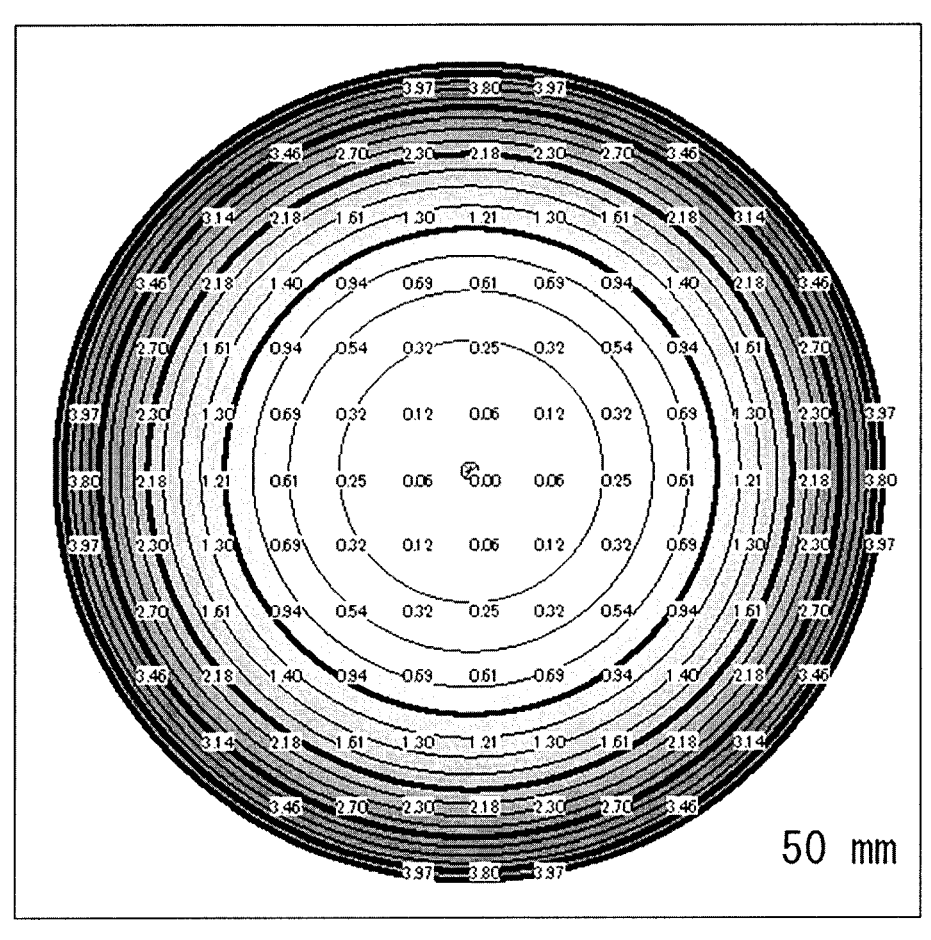
FIG. 4 is a schematic diagram illustrating distortion evaluation values at respective points on the front surface of the spectacle lens according to Example 1 of the present invention based on a vertical prismatic power by the transmitted light or the like by numerical values at corresponding points.

FIG. 4 illustrates the distortion evaluation values $E_d$ at respective points calculated by applying the formula (1) to the prism vector P ($P_h$, $P_v$) at respective points and indicated by numerical values at corresponding points. The distortion evaluation value $E_d$ increases corresponding to the distance from the origin O. This is consistent with that a wearer of the single-vision lens feels the distortion more strongly toward a periphery of the visual field.

Figure 5:
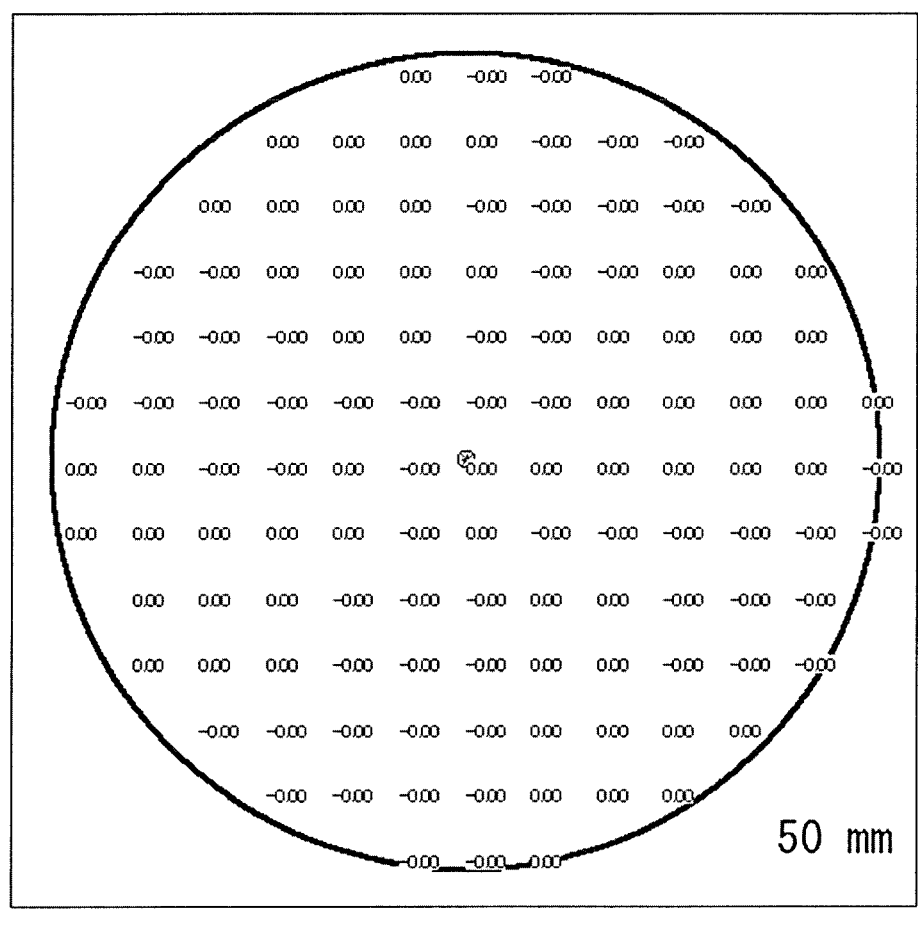
FIG. 5 is a schematic diagram illustrating shaking evaluation values at respective points on the front surface of the spectacle lens according to Example 1 of the present invention based on a vertical prismatic power by the transmitted light or the like by numerical values at corresponding points.

FIG. 5 illustrates the shaking evaluation values $E_s$ at respective points calculated by applying the formula (2) to the prism vector P ($P_h$, $P_v$) at respective points and indicated by numerical values at corresponding points. The shaking evaluation value $E_s$ becomes 0 at all of the points. This is consistent with that the wearer of the single-vision lens less likely to feel the shaking compared with the progressive-power lens.

Example 2 is described below.

The spectacle lens GL of Example 2 relates to a progressive-power lens, and in more detail, relates to one in the early stage of design (Example 2-1) and one of the final design provided by changing the design based on the evaluation of the distortion and the shaking for the one in the early stage (Example 2-2). The spectacle lens GL of Example 2 has a refractive index of 1.60, an S power of 0.00, an addition power of 2.00, a progressive band length of 13 mm, and a curve value (front curve) of the front surface GLF of 4.40 (real curve).

Figure 6:
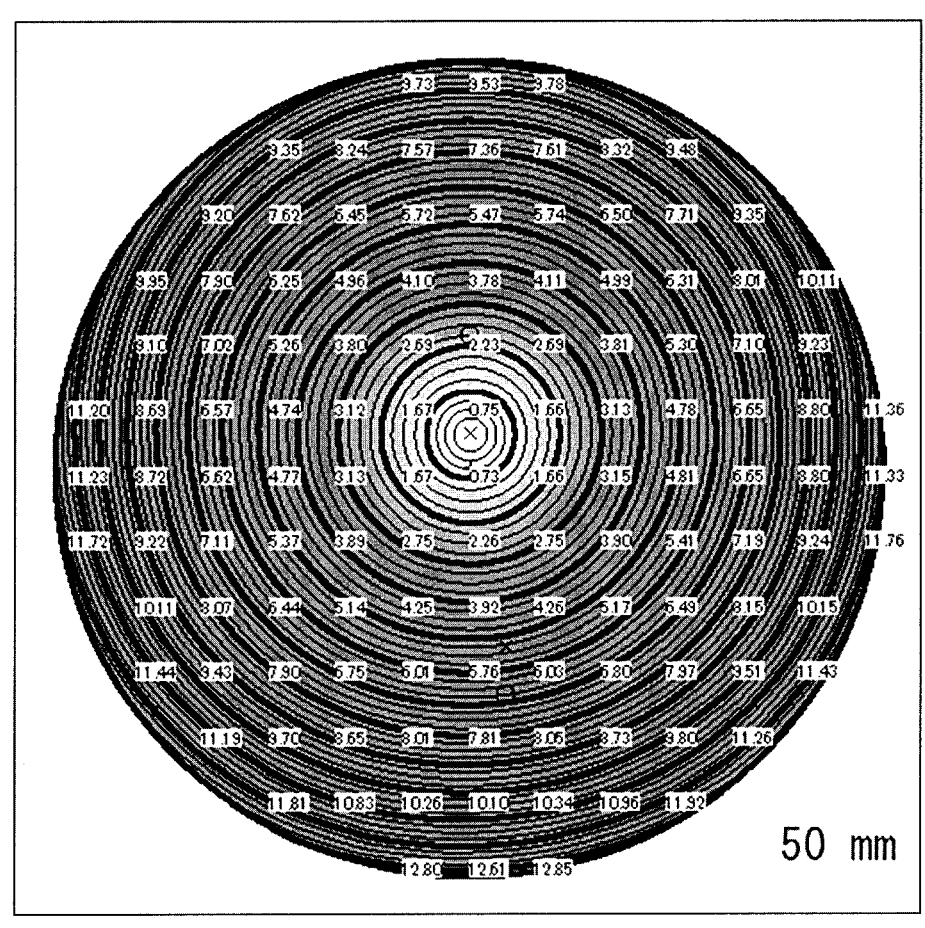
FIG. 6 is a drawing similar to FIG. 3 illustrating a spectacle lens according to Example 2-1 of the present invention.

FIG. 6 is a drawing illustrating the scalar quantity of prismatic power similar to FIG. 3 in the spectacle lens GL of Example 2-1.

Figure 7:
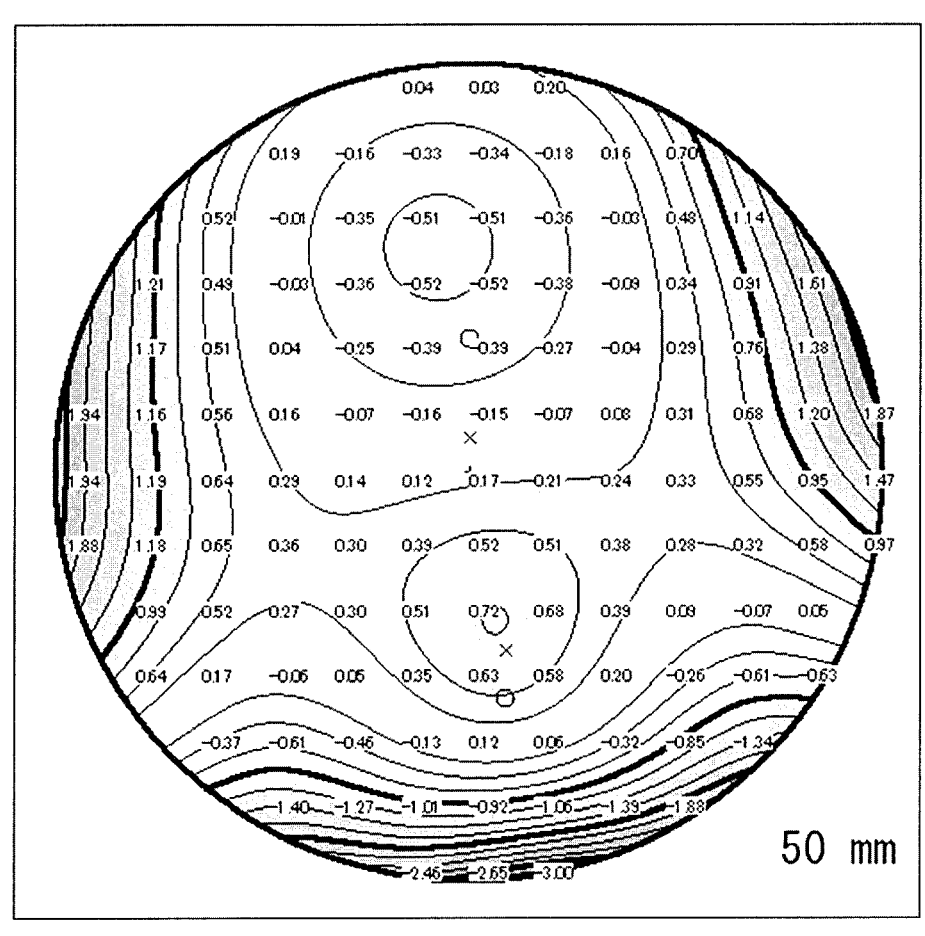
FIG. 7 is a drawing similar to FIG. 4 illustrating the spectacle lens according to Example 2-1 of the present invention.
Figure 8:
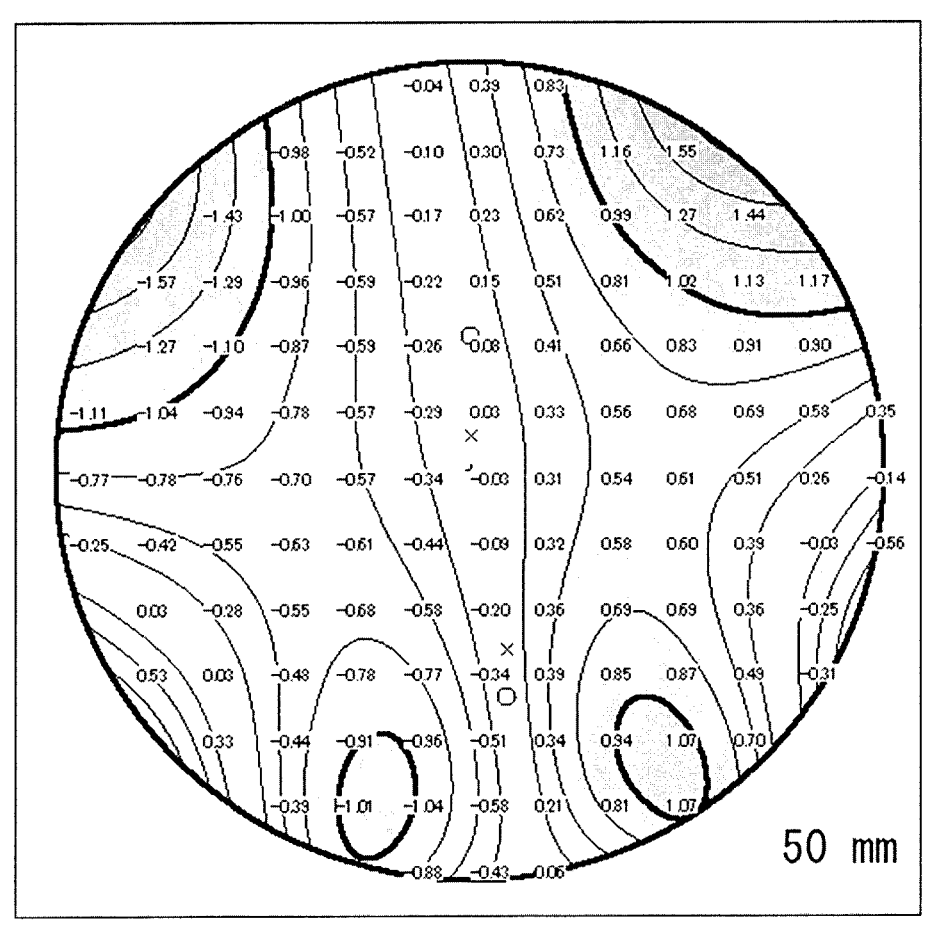
FIG. 8 is a drawing similar to FIG. 5 illustrating the spectacle lens according to Example 2-1 of the present invention.

FIG. 7 is a drawing illustrating the distortion evaluation value $E_d$ similar to FIG. 4 in the spectacle lens GL of Example 2-1. FIG. 8 is a drawing illustrating the shaking evaluation value $E_s$ similar to FIG. 5 in the spectacle lens GL of Example 2-1.

The distortion evaluation value $E_d$ of Example 2-1 is large in the center of the upper half for distance of the spectacle lens GL. The shaking evaluation value $E_s$ of Example 2-1 is large especially in the lower half for near of the spectacle lens GL, and there is a room for improvement.

Therefore, the designer performed an optimization calculation in which the distortion evaluation value $E_d$ and the shaking evaluation value $E_s$ in the current design were incorporated as a part of the evaluation function by the lens design program, thereby obtaining a shape of the spectacle lens GL of Example 2-2 as a final design. For the optimization calculation of the progressive lens, a known damped least-square method was used here. In the optimization calculation, the evaluation is performed each time of slightly changing the shape of the spectacle lens GL, and the shape of the spectacle lens GL is repeatedly changed until the value of the evaluation function becomes minimum. When the value of the evaluation function converges to a value desired by the designer, the shape of the spectacle lens GL is determined. For the optimization calculation, a method other than the damped least-square method may be used.

Figure 9:
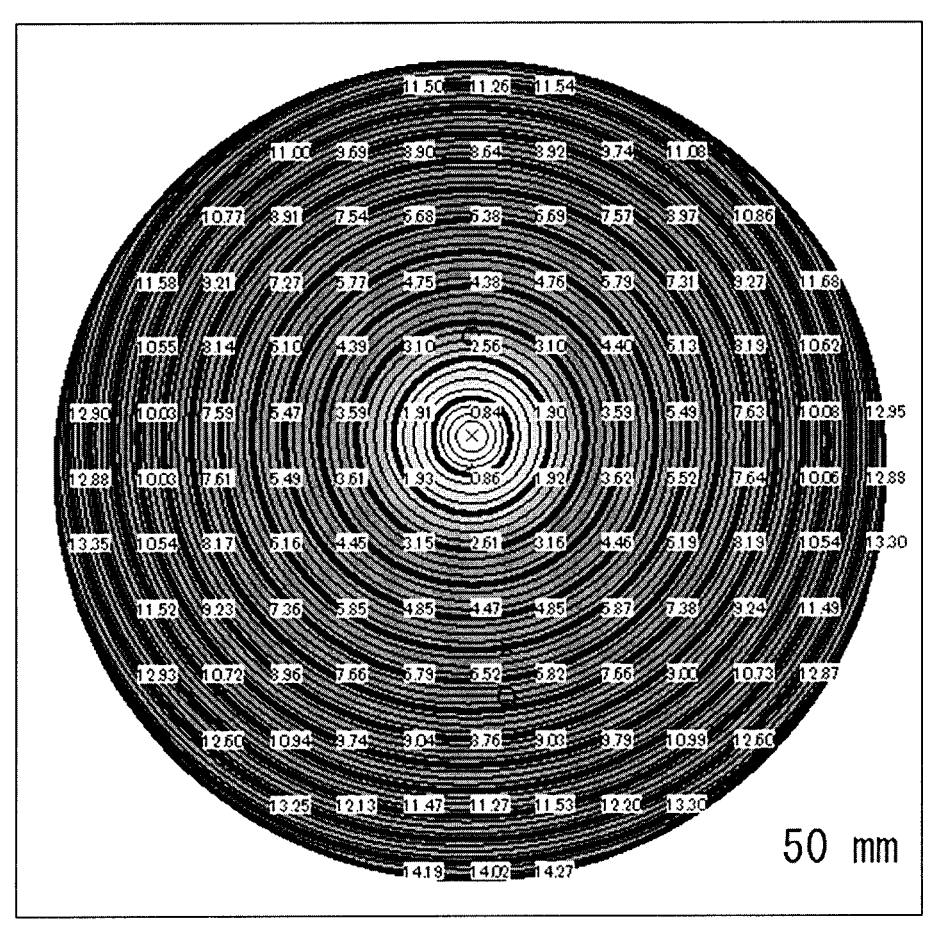
FIG. 9 is a drawing similar to FIG. 3 illustrating a spectacle lens according to Example 2-2 of the present invention.
Figure 10:
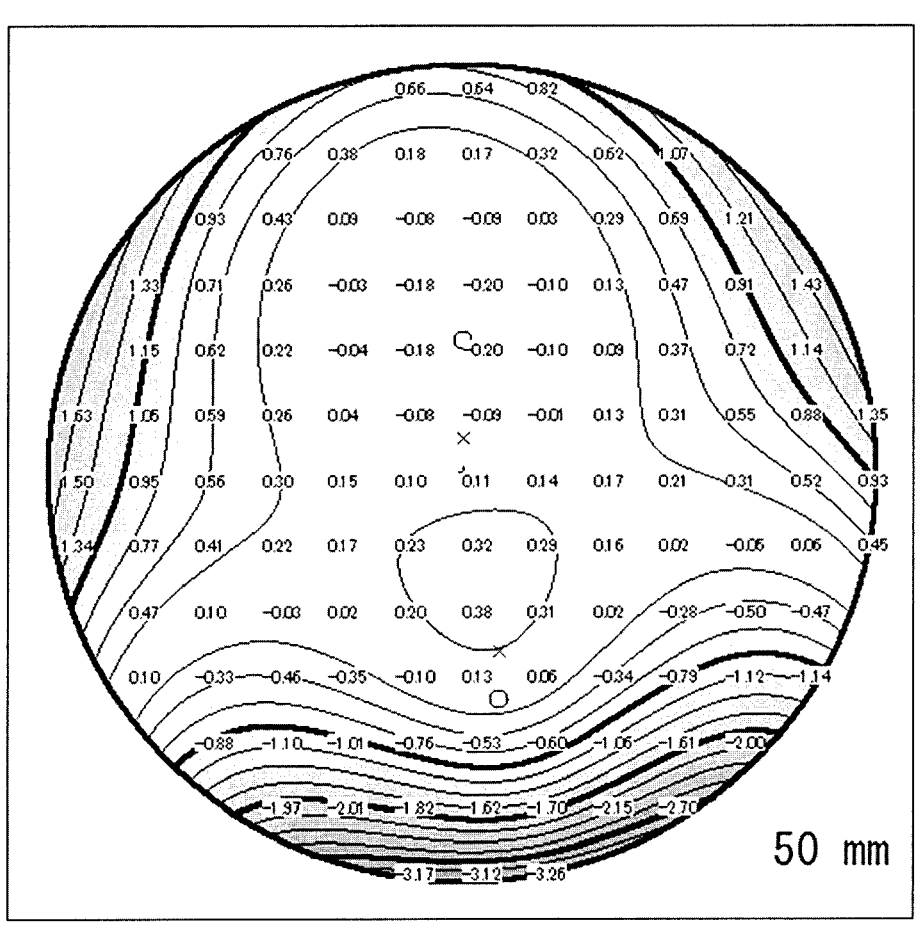
FIG. 10 is a drawing similar to FIG. 4 illustrating the spectacle lens according to Example 2-2 of the present invention.
Figure 11:
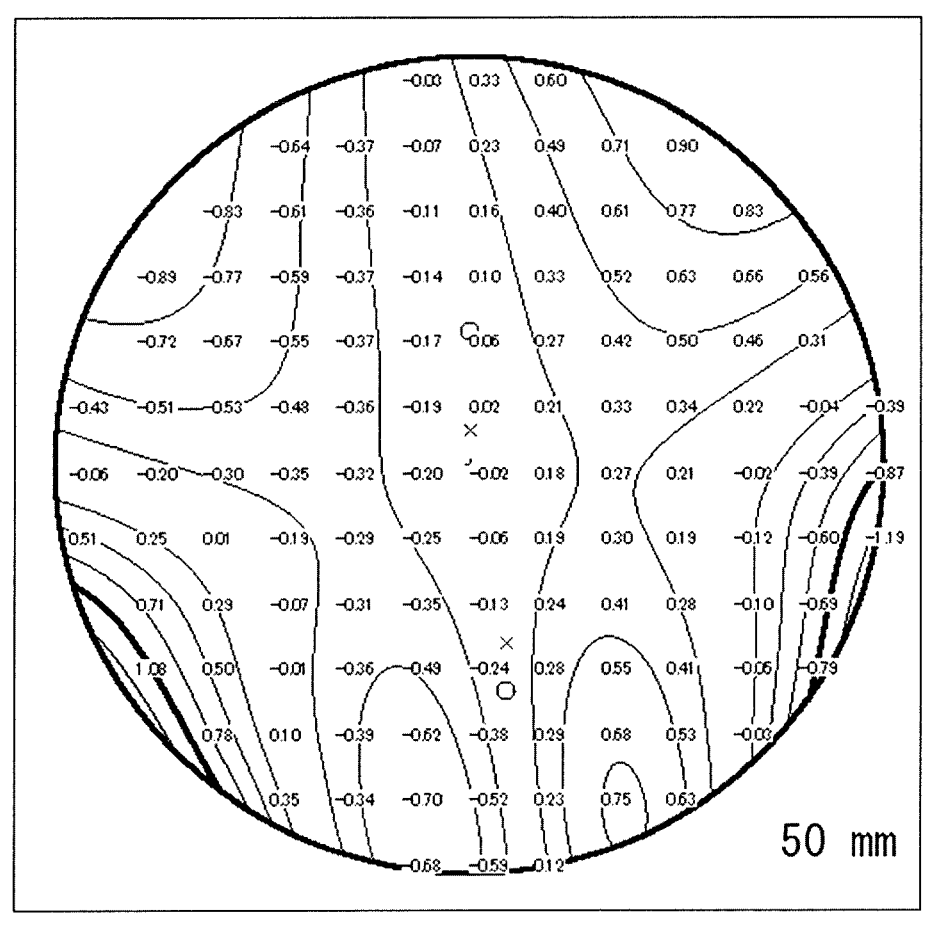
FIG. 11 is a drawing similar to FIG. 5 illustrating the spectacle lens according to Example 2-2 of the present invention.

FIG. 9 is a drawing illustrating the scalar quantity of prismatic power similar to FIG. 3 in the spectacle lens GL of Example 2-2. FIG. 10 is a drawing illustrating the distortion evaluation value $E_d$ similar to FIG. 4 in the spectacle lens GL of Example 2-2. FIG. 11 is a drawing illustrating the shaking evaluation value $E_s$ similar to FIG. 5 in the spectacle lens GL of Example 2-2.

Figure 12:
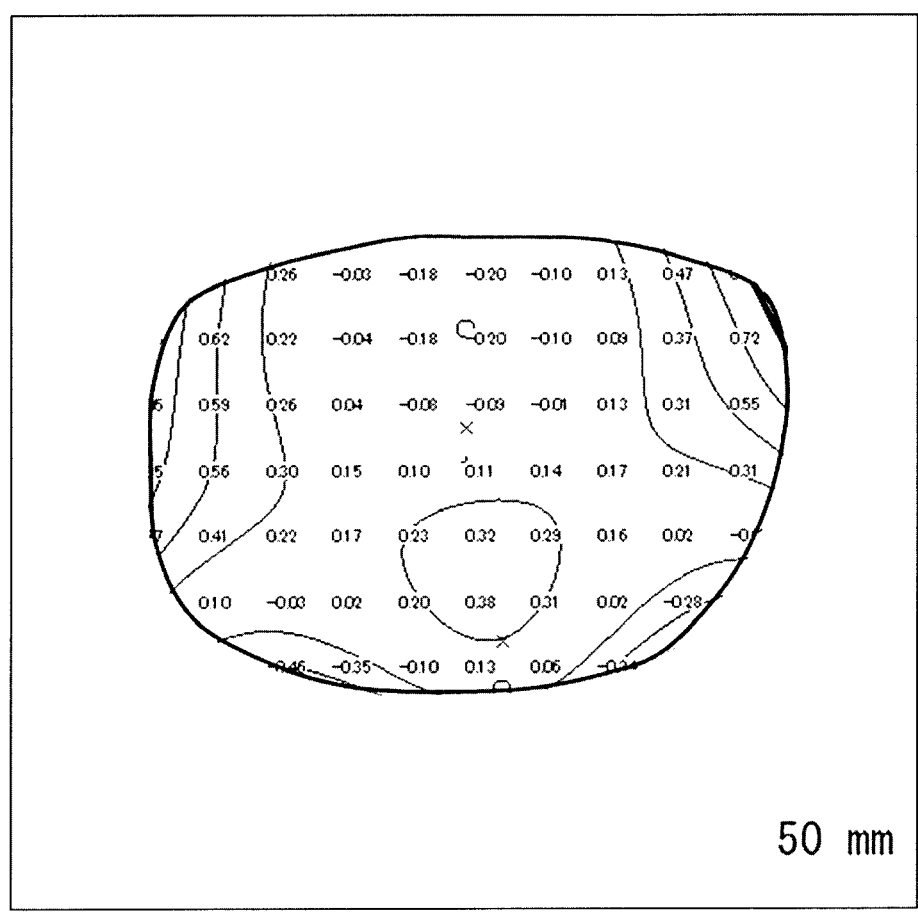
FIG. 12 is a drawing when
Figure 13:
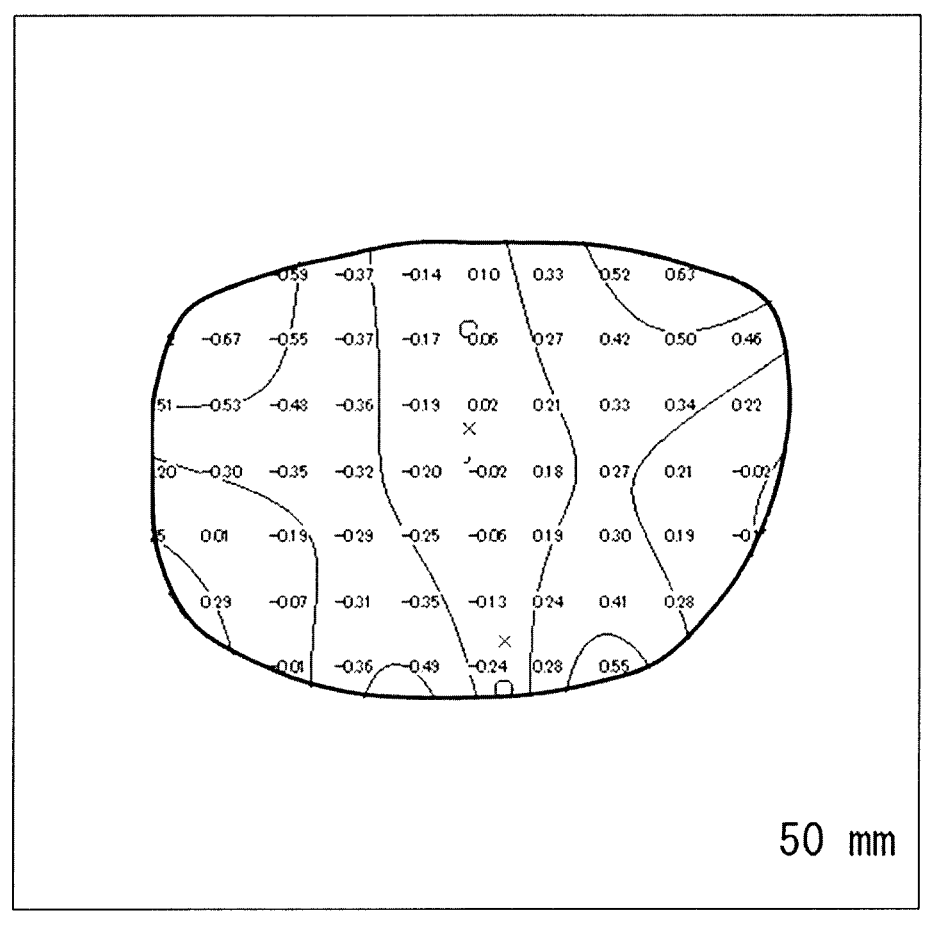
FIG. 13 is a drawing when

While the distortion evaluation value $E_d$ of Example 2-2 is large in a part of a peripheral portion in the upper half of the spectacle lens GL compared with Example 2-1, the distortion evaluation value $E_d$ of Example 2-2 is small in the center heavily used in distant vision compared with Example 2-1. Accordingly, Example 2-2 is the spectacle lens GL reduced in distortion especially for distance compared with Example 2-1. The spectacle lens GL of Example 2-2 is subjected to lens shape processing to be actually framed in a spectacle frame as illustrated in FIG. 12 (distortion) and FIG. 13 (shaking), and the peripheral portion of the spectacle lens GL in which the distortion evaluation value $E_d$ is large compared with Example 2-1 is cut during the lens shape processing.

The shaking evaluation value $E_s$ of Example 2-2 is small in approximately the whole region excluding a part of the peripheral portion of the spectacle lens GL, and small especially in the lower half of the spectacle lens GL. The peripheral portion is cut during the lens shape processing. Accordingly, Example 2-2 is the spectacle lens GL reduced in shaking, and more reduced in shaking especially for near compared with Example 2-1.

When spectacles in which the spectacle lenses GL according to Examples 2-1, 2-2 were subjected to the lens shape processing and framed were prepared, and several persons were asked to wear the spectacles and check visibilities, it was confirmed that the distortion and the shaking were reduced in the spectacles of Example 2-2 compared with those of Example 2-1 for all of the wearers although there were some differences in degree.

Figure 14:
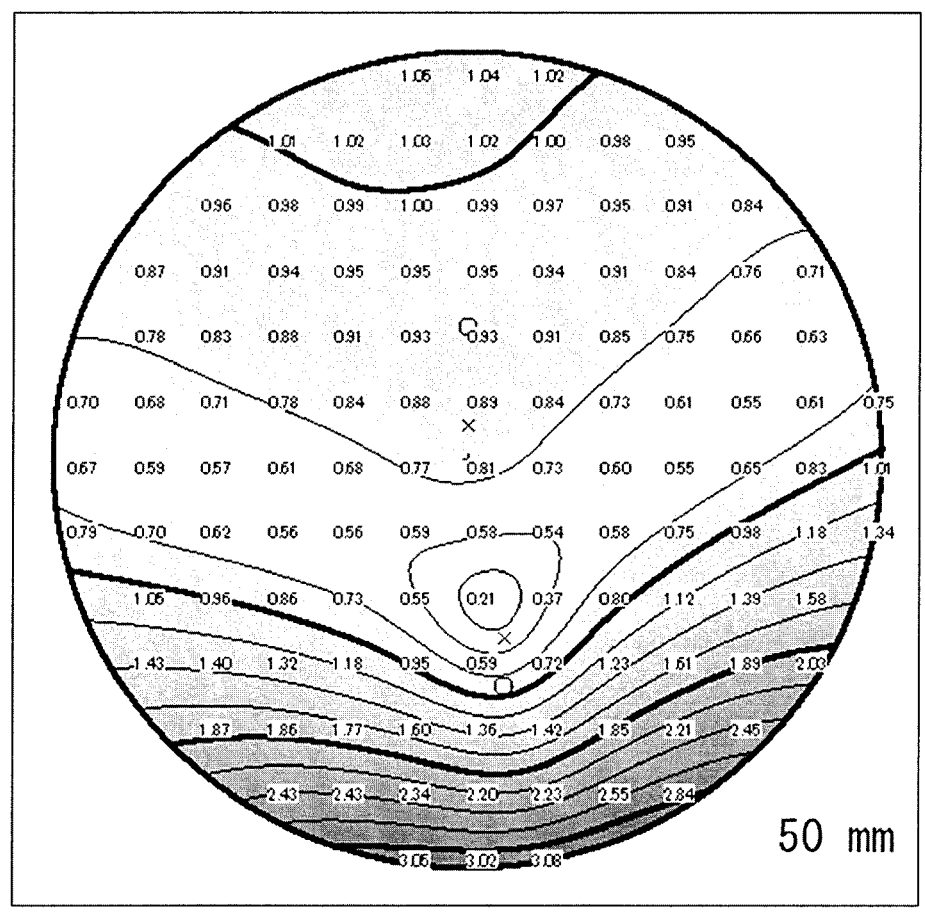
FIG. 14 is a schematic diagram illustrating scalar quantities of a prismatic power by a parallel light at respective points on a front surface of the spectacle lens according to Example 2-2 of the present invention by numerical values at corresponding points.
Figure 15:
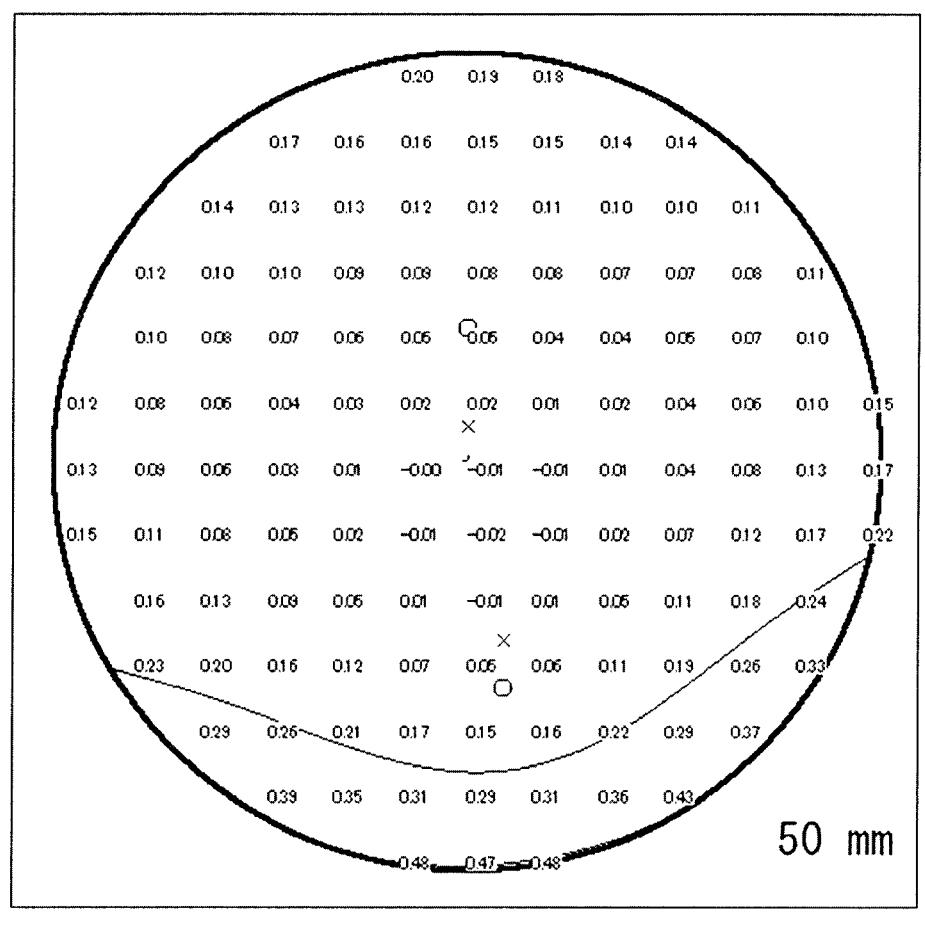
FIG. 15 is a schematic diagram illustrating distortion evaluation values at respective points on the front surface of the spectacle lens according to Example 2-2 of the present invention based on a vertical prismatic power by the parallel light or the like by numerical values at corresponding points.
Figure 16:
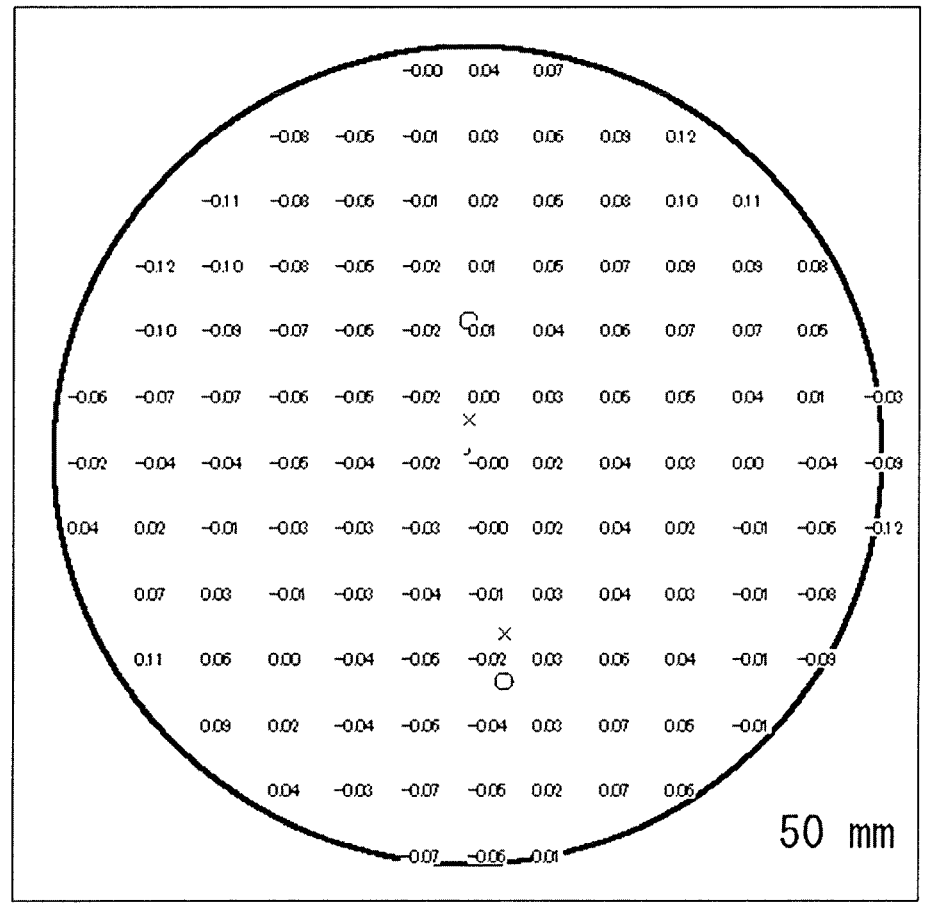
FIG. 16 is a schematic diagram illustrating shaking evaluation values at respective points on the front surface of the spectacle lens according to Example 2-2 of the present invention based on a vertical prismatic power by the parallel light or the like by numerical values at corresponding points.

For the spectacle lens GL of Example 2-2, FIG. 14 is a drawing of the scalar quantity of the prismatic power regarding the parallel light, FIG. 15 is a drawing of the distortion evaluation value $E_d$, and FIG. 16 is a drawing of the shaking evaluation value $E_s$.

Figure 17:
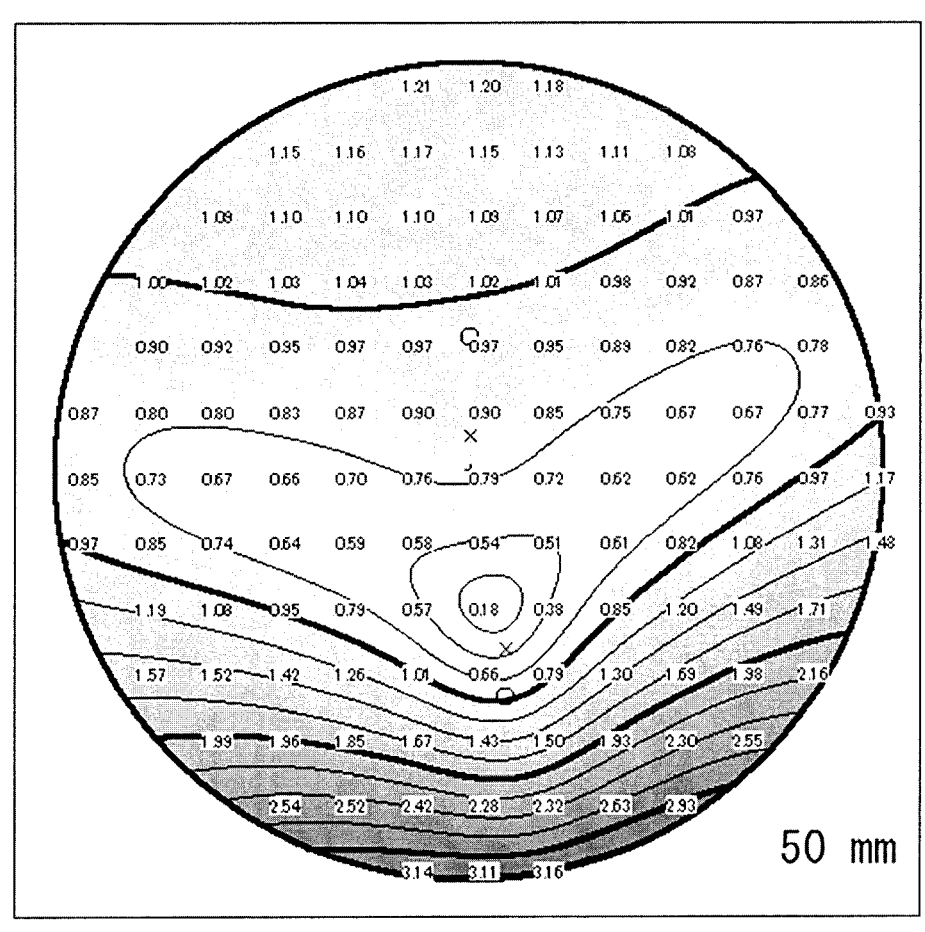
FIG. 17 is a schematic diagram illustrating scalar quantities of a prismatic power by a back surface vertical light at respective points on the front surface of the spectacle lens according to Example 2-2 of the present invention by numerical values at corresponding points.
Figure 18:
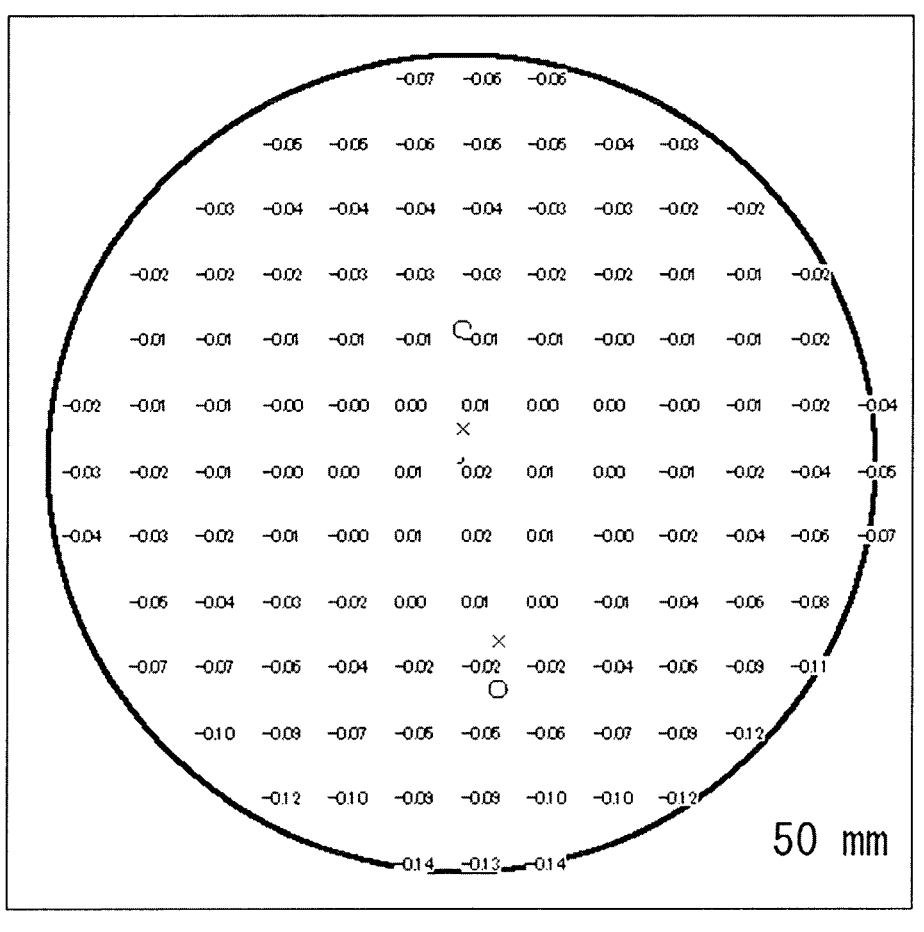
FIG. 18 is a schematic diagram illustrating distortion evaluation values at respective points on the front surface of the spectacle lens according to Example 2-2 of the present invention based on a vertical prismatic power by the back surface vertical light or the like by numerical values at corresponding points.
Figure 19:
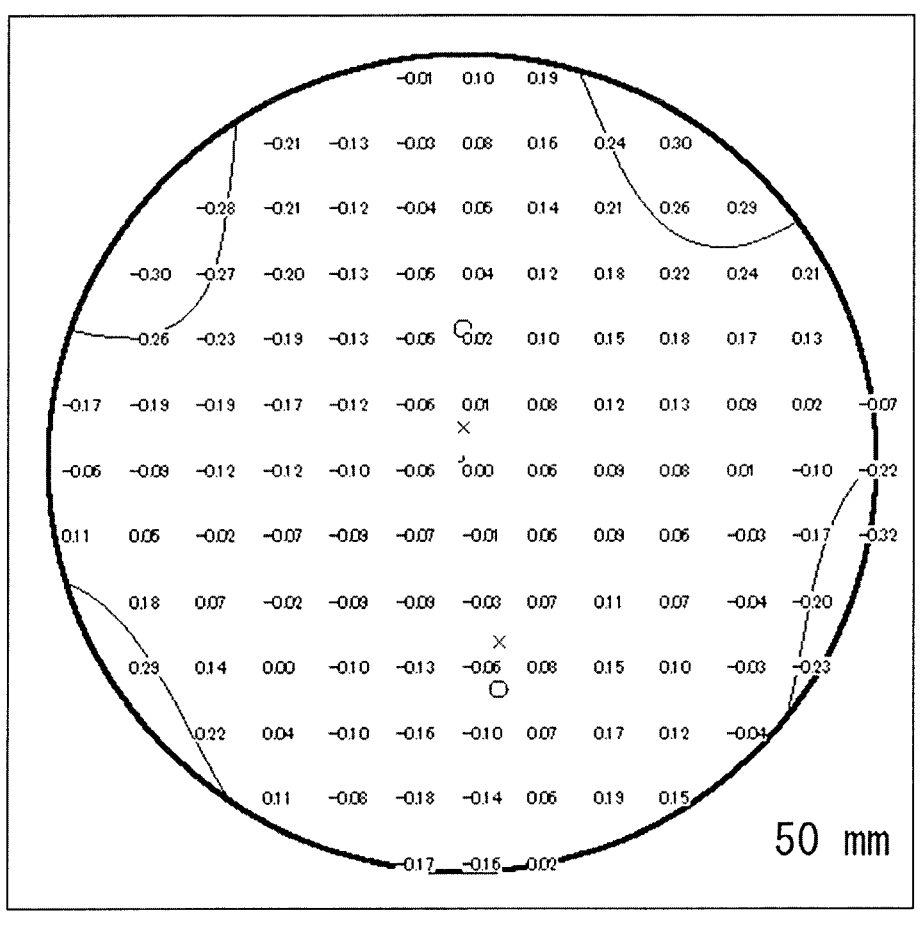
FIG. 19 is a schematic diagram illustrating shaking evaluation values at respective points on the front surface of the spectacle lens according to Example 2-2 of the present invention based on a vertical prismatic power by the back surface vertical light or the like by numerical values at corresponding points.

Further, for the spectacle lens GL of Example 2-2, FIG. 17 is a drawing of the scalar quantity of the prismatic power regarding the back surface vertical light, FIG. 18 is a drawing of the distortion evaluation value $E_d$, and FIG. 19 is a drawing of the shaking evaluation value $E_s$.

As illustrated in the drawings, even with the parallel light or the back surface vertical light, the distortion evaluation value $E_d$ and the shaking evaluation value $E_s$ can be calculated, and the distortion and the shaking can be evaluated, therefore, the spectacle lens can be designed based on at least one of them.

Example 3 is described below.

The spectacle lens GL of Example 3 relates to a progressive-power lens, and is configured similarly to Example 2-2 excluding the design. The refractive index, the S power, the addition power, the progressive band length, and the front curve of the spectacle lens GL of Example 3 are the same as those of Example 2-2.

Figure 20:
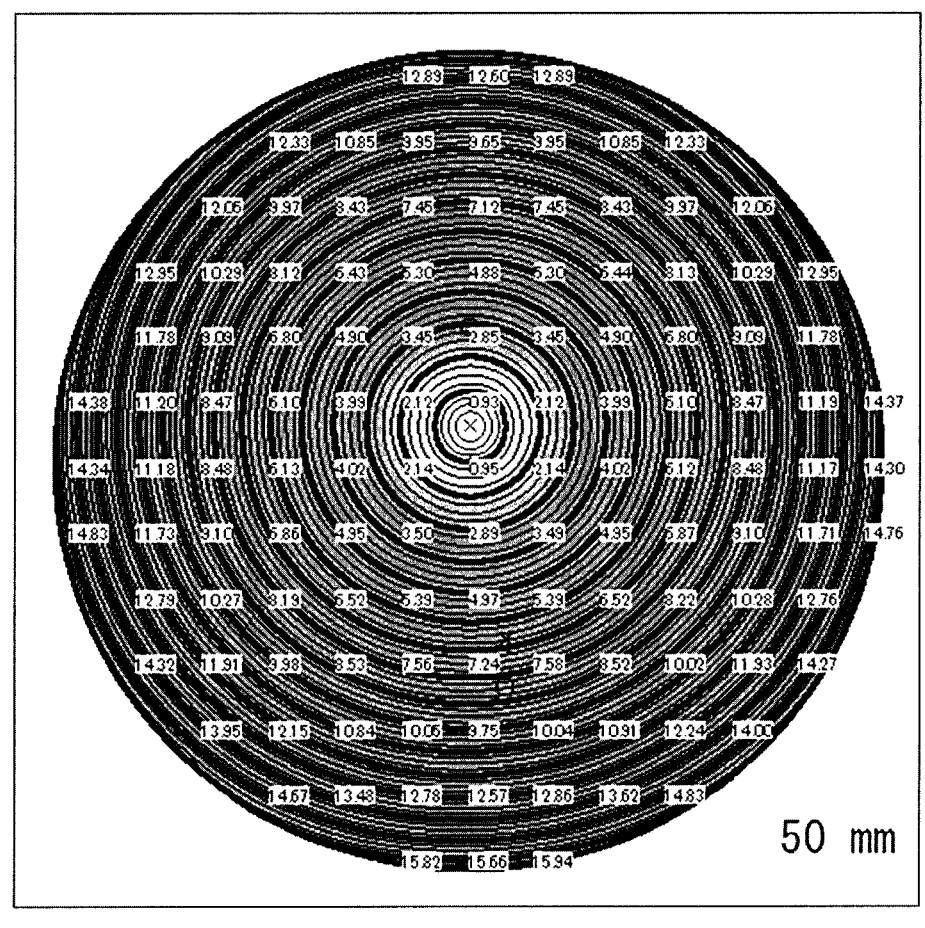
FIG. 20 is a drawing similar to FIG. 3 illustrating a spectacle lens according to Example 3 of the present invention.
Figure 21:
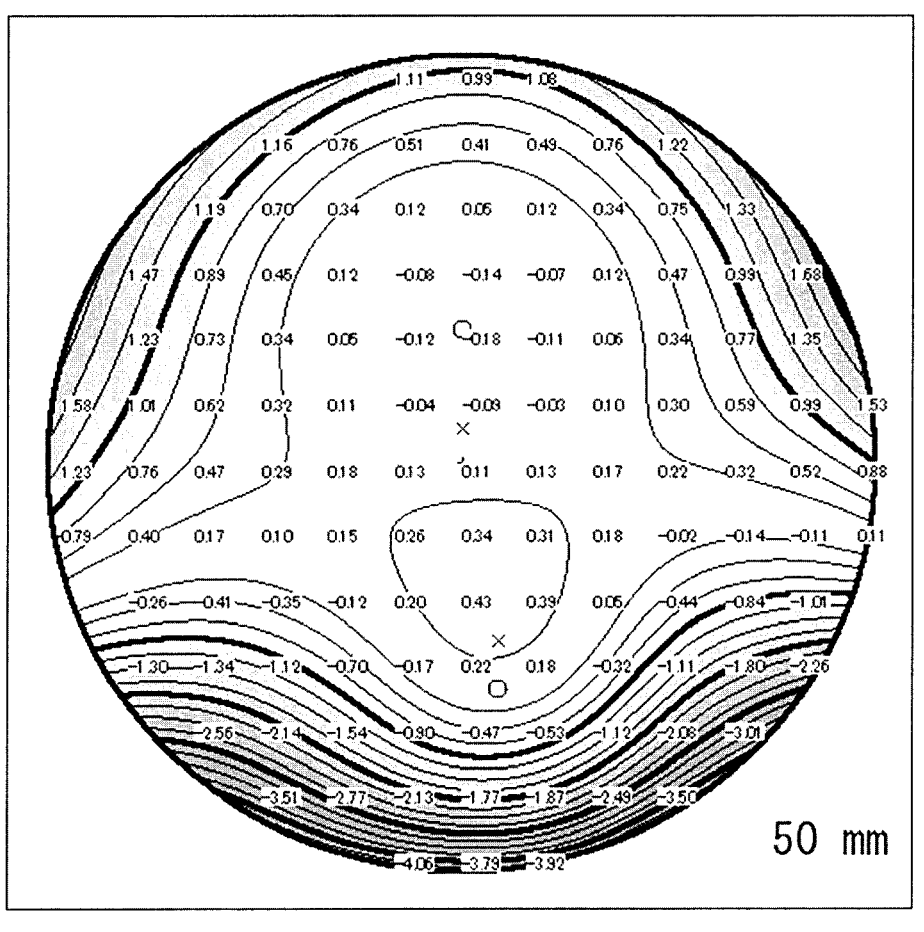
FIG. 21 is a drawing similar to FIG. 4 illustrating the spectacle lens according to Example 3 of the present invention.
Figure 22:
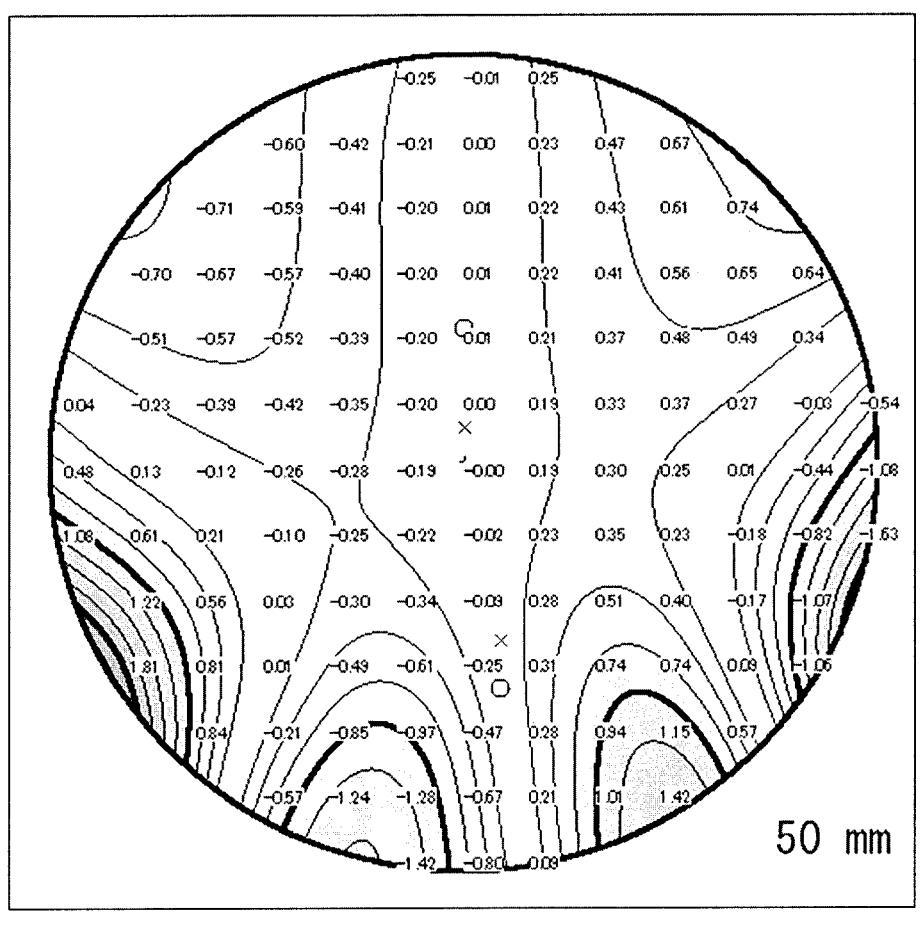
FIG. 22 is a drawing similar to FIG. 5 illustrating the spectacle lens according to Example 3 of the present invention.
Figure 23:
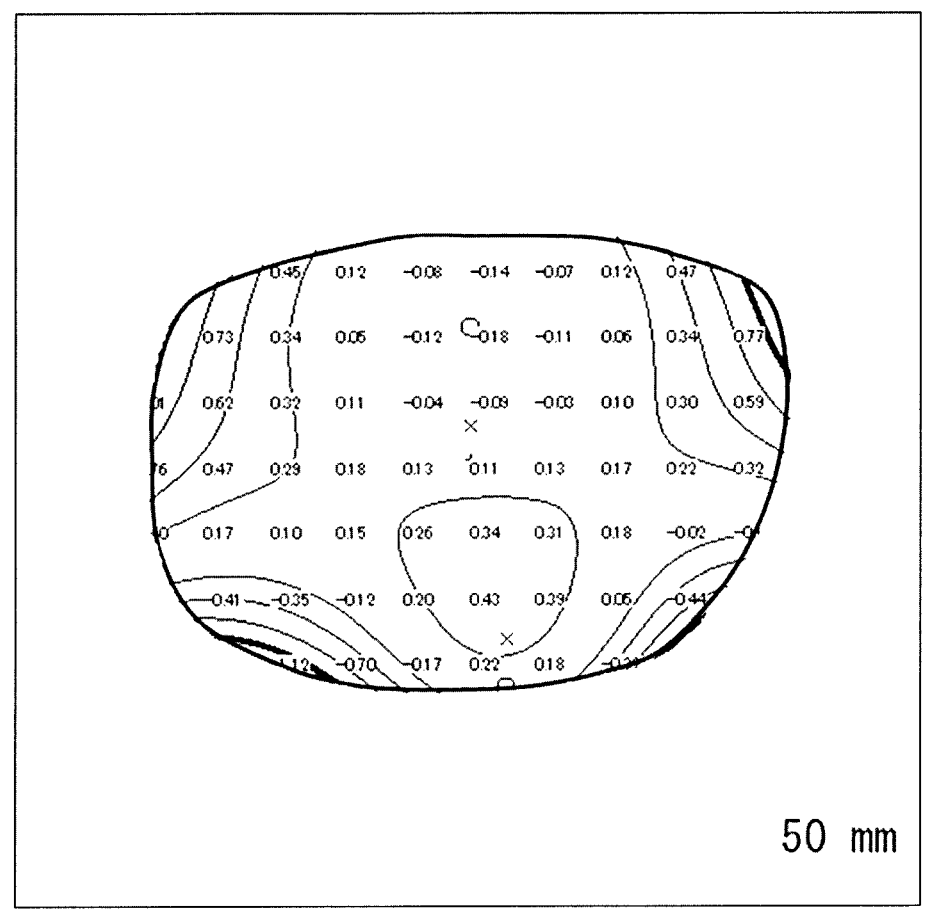
FIG. 23 is a drawing similar to FIG. 12 illustrating the spectacle lens according to Example 3 of the present invention.
Figure 24:
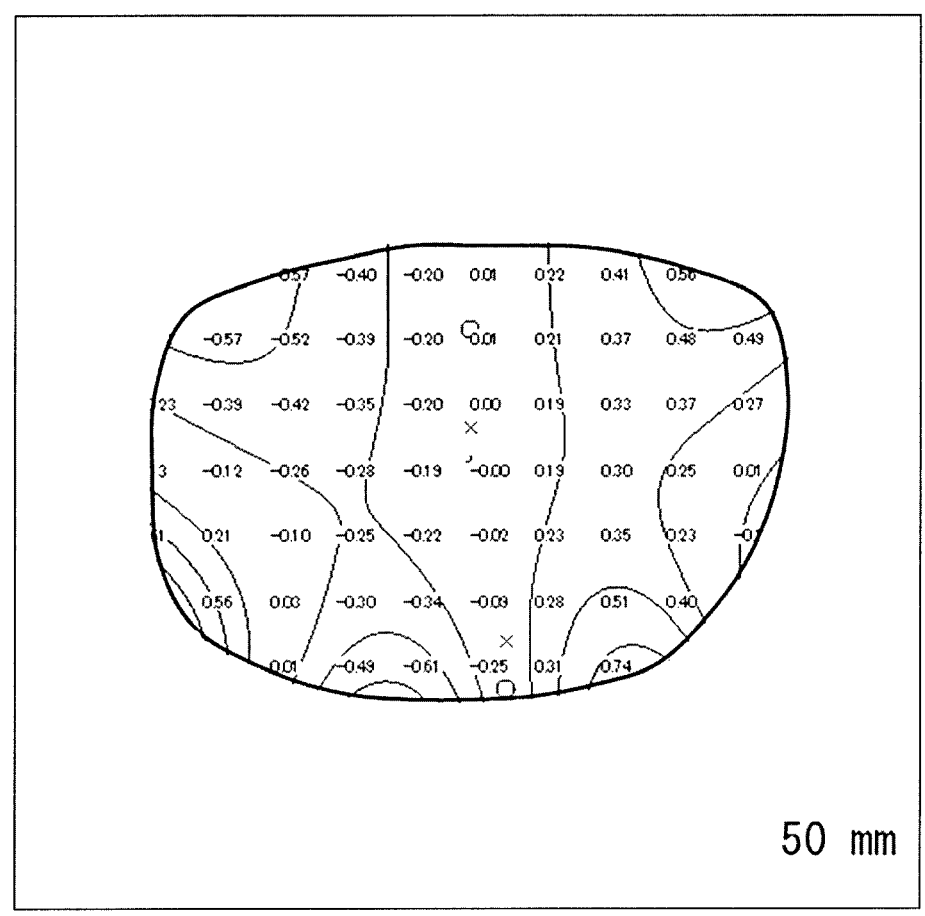
FIG. 24 is a drawing similar to FIG. 13 illustrating the spectacle lens according to Example 3 of the present invention.

FIG. 20 is a drawing illustrating the scalar quantity of prismatic power similar to FIG. 3 in Example 3. FIG. 21 is a drawing illustrating the distortion evaluation value $E_d$ similar to FIG. 4 in Example 3. FIG. 22 is a drawing illustrating the shaking evaluation value $E_s$ similar to FIG. 5 in Example 3. FIG. 23 and FIG. 24 are drawings similar to FIG. 12 and FIG. 13 regarding the lens shape processing in Example 3.

The distortion evaluation value $E_d$ of Example 3 is small especially in the distance portion after the lens shape processing, and the shaking evaluation value $E_s$ of Example 3 is small in the whole spectacle lens GL including the near portion after the lens shape processing. Accordingly, Example 3 is the progressive-power spectacle lens GL reduced in distortion and shaking while including the near portion and the distance portion.

Example 4 is described below.

The spectacle lens GL of Example 4 relates to a progressive-power lens, and is configured similarly to Example 2-2 excluding the design and the front curve. The refractive index, the S power, the addition power, and the progressive band length of the spectacle lens GL of Example 4 are the same as those of Example 2-2.

Figure 25:
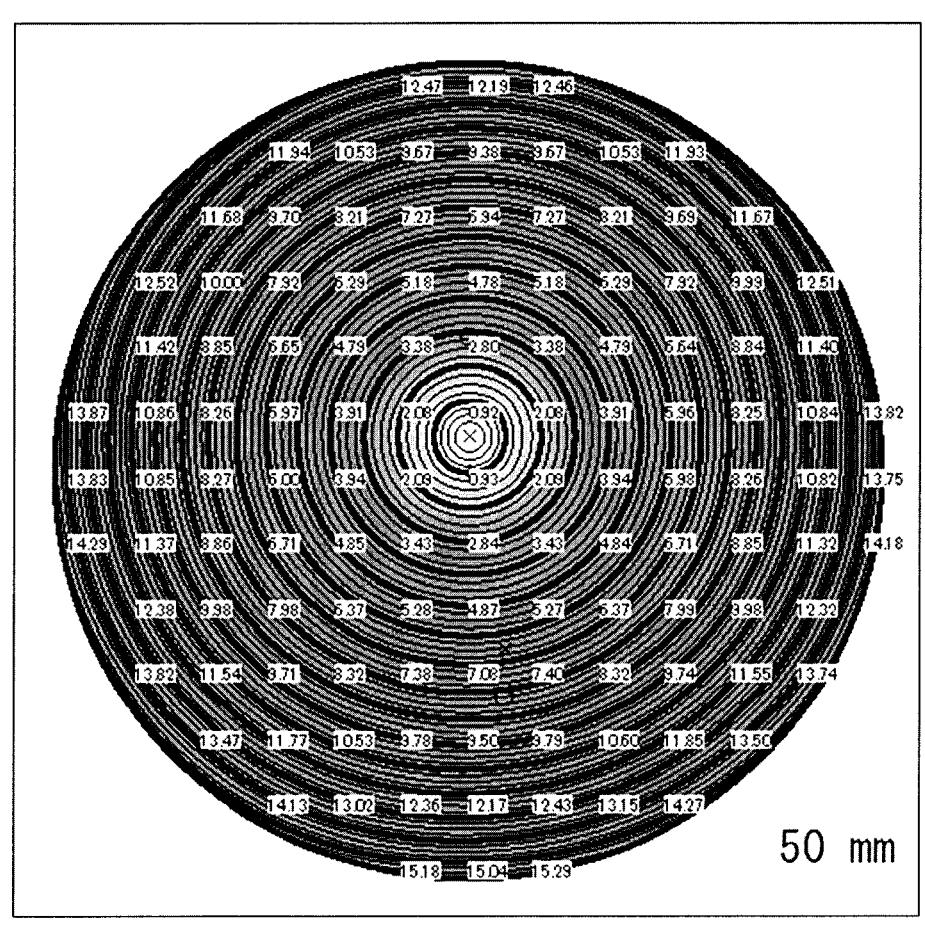
FIG. 25 is a drawing similar to FIG. 3 illustrating a spectacle lens according to Example 4 of the present invention.
Figure 26:
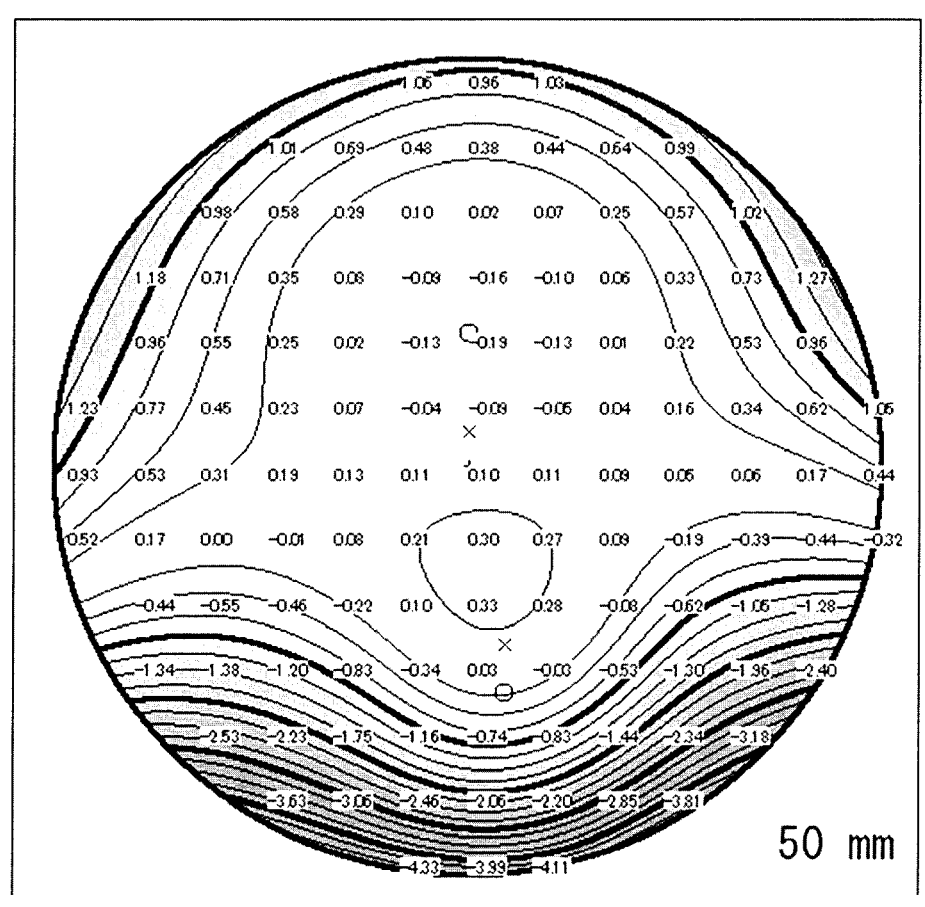
FIG. 26 is a drawing similar to FIG. 4 illustrating the spectacle lens according to Example 4 of the present invention.
Figure 27:
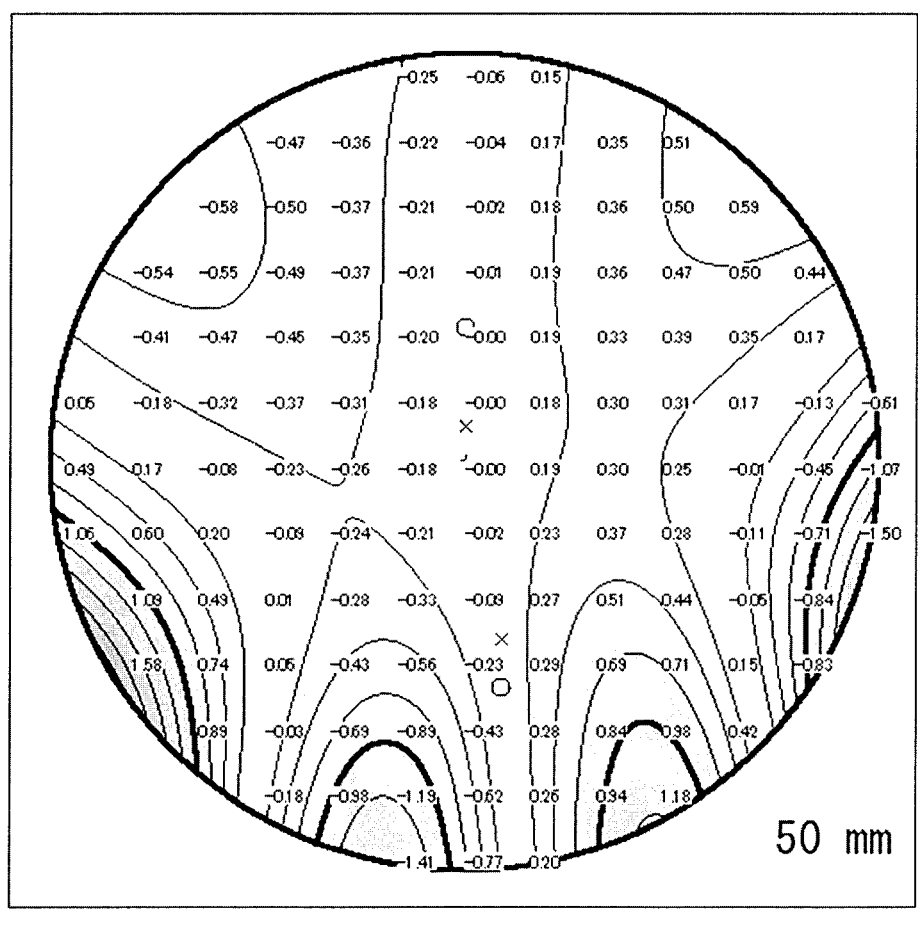
FIG. 27 is a drawing similar to FIG. 5 illustrating the spectacle lens according to Example 4 of the present invention.
Figure 28:
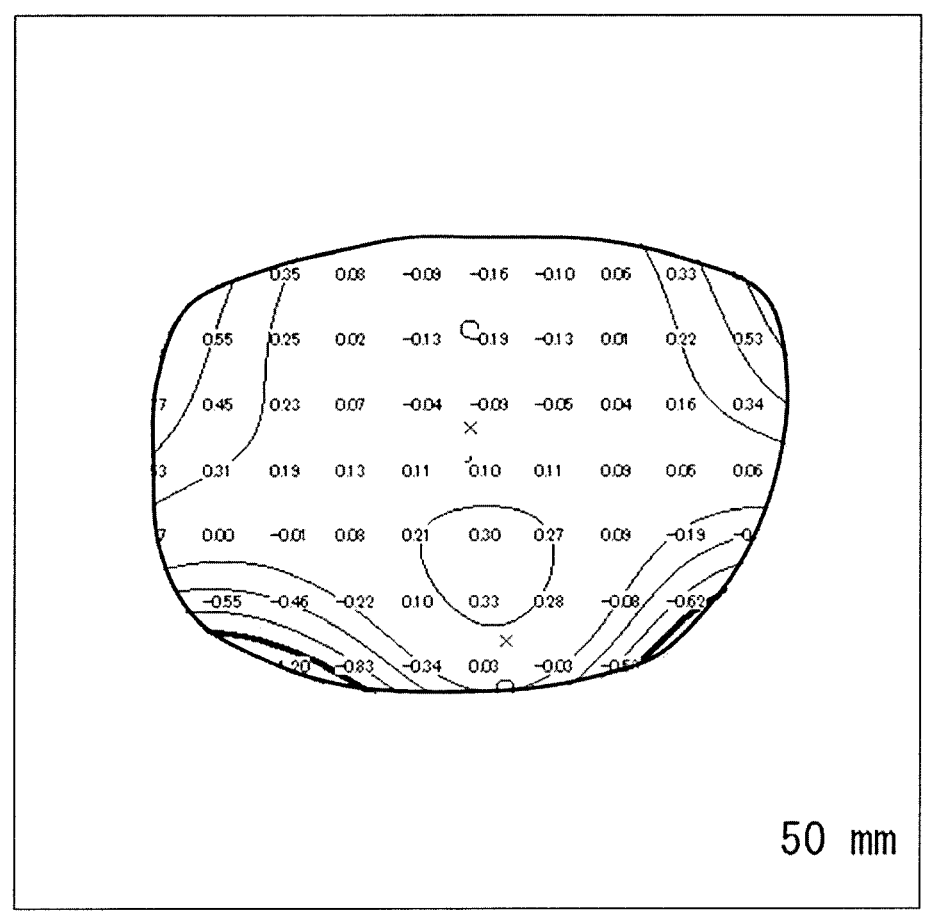
FIG. 28 is a drawing similar to FIG. 12 illustrating the spectacle lens according to Example 4 of the present invention.
Figure 29:
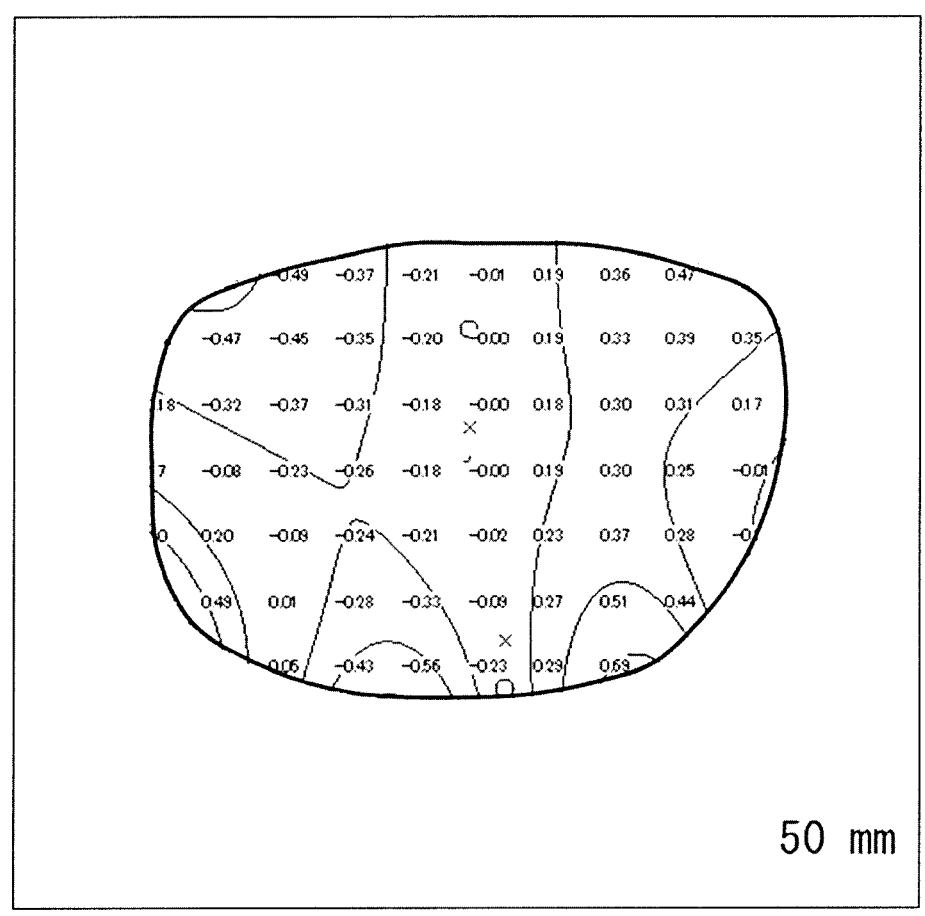
FIG. 29 is a drawing similar to FIG. 13 illustrating the spectacle lens according to Example 4 of the present invention.

FIG. 25 is a drawing illustrating the scalar quantity of prismatic power similar to FIG. 3 in Example 4. FIG. 26 is a drawing illustrating the distortion evaluation value $E_d$ similar to FIG. 4 in Example 4. FIG. 27 is a drawing illustrating the shaking evaluation value $E_s$ similar to FIG. 5 in Example 4. FIG. 28 and FIG. 29 are drawings similar to FIG. 12 and FIG. 13 regarding the lens shape processing in Example 4.

The curve value of the front surface GLF of the spectacle lens GL of Example 4 is 4.00.

The spectacle lens GL of Example 4 is entirely reduced in average dioptric power of the spectacle lens GL of Example 3, and an arrangement of the near portion and a change pattern of focal point in Example 4 are similar to those of Example 3. Accordingly, the distortion evaluation value $E_d$ and the shaking evaluation value $E_s$ in Example 4 are further reduced compared with Example 3.

Example 5 is described below.

The spectacle lens GL of Example 5 relates to a progressive-power lens, and is configured similarly to Example 2-2 excluding the design and the progressive band length. The refractive index, the S power, the addition power, and the front curve of the spectacle lens GL of Example 5 are the same as those of Example 2-2.

Figure 30:
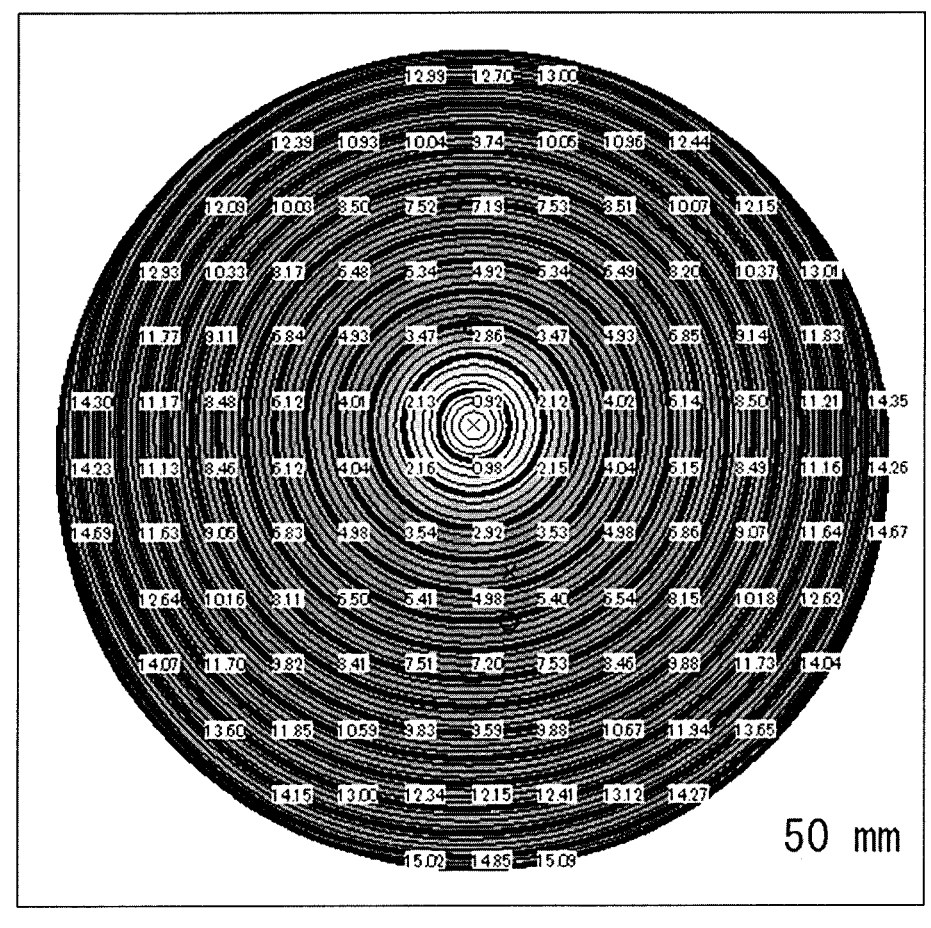
FIG. 30 is a drawing similar to FIG. 3 illustrating a spectacle lens according to Example 5 of the present invention.
Figure 31:
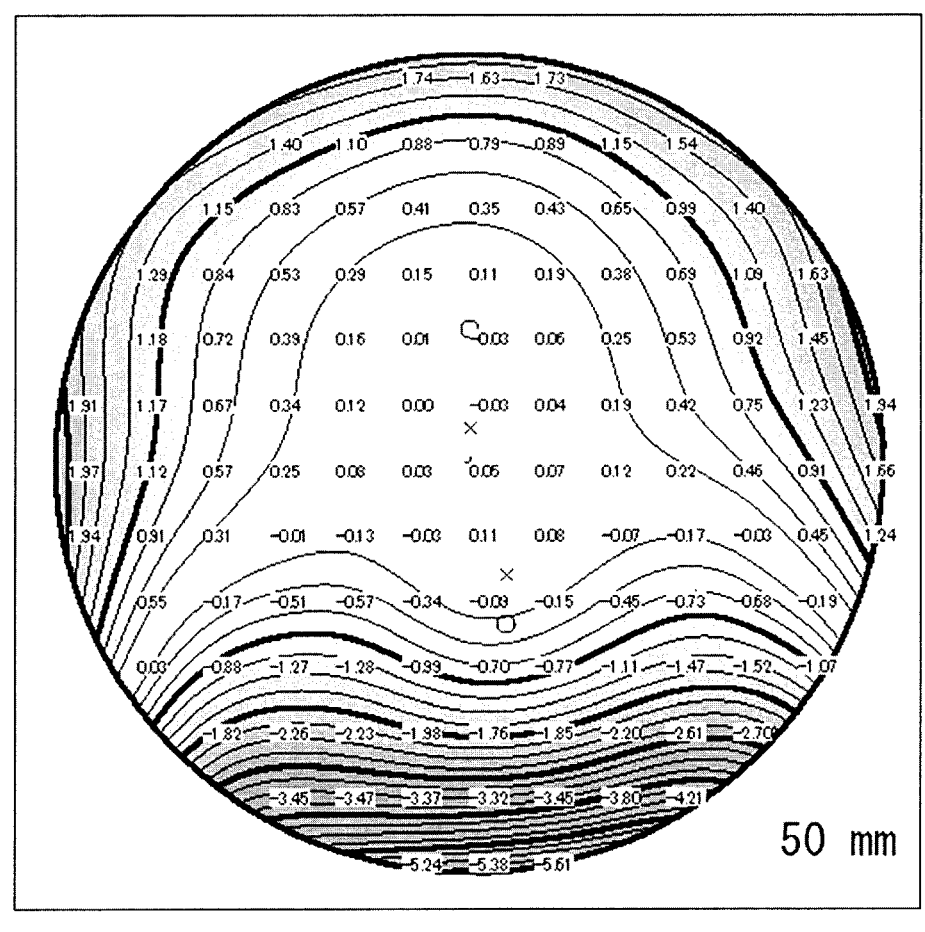
FIG. 31 is a drawing similar to FIG. 4 illustrating the spectacle lens according to Example 5 of the present invention.
Figure 32:
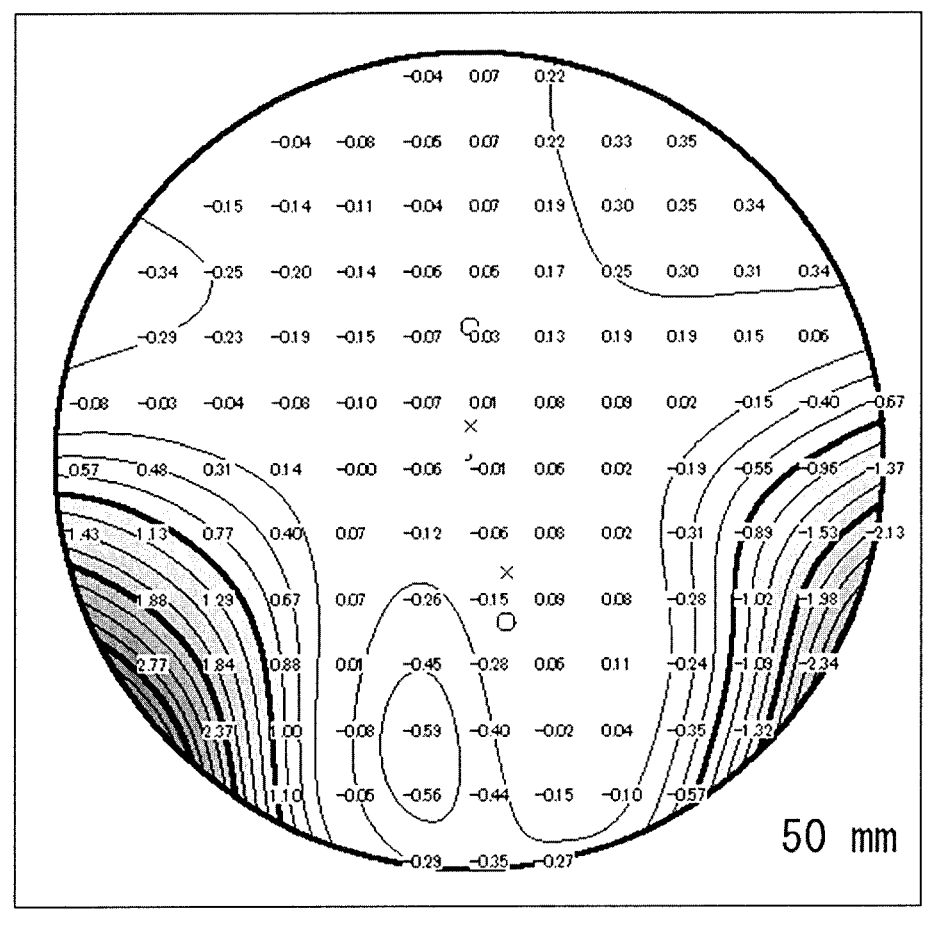
FIG. 32 is a drawing similar to FIG. 5 illustrating the spectacle lens according to Example 5 of the present invention.
Figure 33:
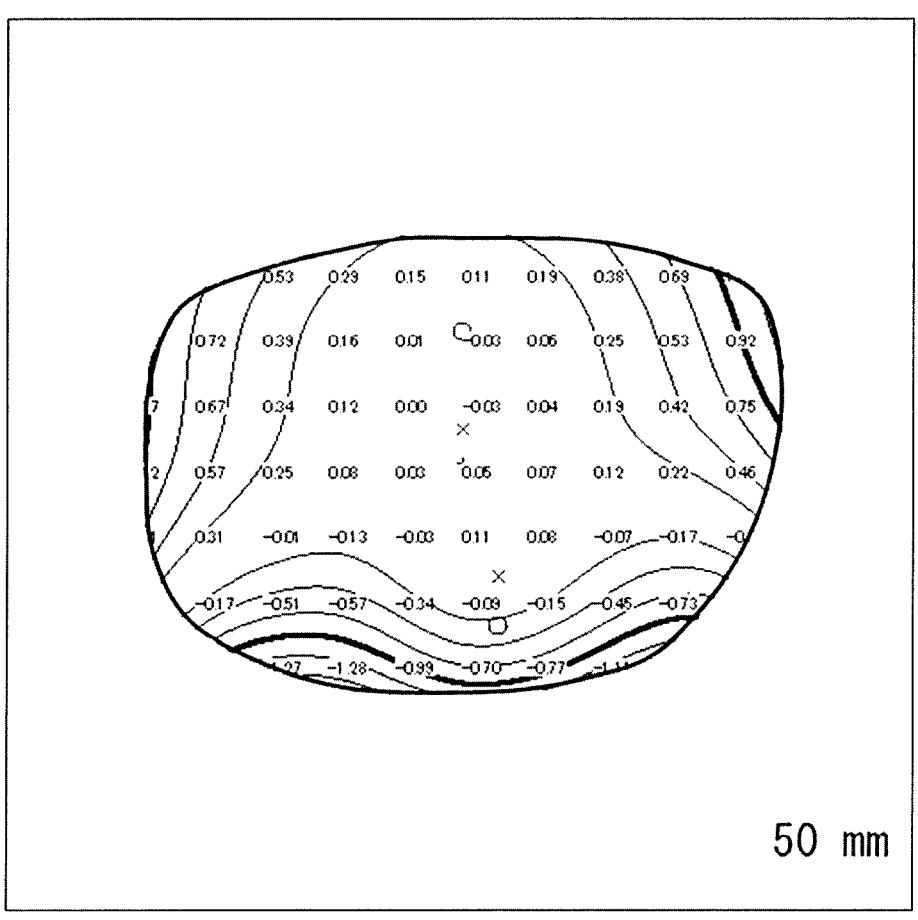
FIG. 33 is a drawing similar to FIG. 12 illustrating the spectacle lens according to Example 5 of the present invention.
Figure 34:
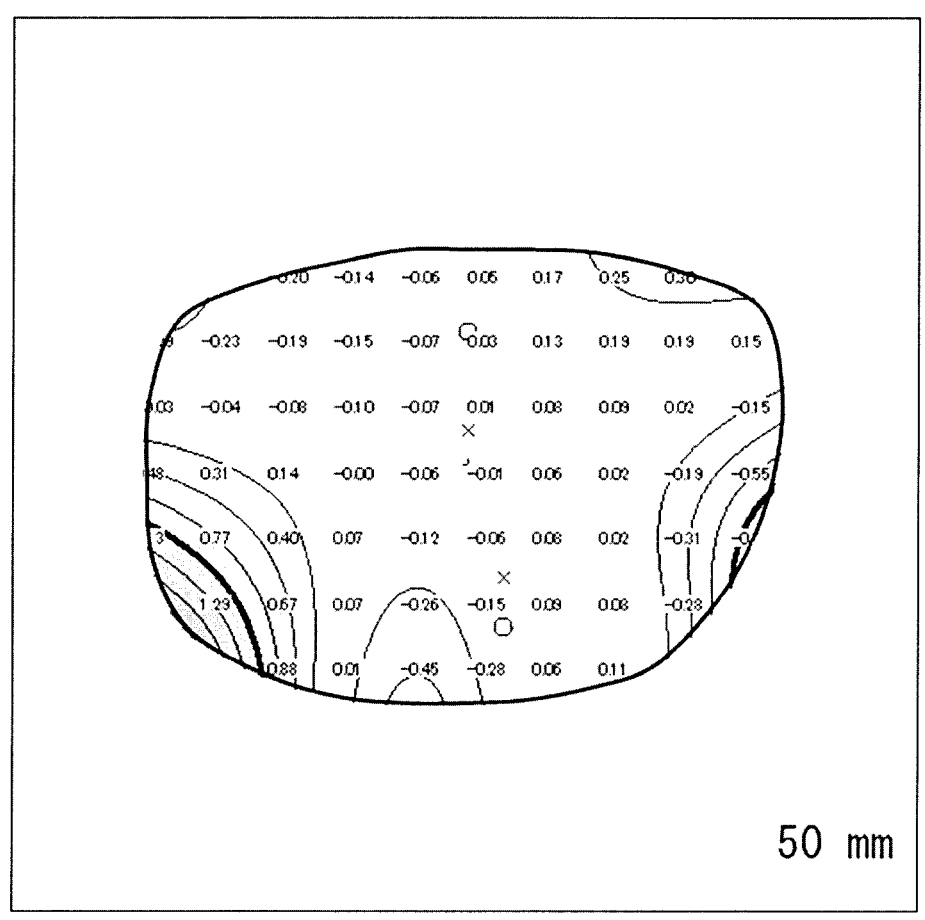
FIG. 34 is a drawing similar to FIG. 13 illustrating the spectacle lens according to Example 5 of the present invention.

FIG. 30 is a drawing illustrating the scalar quantity of prismatic power similar to FIG. 3 in Example 5. FIG. 31 is a drawing illustrating the distortion evaluation value $E_d$ similar to FIG. 4 in Example 5. FIG. 32 is a drawing illustrating the shaking evaluation value $E_s$ similar to FIG. 5 in Example 5. FIG. 33 and FIG. 34 are drawings similar to FIG. 12 and FIG. 13 regarding the lens shape processing in Example 5.

The curve value of the front surface GLF of the spectacle lens GL of Example 5 is 4.40, and the progressive band length is 9 mm.

The spectacle lens GL of Example 5 is also reduced in the distortion evaluation value $E_d$ and the shaking evaluation value $E_s$ especially after the lens shape processing, and can be evaluated to be reduced in distortion and shaking.

Example 6 is described below.

Example 6 is a single-vision lens the same as Example 1 evaluated by the performance evaluation device of the second embodiment.

Figure 35:
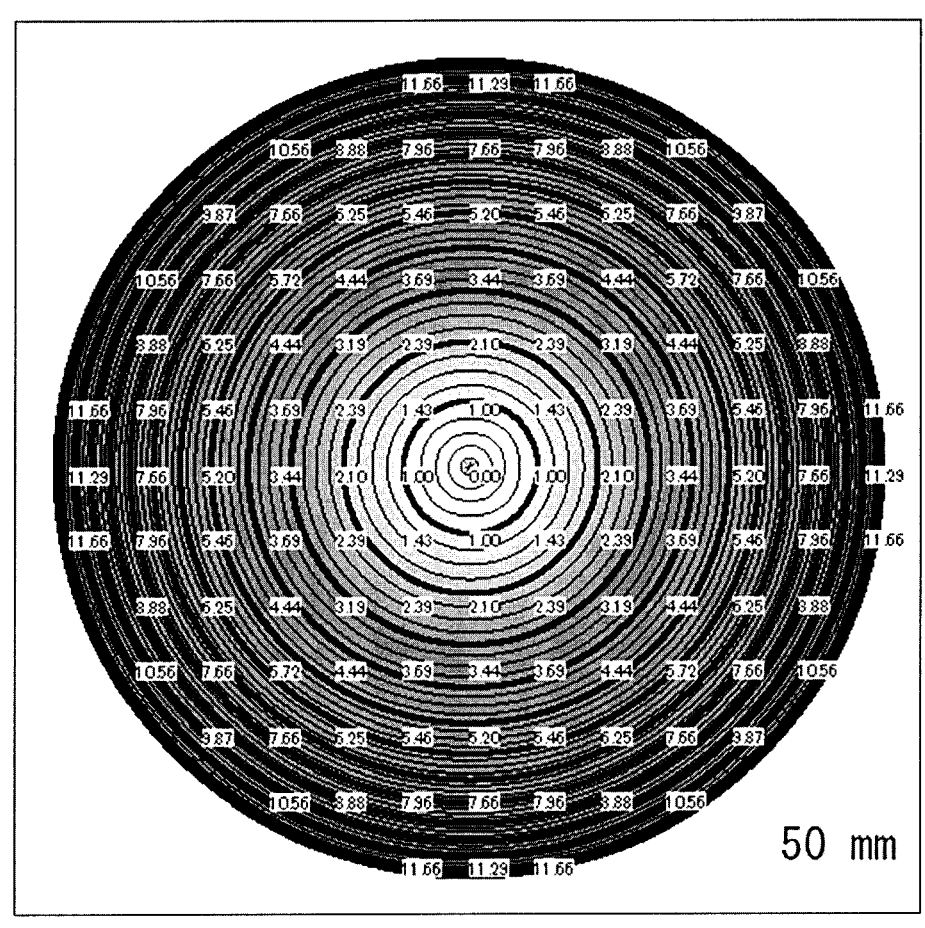
FIG. 35 is a drawing similar to FIG. 3 illustrating a spectacle lens according to Example 6 of the present invention.
Figure 36:
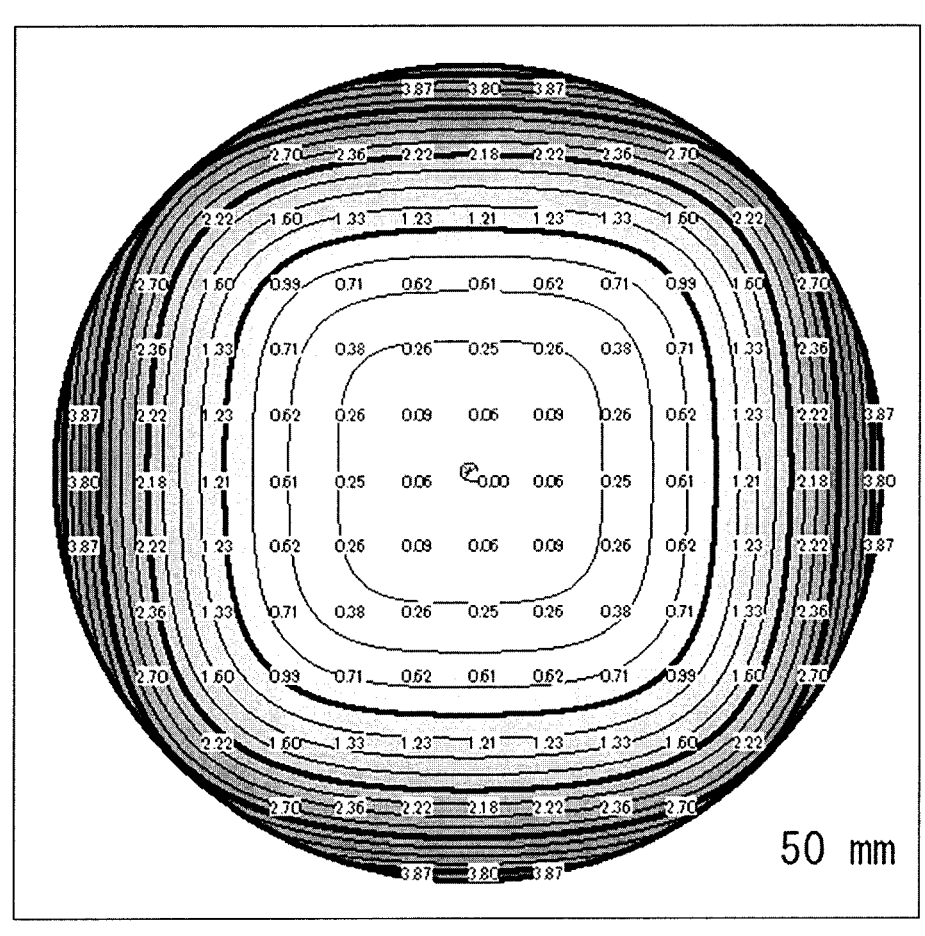
FIG. 36 is a drawing similar to FIG. 4 illustrating the spectacle lens according to Example 6 of the present invention.
Figure 37:
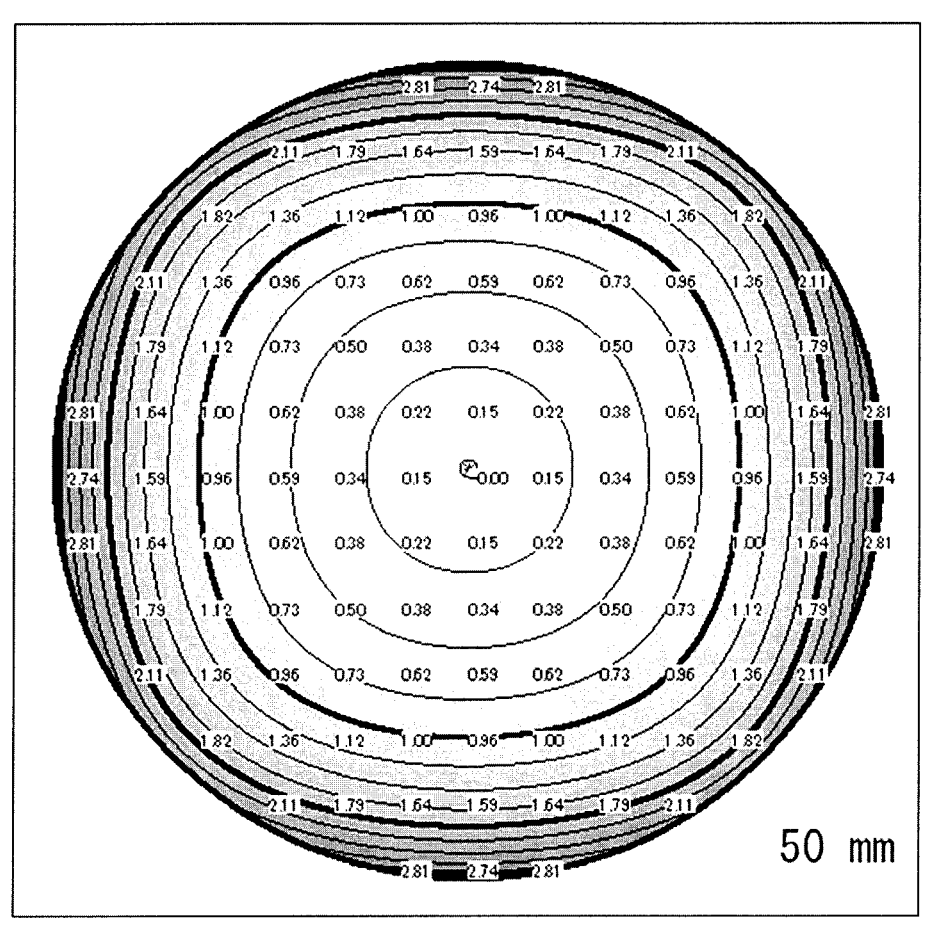
FIG. 37 is a drawing similar to FIG. 5 illustrating the spectacle lens according to Example 6 of the present invention.

FIG. 35 is a drawing illustrating the scalar quantity of prismatic power similar to FIG. 3 in Example 6. FIG. 36 is a drawing illustrating the distortion evaluation value $E_d$ similar to FIG. 4 in Example 6. FIG. 37 is a drawing illustrating the shaking evaluation value $E_s$ similar to FIG. 5 in Example 6.

The distortion evaluation value $E_d$ is calculated by the first derivation of the prismatic power, and increases corresponding to the distance from the origin O. This is consistent with that a wearer of the single-vision lens feels the distortion more strongly toward a periphery of the visual field.

The shaking evaluation value $E_s$ is calculated by the second derivation of the prismatic power, and increases corresponding to the distance from the origin O while not as much as the distortion evaluation value $E_d$. This is consistent with that a wearer of the single-vision lens who feels the shaking easily recognizes the shaking more strongly toward a periphery of the visual field.

Example 7 is described below.

Example 7 is a progressive-power lens the same as Example 2-2 evaluated by the performance evaluation device of the second embodiment.

Figure 38:
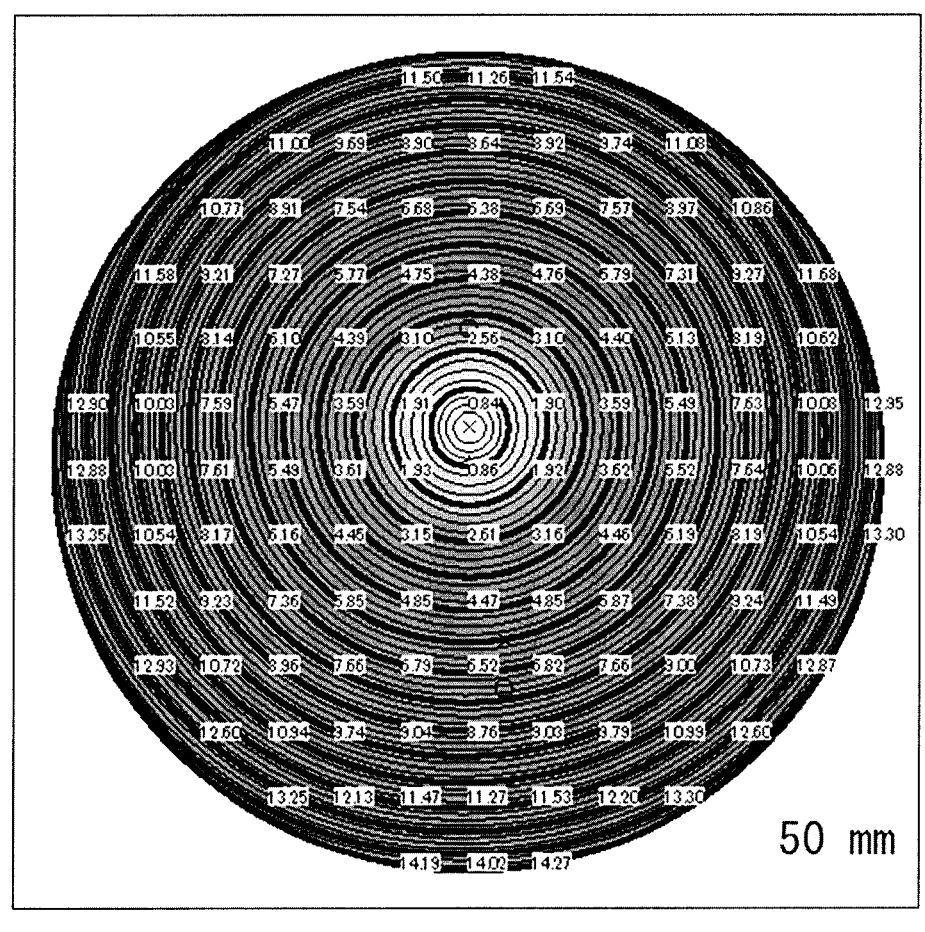
FIG. 38 is a drawing similar to FIG. 3 illustrating a spectacle lens according to Example 7 of the present invention.
Figure 39:
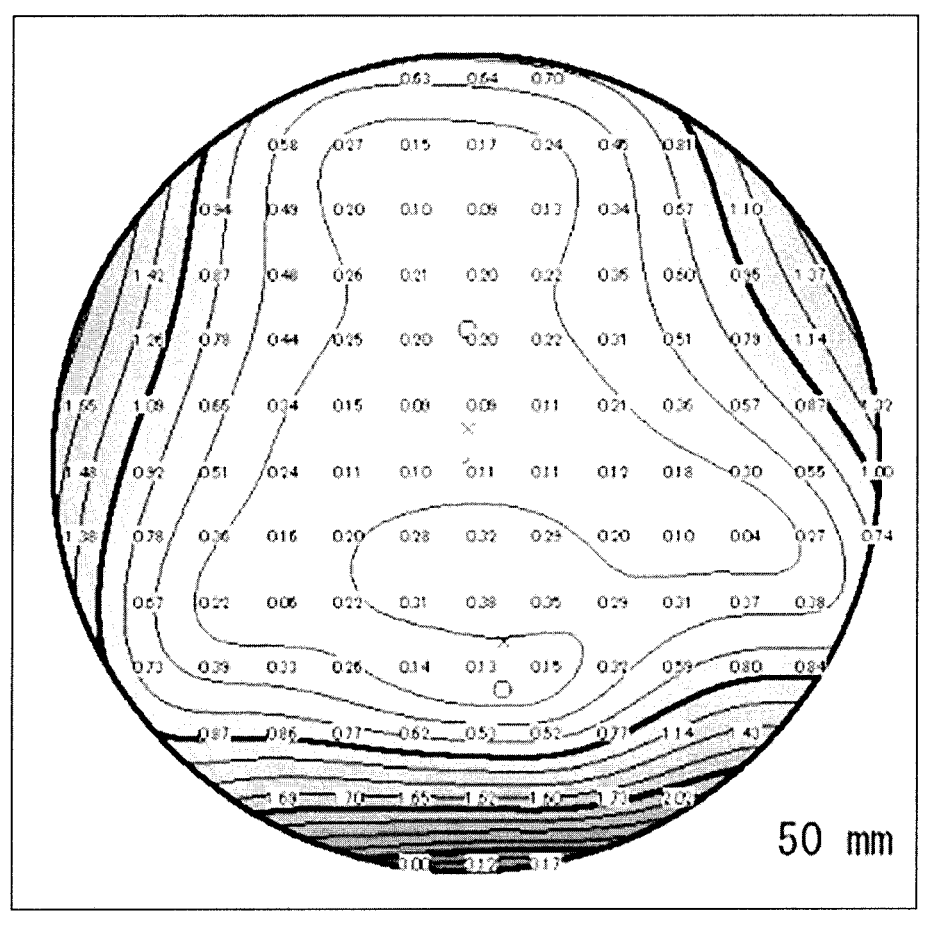
FIG. 39 is a drawing similar to FIG. 4 illustrating the spectacle lens according to Example 7 of the present invention.
Figure 40:
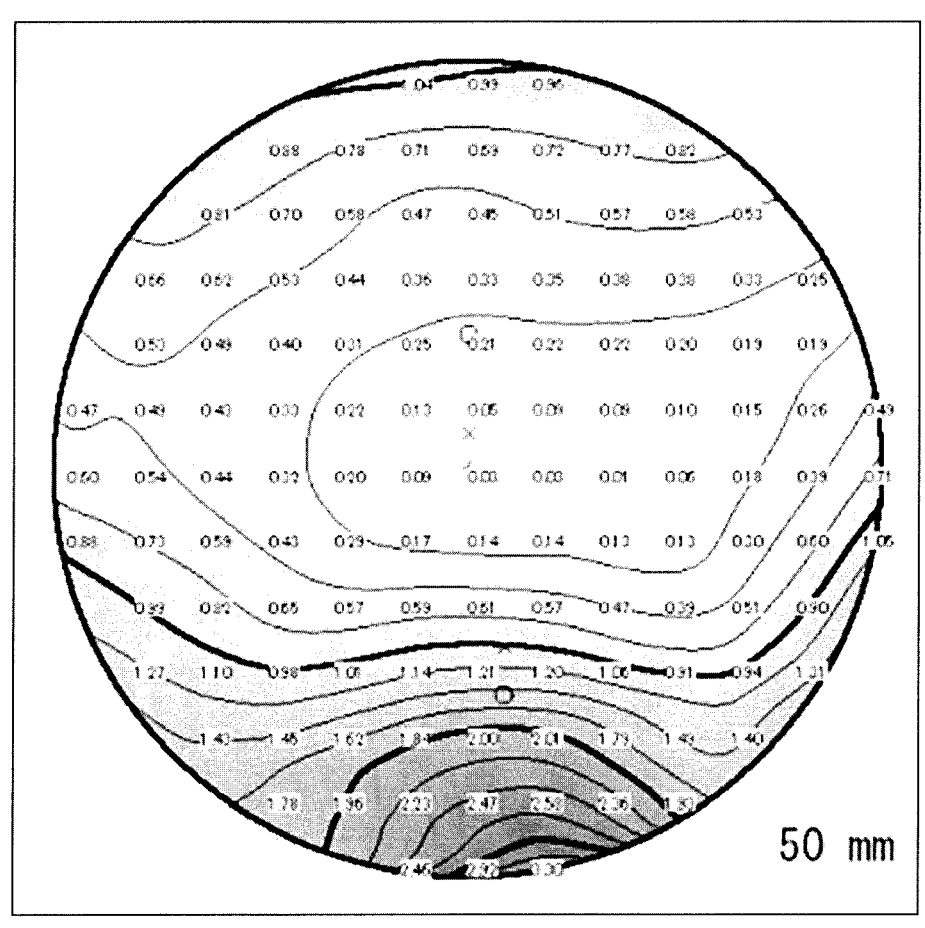
FIG. 40 is a drawing similar to FIG. 5 illustrating the spectacle lens according to Example 7 of the present invention.

FIG. 38 is a drawing illustrating the scalar quantity of prismatic power similar to FIG. 3 in Example 7. FIG. 39 is a drawing illustrating the distortion evaluation value $E_d$ similar to FIG. 4 in Example 7. FIG. 40 is a drawing illustrating the shaking evaluation value $E_s$ similar to FIG. 5 in Example 7.

The distortion evaluation value $E_d$ of Example 7 is small especially in the distance portion of the progressive-power lens, and the shaking evaluation value $E_s$ of Example 7 is small in the center of the spectacle lens GL including the near portion. Accordingly, Example 7 is the progressive-power spectacle lens GL reduced in distortion and shaking while including the near portion and the distance portion.

Example 8 is described below.

Figure 41:
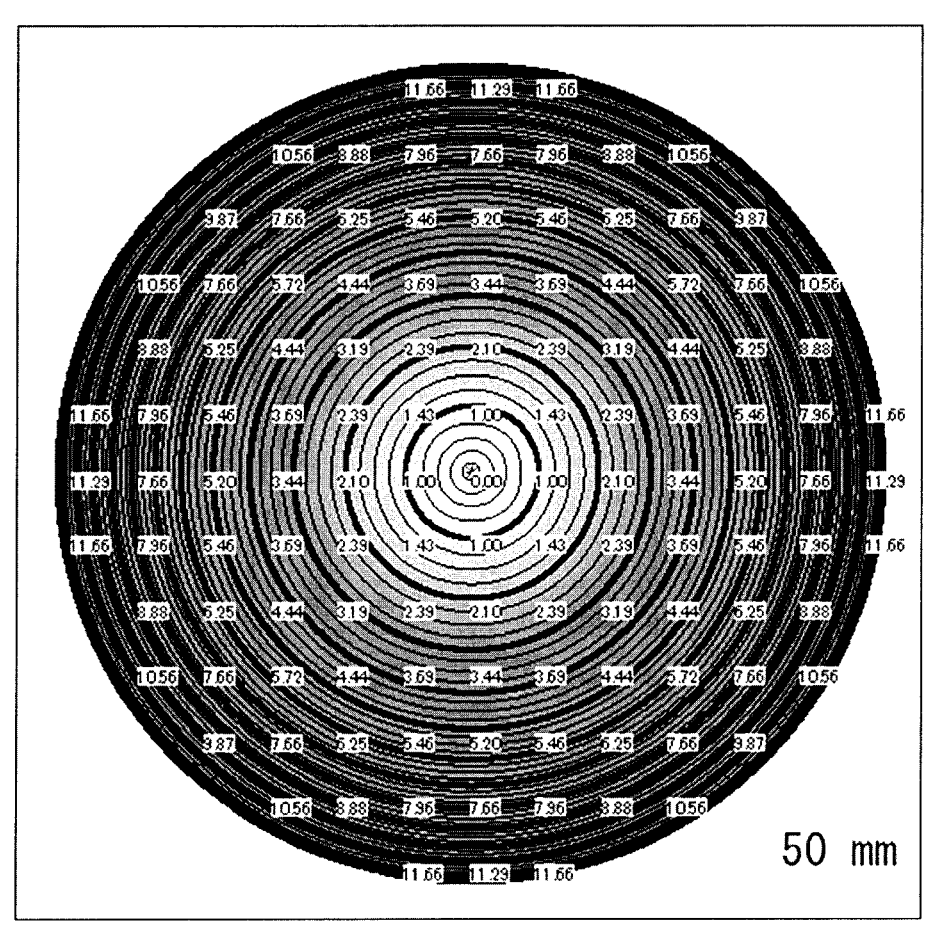
FIG. 41 is a drawing similar to FIG. 3 illustrating a spectacle lens according to Example 8 of the present invention.
Figure 42:
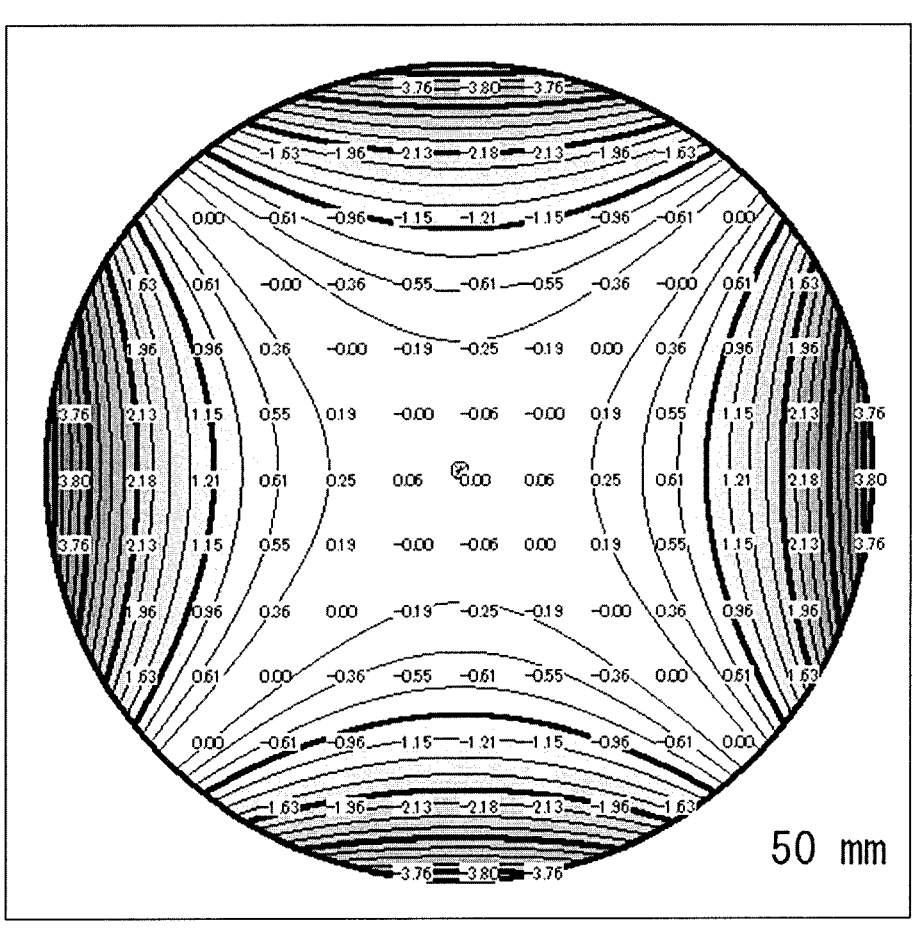
FIG. 42 is a drawing similar to FIG. 4 illustrating the spectacle lens according to Example 8 of the present invention
Figure 43:
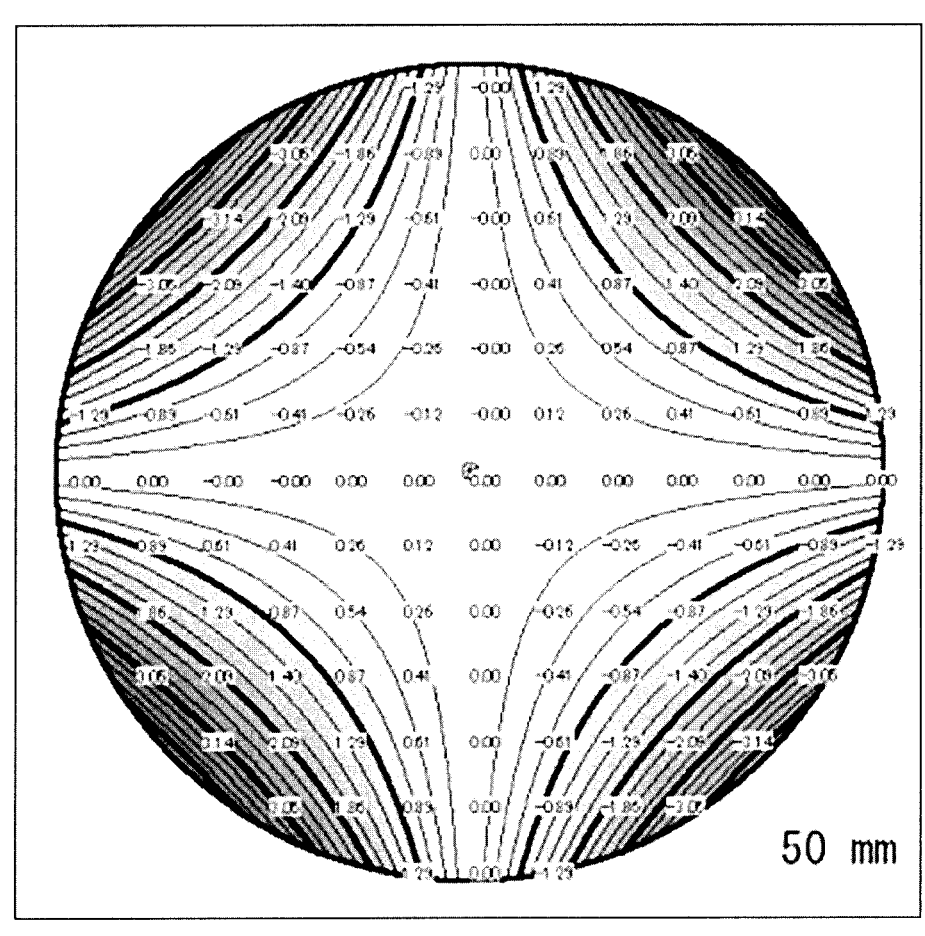
FIG. 43 is a drawing similar to FIG. 5 illustrating the spectacle lens according to Example 8 of the present invention.

Example 8 is a single-vision lens the same as Example 1 evaluated by the performance evaluation device of the third embodiment. FIG. 41 is a drawing illustrating the scalar quantity of prismatic power similar to FIG. 3 in Example 8. FIG. 42 is a drawing illustrating the distortion evaluation value $E_d$ similar to FIG. 4 in Example 8. FIG. 43 is a drawing illustrating the shaking evaluation value $E_s$ similar to FIG. 5 in Example 8.

The distortion evaluation value $E_d$ is calculated by the formula (14), and increases corresponding to the distance from the origin O in up-down and right-left directions. This is consistent with that a wearer of the single-vision lens feels the distortion more strongly toward a periphery of the visual field.

The shaking evaluation value $E_s$ is calculated by the formula (15), and increases corresponding to the distance from the origin O in a diagonal direction from upper right to lower left and a diagonal direction from upper left to lower right. This is consistent with that a wearer of the single-vision lens who feels the shaking easily recognizes the shaking more strongly toward a periphery of the visual field.

As described above, Examples 9 and 10 are unused numbers.

Example 11 is described below.

The spectacle lens GL of Example 11 is the same as the spectacle lens GL of Example 1, and relates to a single-vision lens.

In the spectacle lens GL, the scalar quantity (see formula (20) described above) of the prismatic power by the transmitted light at each point on the front surface GLF is the same as that of FIG. 3 in Example 1.

The vertical prismatic power $P_v$ is calculated by a calculation using the formulas (5A) to (7), (12), and (13). An absolute value of the vertical prismatic power $P_v$ increases corresponding to a distance from the origin O. The horizontal prismatic power $P_h$ is calculated similarly to the vertical prismatic power $P_v$ excluding that the axial direction is the X-axis direction instead of the Y-axis direction.

Figure 44:
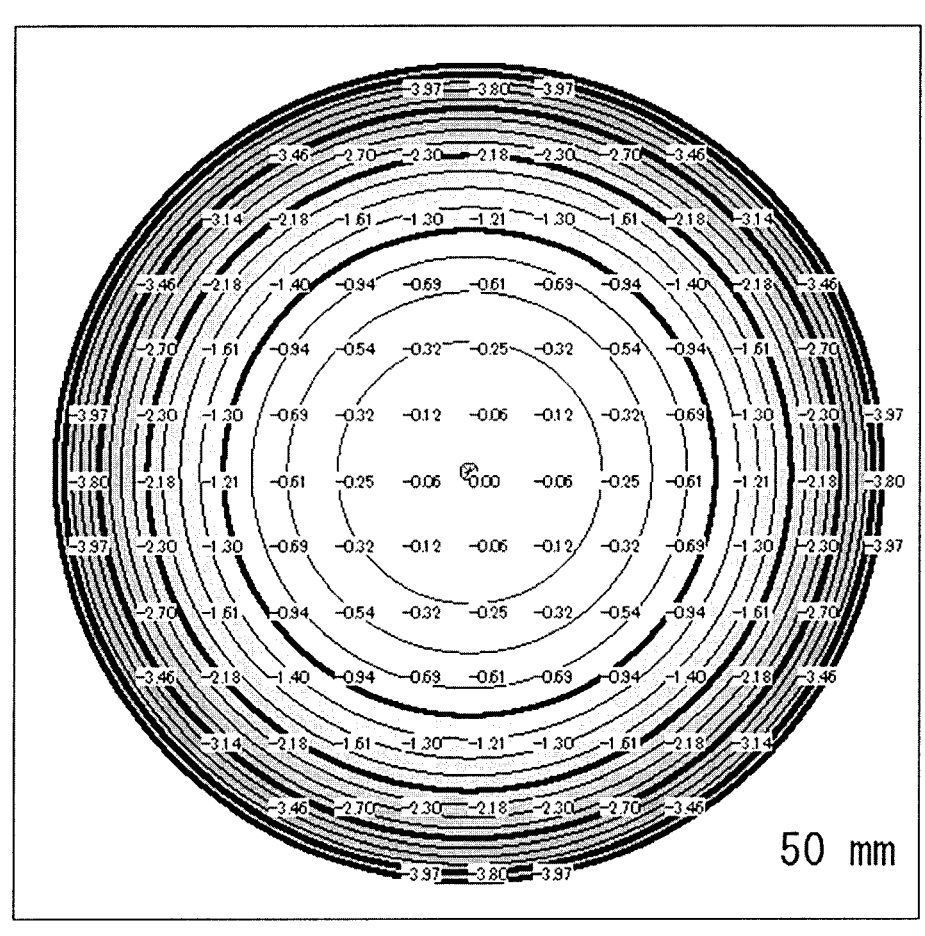
FIG. 44 is a drawing similar to FIG. 4 illustrating a spectacle lens according to Example 11 of the present invention.

FIG. 44 illustrates the distortion evaluation values $E_d$ at respective points calculated by applying the formula (1) to the prism vector P ($P_h$, $P_v$) at respective points and indicated by numerical values at corresponding points. In Example 11, the sign of the distortion evaluation value $E_d$ is negative, and the absolute value of the distortion evaluation value $E_d$ increases corresponding to the distance from the origin O. This is consistent with that a wearer of the single-vision lens feels the distortion more strongly toward a periphery of the visual field.

In Example 11, the shaking evaluation values $E_s$ at respective points are the same as those of FIG. 5 in Example 1.

Example 12 is described below.

The spectacle lens GL of Example 12 is the same as the spectacle lens GL of Example 2, relates to a progressive-power lens, and in more detail, relates to one in the early stage of design (Example 12-1) and one of the final design provided by changing the design based on the evaluation of the distortion and the shaking for the one in the early stage (Example 12-2).

The scalar quantity of the prismatic power in the spectacle lens GL of Example 12-1 is the same as that of FIG. 6 in Example 2-1.

Figure 45:
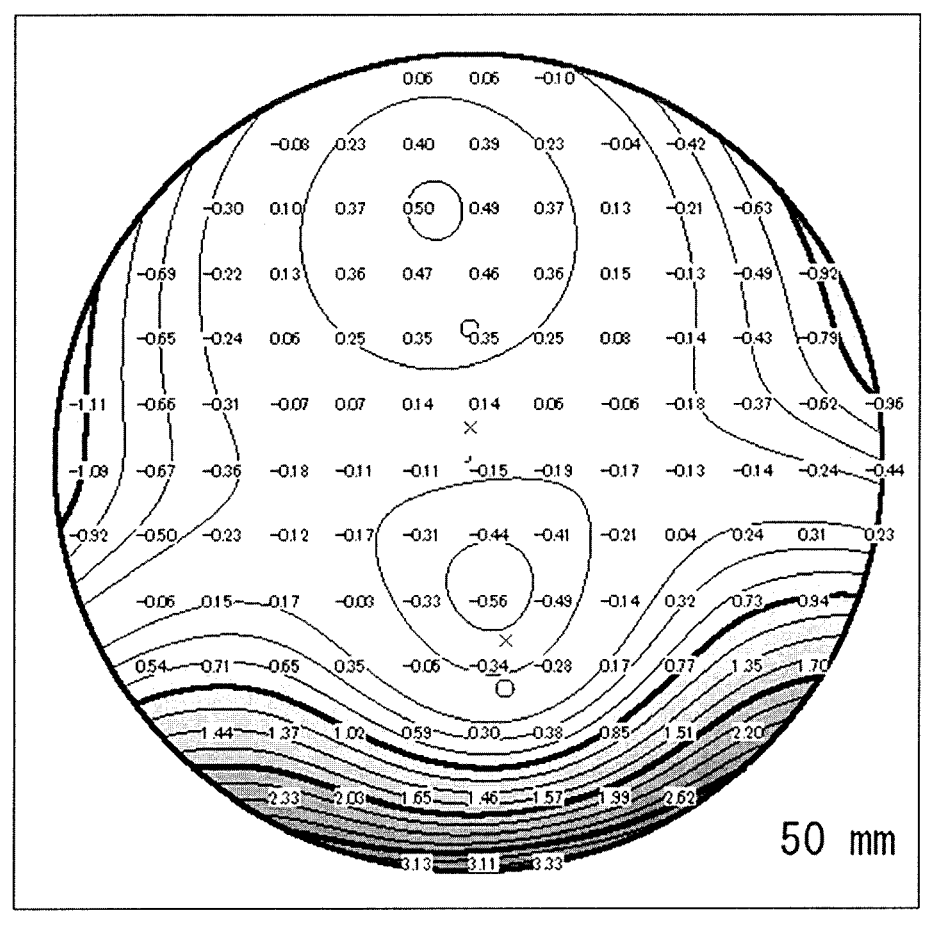
FIG. 45 is a drawing similar to FIG. 4 illustrating a spectacle lens according to Example 12-1 of the present invention.
Figure 46:
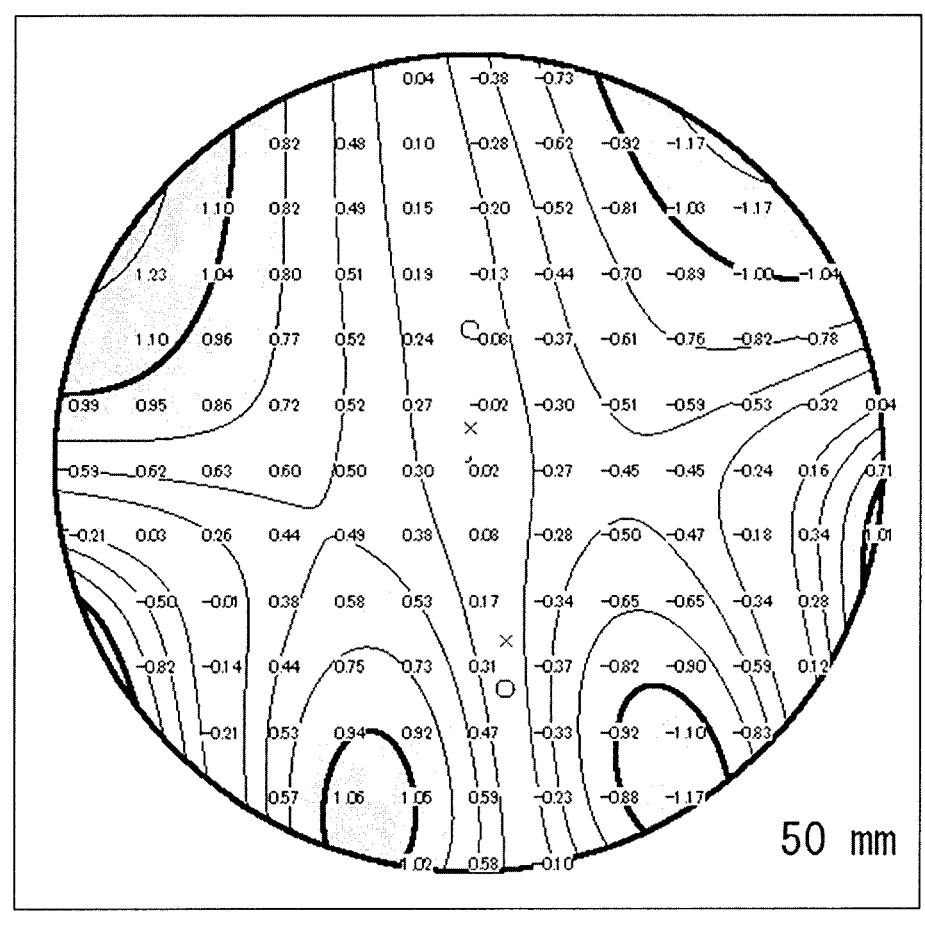
FIG. 46 is a drawing similar to FIG. 5 illustrating the spectacle lens according to Example 12-1 of the present invention.

FIG. 45 is a drawing illustrating the distortion evaluation value $E_d$ in the spectacle lens GL of Example 12-1. FIG. 46 is a drawing illustrating the shaking evaluation value $E_s$ in the spectacle lens GL of Example 12-1.

The distortion evaluation value $E_d$ of Example 12-1 is large in the center of the upper half for distance of the spectacle lens GL. The shaking evaluation value $E_s$ of Example 12-1 is large especially in the lower half for near of the spectacle lens GL, and there is a room for improvement.

Therefore, the designer performed an optimization calculation in which the distortion evaluation value $E_d$ and the shaking evaluation value $E_s$ in the current design were incorporated as a part of the evaluation function by the lens design program, thereby obtaining a shape of the spectacle lens GL of Example 12-2 as a final design. The optimization calculation of the progressive lens was performed similarly to Example 2-2. There is a modification example of the optimization calculation in Example 12-2 similarly to Example 2-2. Another modification example is similarly provided as necessary.

Figure 47:
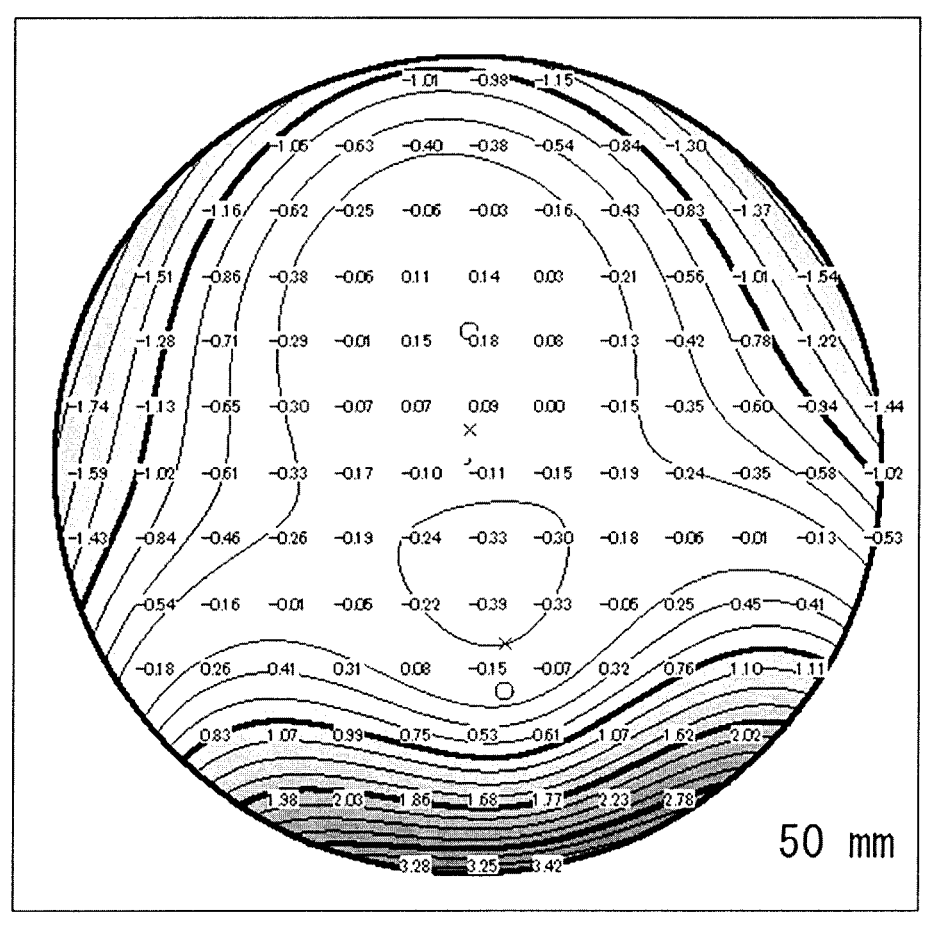
FIG. 47 is a drawing similar to FIG. 4 illustrating a spectacle lens according to Example 12-2 of the present invention.
Figure 48:
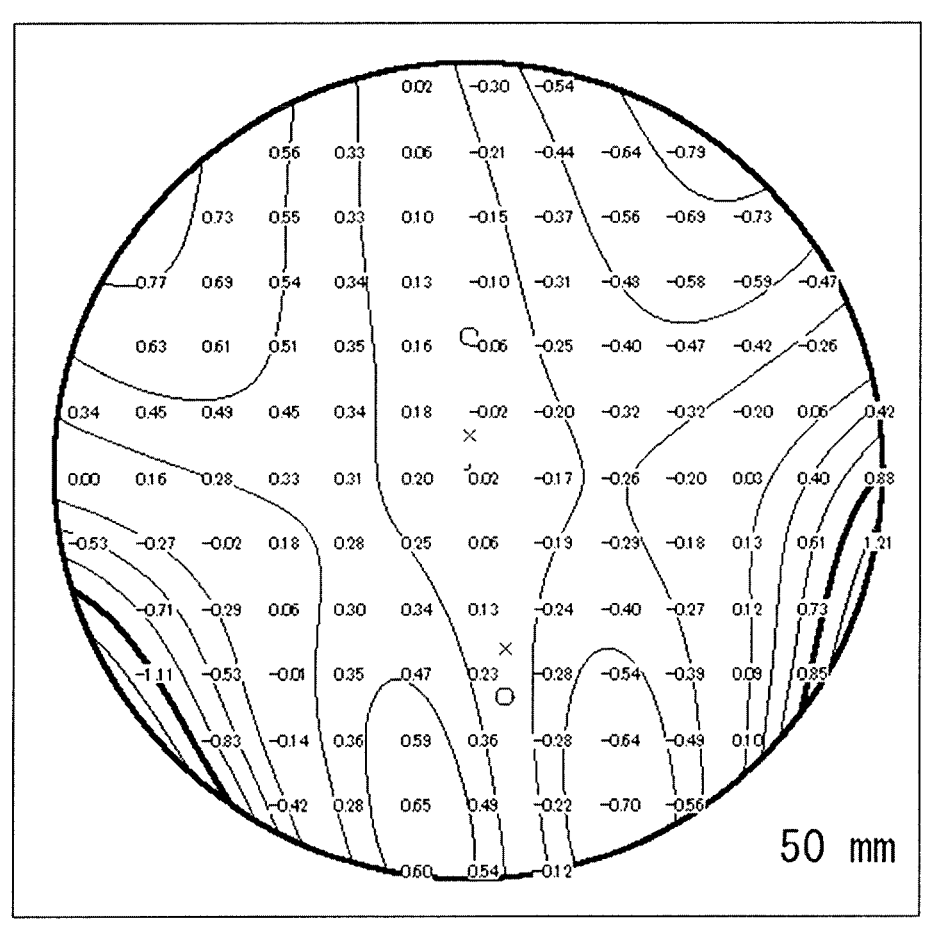
FIG. 48 is a drawing similar to FIG. 5 illustrating the spectacle lens according to Example 12-2 of the present invention.

The scalar quantity of the prismatic power in the spectacle lens GL of Example 12-2 is the same as that of FIG. 9 in Example 2-2. FIG. 47 is a drawing illustrating the distortion evaluation value $E_d$ in the spectacle lens GL of Example 12-2. FIG. 48 is a drawing illustrating the shaking evaluation value $E_s$ in the spectacle lens GL of Example 12-2.

Figure 49:
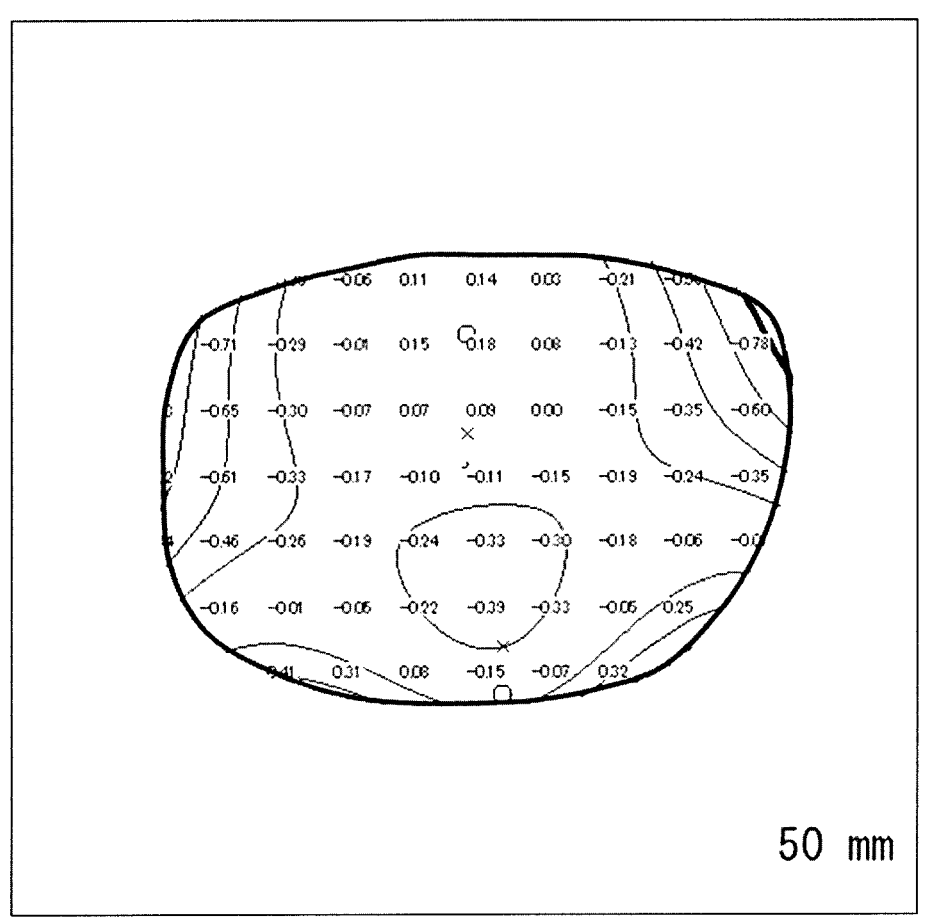
FIG. 49 is a drawing when
Figure 50:
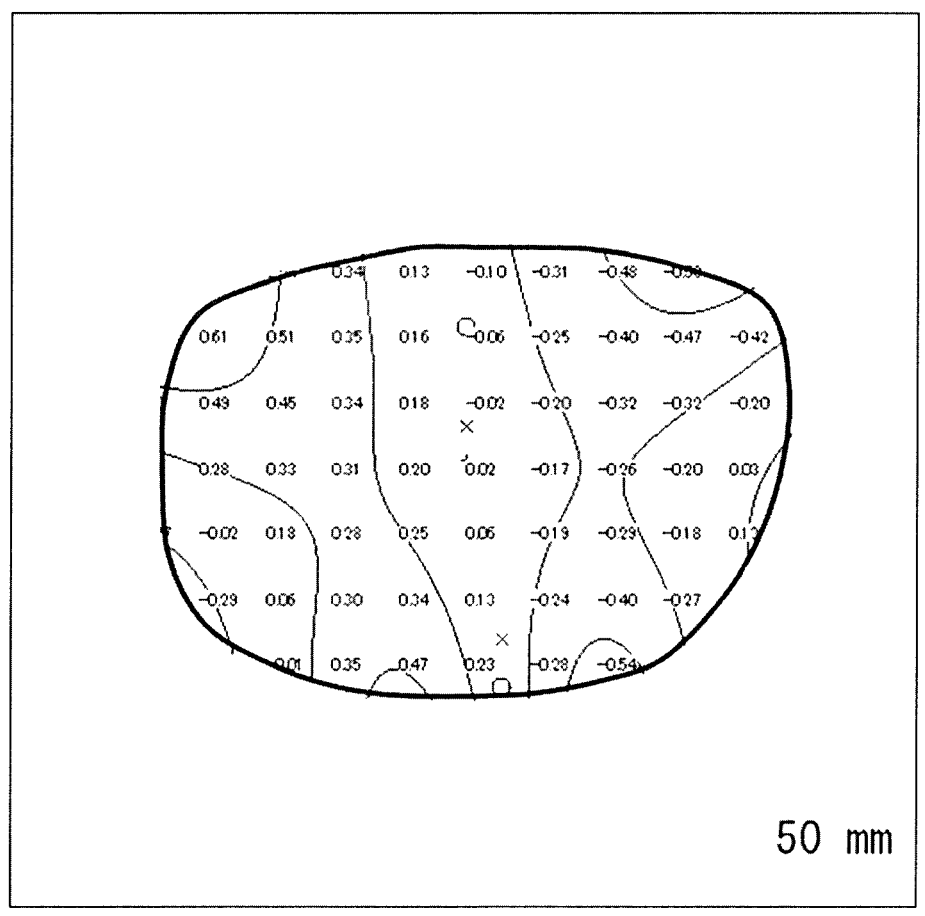
FIG. 50 is a drawing when

While the absolute value of the distortion evaluation value $E_d$ of Example 12-2 is large in a part of a peripheral portion in the upper half of the spectacle lens GL compared with Example 12-1, the distortion evaluation value $E_d$ of Example 12-2 is small in the center heavily used in distant vision compared with Example 12-1. Accordingly, Example 12-2 is the spectacle lens GL reduced in distortion especially for distance compared with Example 12-1. The spectacle lens GL of Example 12-2 is subjected to lens shape processing to be actually framed in a spectacle frame as illustrated in FIG. 49 (distortion) and FIG. 50 (shaking), and the peripheral portion of the spectacle lens GL in which the distortion evaluation value $E_d$ is large compared with Example 12-1 is cut during the lens shape processing.

The absolute value of the shaking evaluation value $E_s$ of Example 12-2 is small in approximately the whole region excluding a part of the peripheral portion of the spectacle lens GL, and small especially in the lower half of the spectacle lens GL. The peripheral portion is cut during the lens shape processing. Accordingly, Example 12-2 is the spectacle lens GL reduced in shaking, and more reduced in shaking especially for near compared with Example 12-1.

When spectacles in which the spectacle lenses GL according to Examples 12-1, 12-2 were subjected to the lens shape processing and framed were prepared, and several persons were asked to wear the spectacles and check visibilities, it was confirmed that the distortion and the shaking were reduced in the spectacles of Example 12-2 compared with those of Example 12-1 for all of the wearers although there were some differences in degree.

In the spectacle lens GL of Example 12-2, the scalar quantity of the prismatic power regarding the parallel light is the same as that of FIG. 14 in Example 2-2.

Figure 51:
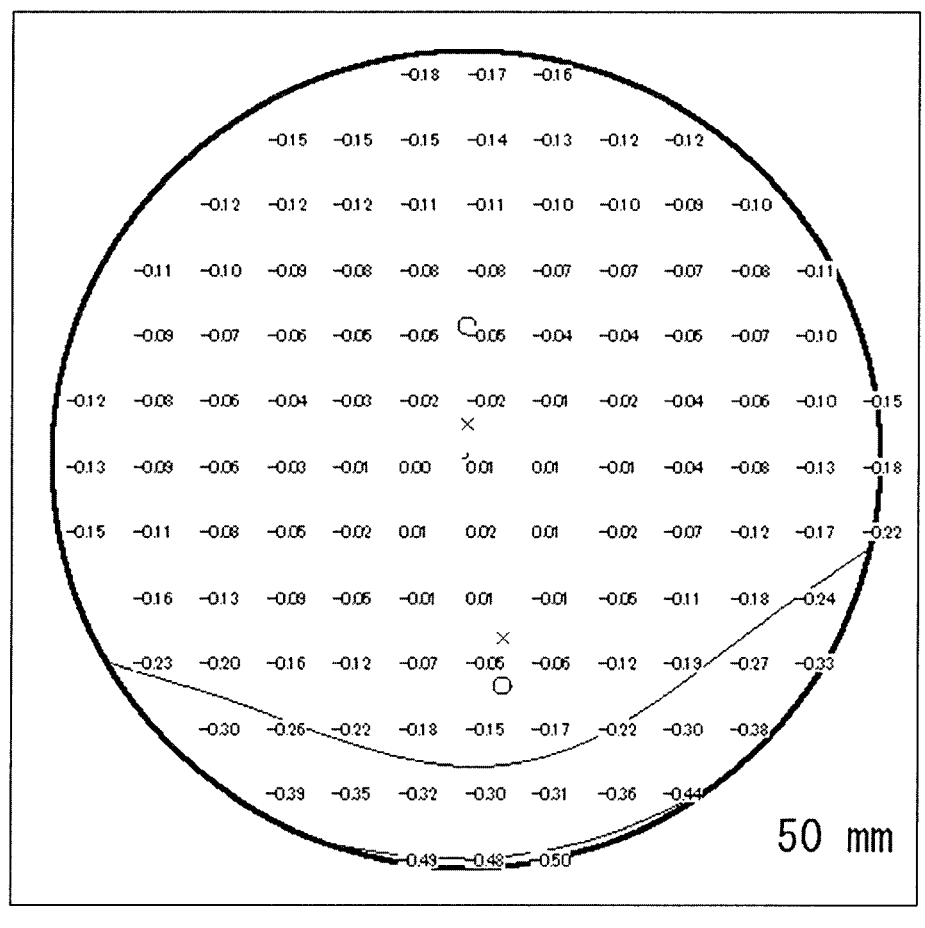
FIG. 51 is a schematic diagram illustrating distortion evaluation values at respective points on a front surface of the spectacle lens according to Example 12-2 of the present invention based on a vertical prismatic power by the parallel light or the like by numerical values at corresponding points.
Figure 52:
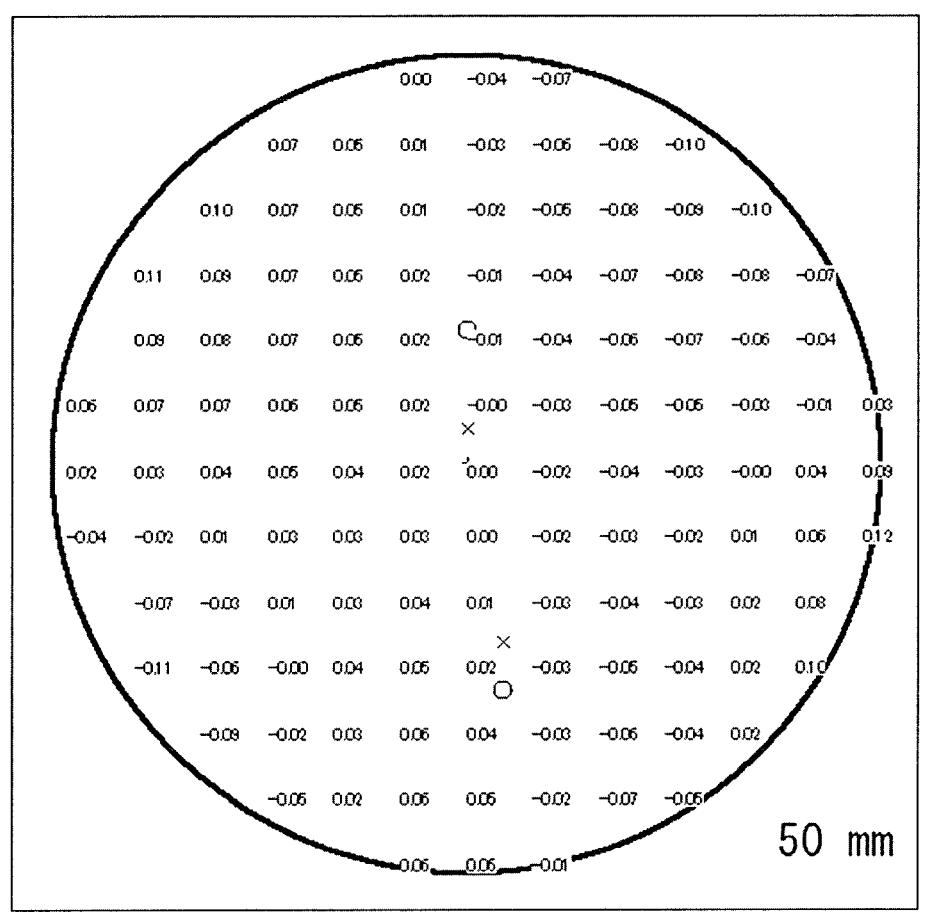
FIG. 52 is a schematic diagram illustrating shaking evaluation values at respective points on the front surface of the spectacle lens according to Example 12-2 of the present invention based on a vertical prismatic power by the parallel light or the like by numerical values at corresponding points.

Further, for the spectacle lens GL of Example 12-2, FIG. 51 is a drawing of the distortion evaluation value $E_d$ regarding the parallel light, and FIG. 52 is a drawing of the shaking evaluation value $E_s$.

Further, for the spectacle lens GL of Example 12-2, the scalar quantity of the prismatic power regarding the back surface vertical light is the same as that of FIG. 17 in Example 2-2.

US 12,607,879 B2

19

20

Figure 53:
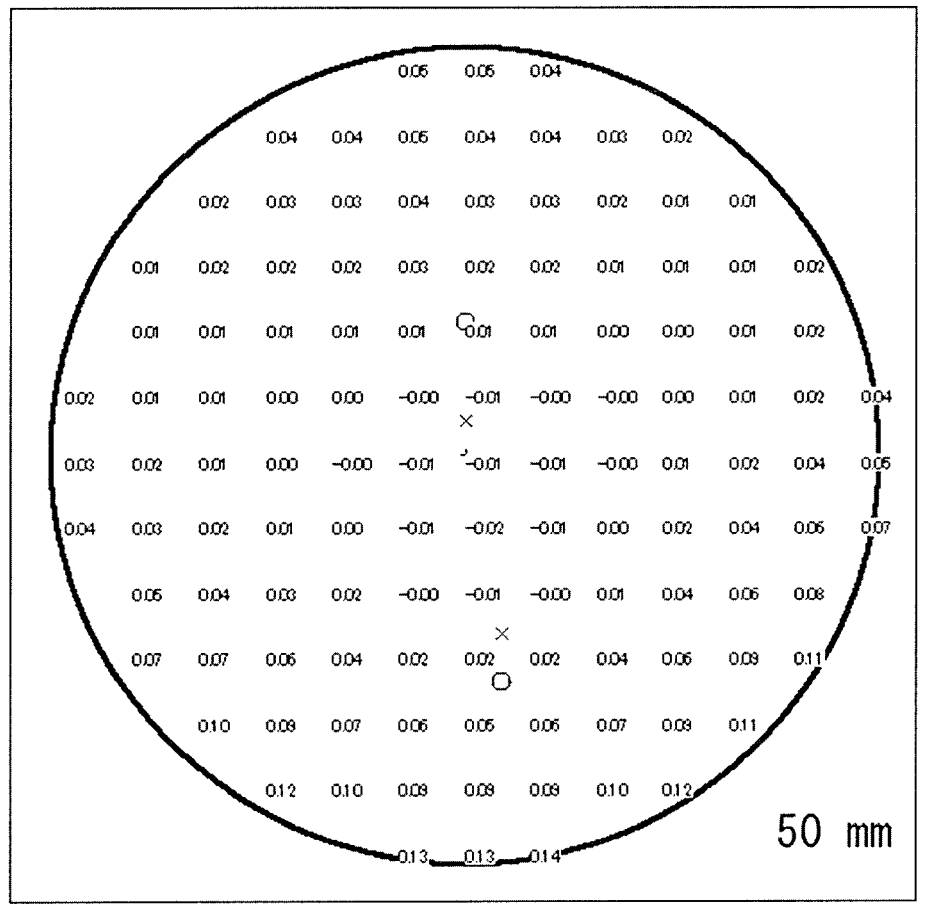
FIG. 53 is a schematic diagram illustrating distortion evaluation values at respective points on the front surface of the spectacle lens according to Example 12-2 of the present invention based on a vertical prismatic power by the back surface vertical light or the like by numerical values at corresponding points.
Figure 54:
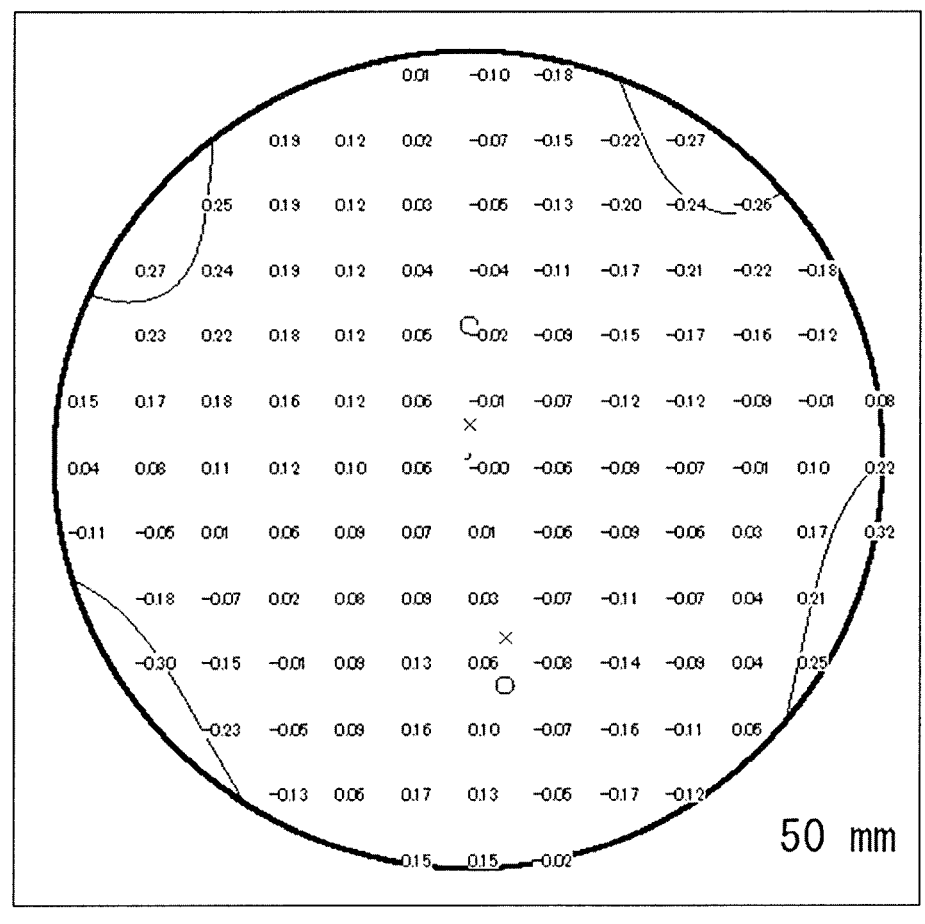
FIG. 54 is a schematic diagram illustrating shaking evaluation values at respective points on the front surface of the spectacle lens according to Example 12-2 of the present invention based on a vertical prismatic power by the back surface vertical light or the like by numerical values at corresponding points.

In addition, for the spectacle lens GL of Example 12-2, FIG. 53 is a drawing of the distortion evaluation value $E_d$ regarding the back surface vertical light, and FIG. 54 is a drawing of the shaking evaluation value $E_s$.

As illustrated in the drawings, even with the parallel light or the back surface vertical light, the distortion evaluation value $E_d$ and the shaking evaluation value $E_s$ can be calculated, and the distortion and the shaking can be evaluated, therefore, the spectacle lens can be designed based on at least one of them.

Example 13 is described below.

The spectacle lens GL of Example 13 relates to a progressive-power lens, and is configured similarly to Example 12-2 excluding the design. The refractive index, the S power, the addition power, the progressive band length, and the front curve of the spectacle lens GL of Example 13 are the same as those of Example 12-2.

Figure 55:
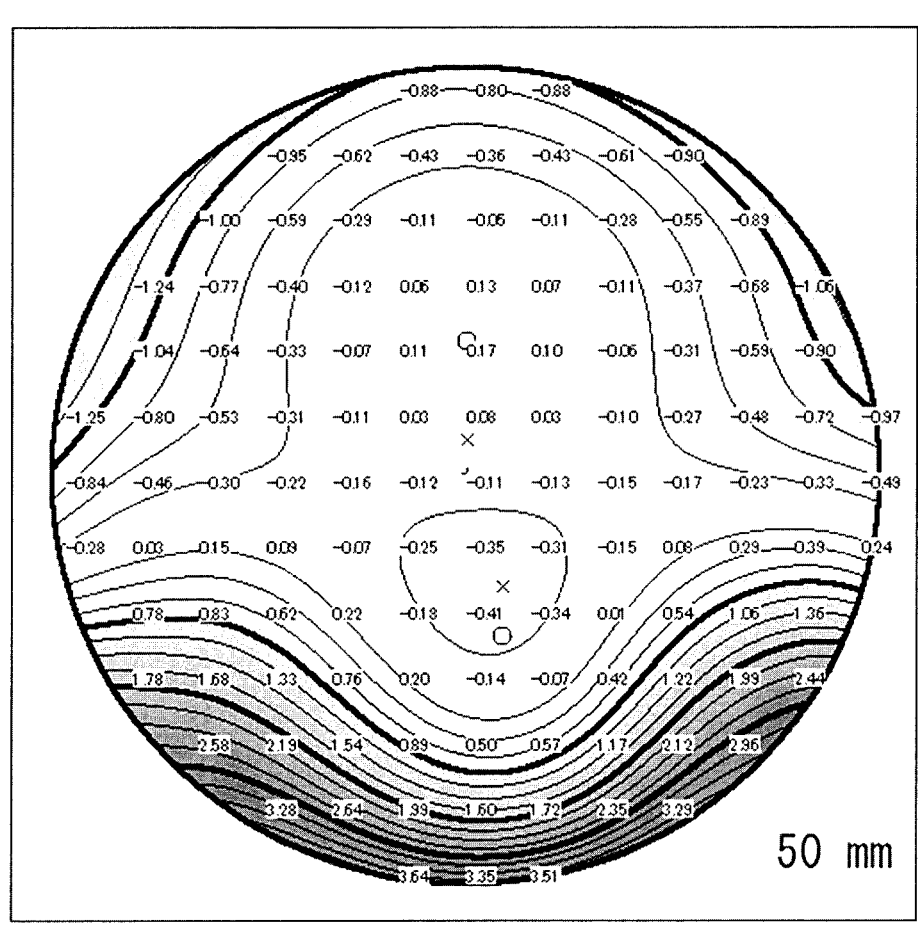
FIG. 55 is a drawing similar to FIG. 4 illustrating a spectacle lens according to Example 13 of the present invention.
Figure 56:
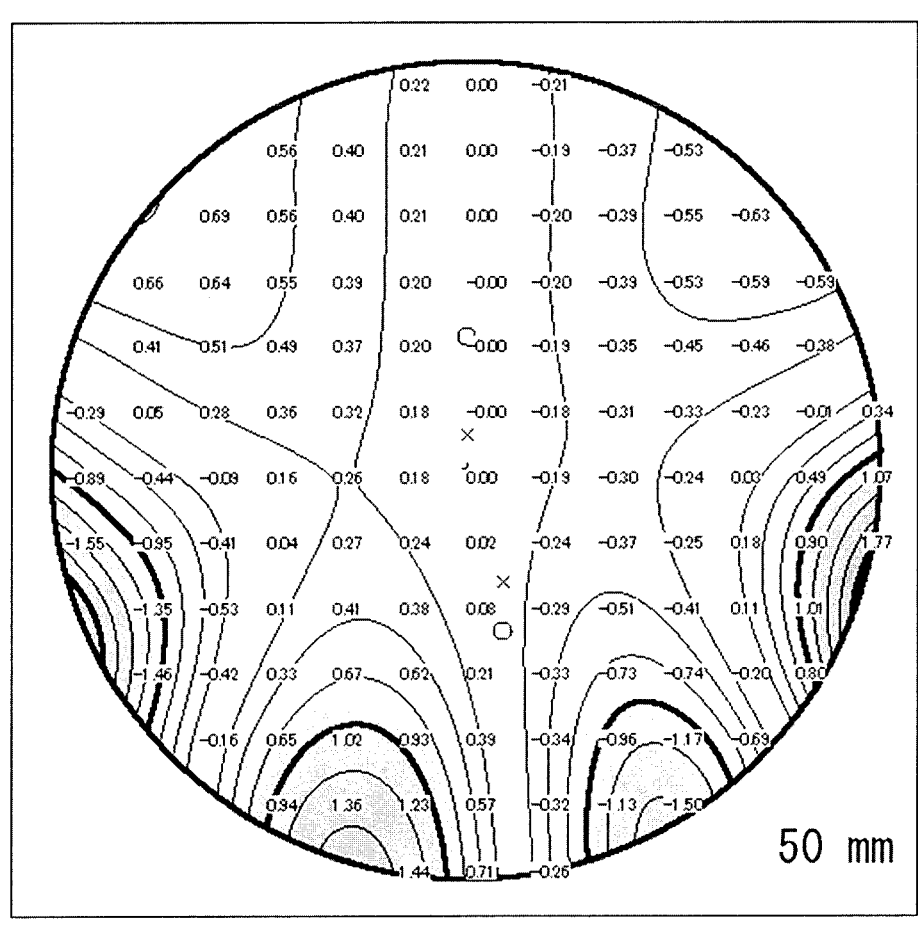
FIG. 56 is a drawing similar to FIG. 5 illustrating the spectacle lens according to Example 13 of the present invention.
Figure 57:
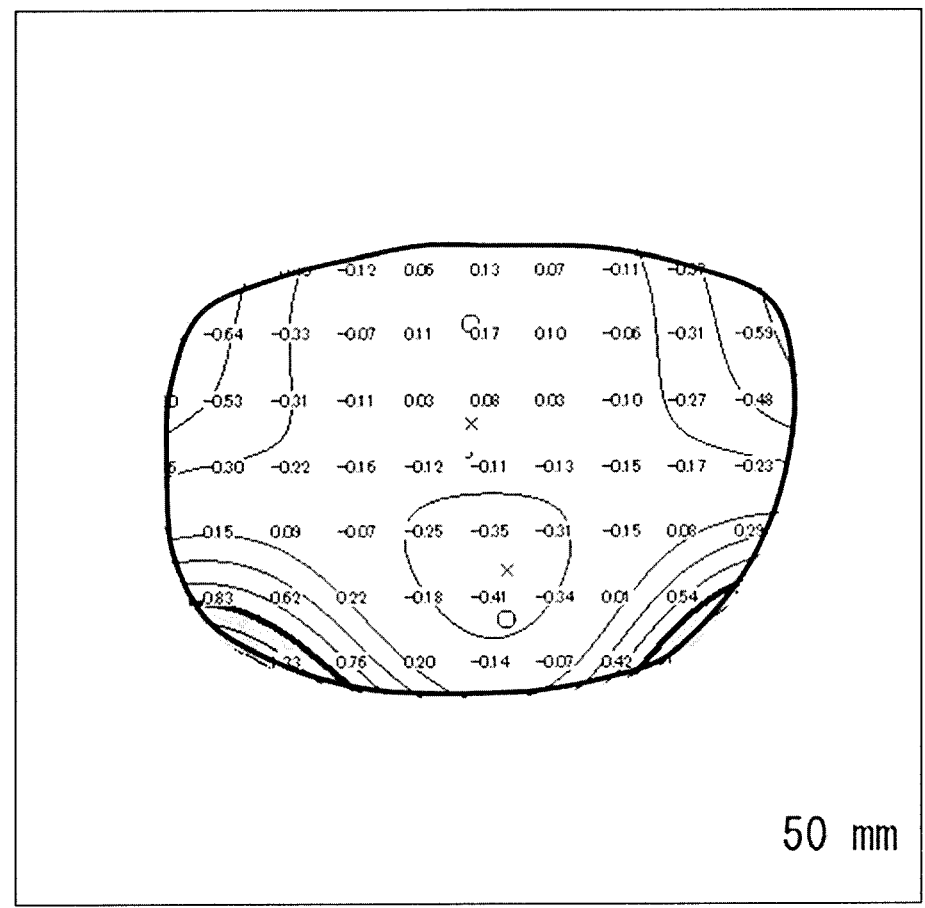
FIG. 57 is a drawing similar to FIG. 49 illustrating the spectacle lens according to Example 13 of the present invention.
Figure 58:
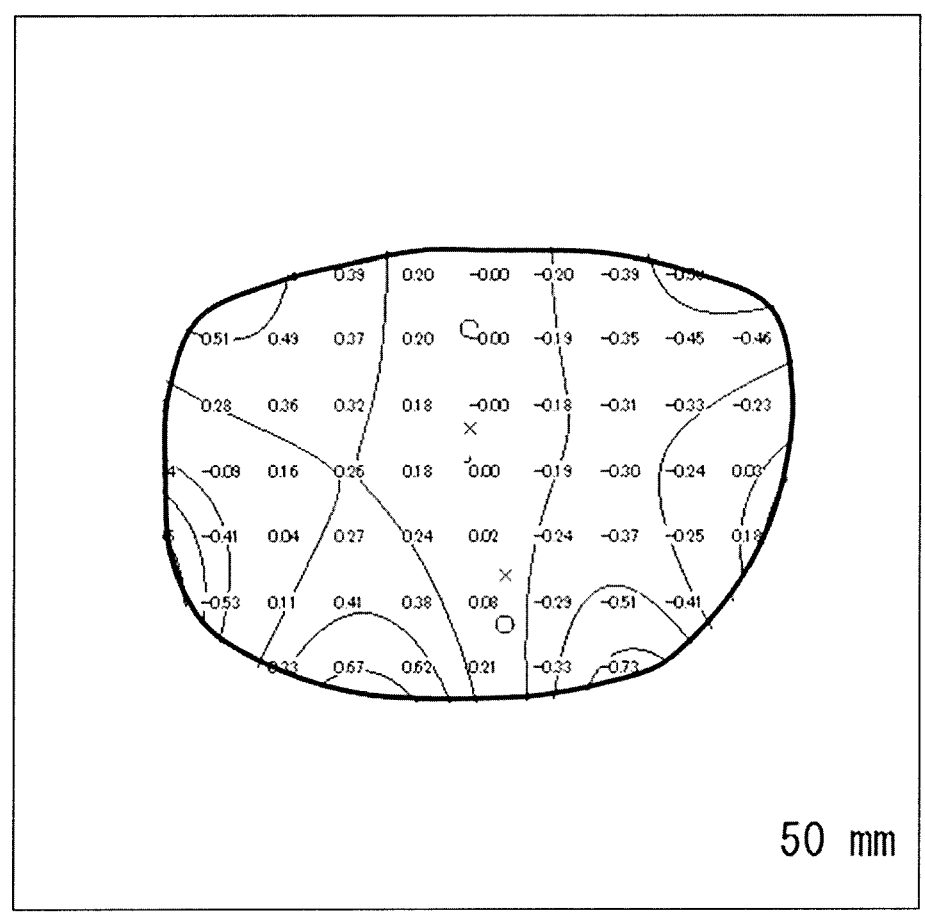
FIG. 58 is a drawing similar to FIG. 50 illustrating the spectacle lens according to Example 13 of the present invention.

The scalar quantity of the prismatic power in Example 13 is the same as that of FIG. 20 in Example 3. FIG. 55 is a drawing illustrating the distortion evaluation value $E_d$ in Example 13. FIG. 56 is a drawing illustrating the shaking evaluation value $E_s$ in Example 13. FIG. 57 and FIG. 58 are drawings similar to FIG. 49 and FIG. 50 regarding the lens shape processing in Example 13.

The distortion evaluation value $E_d$ of Example 13 is small especially in the distance portion after the lens shape processing, and the shaking evaluation value $E_s$ of Example 13 is small in the whole spectacle lens GL including the near portion after the lens shape processing. Accordingly, Example 13 is the progressive-power spectacle lens GL reduced in distortion and shaking while including the near portion and the distance portion.

Example 14 is described below.

The spectacle lens GL of Example 14 relates to a progressive-power lens, and is configured similarly to Example 12-2 excluding the design and the front curve. The refractive index, the S power, the addition power, and the progressive band length of the spectacle lens GL of Example 14 are the same as those of Example 12-2.

Figure 59:
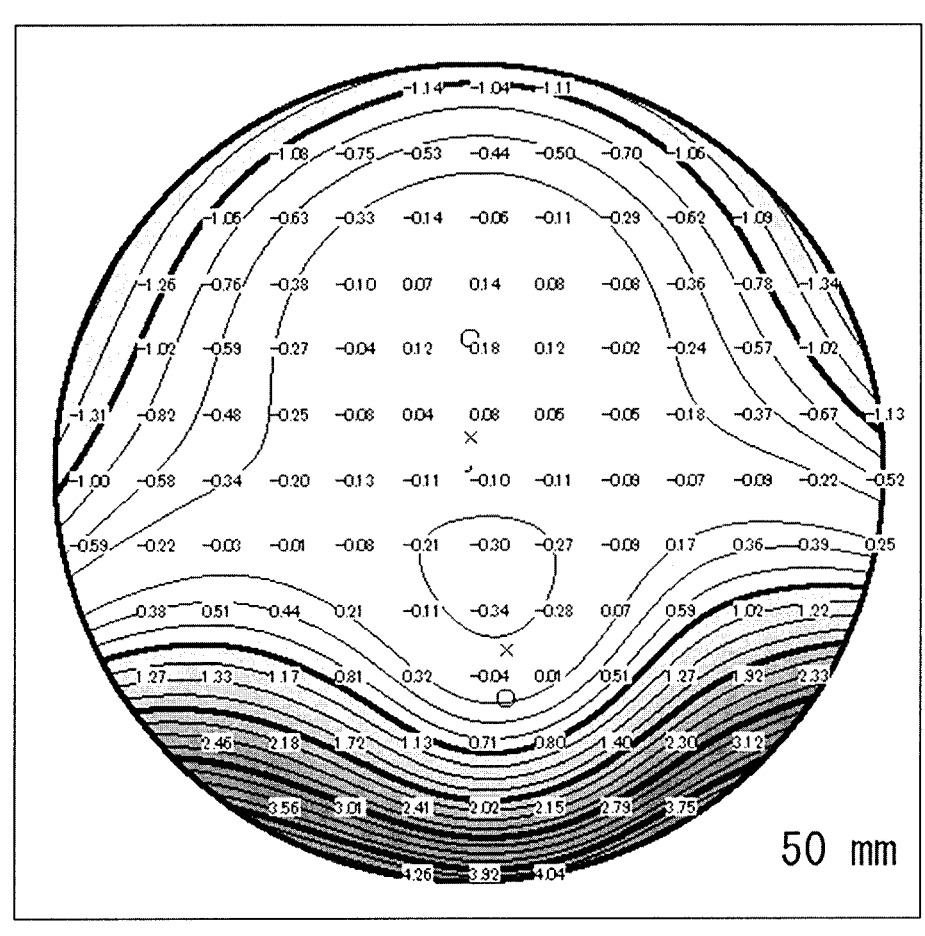
FIG. 59 is a drawing similar to FIG. 4 illustrating a spectacle lens according to Example 14 of the present invention.
Figure 60:
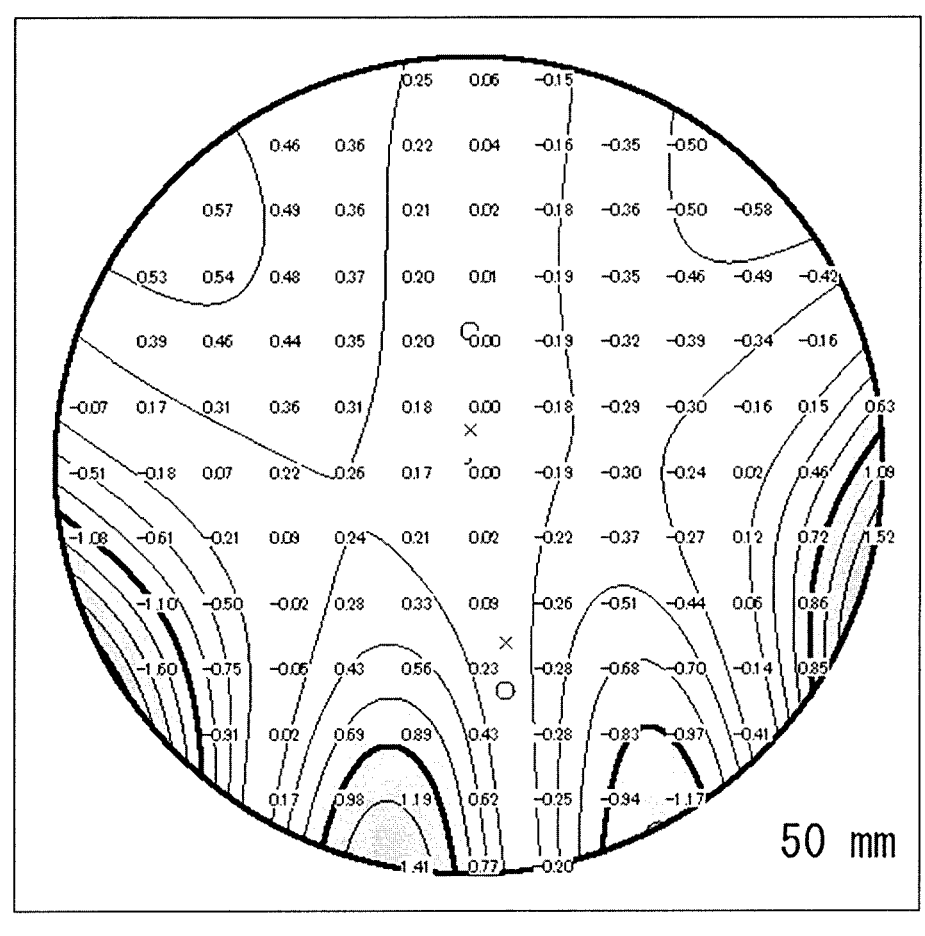
FIG. 60 is a drawing similar to FIG. 5 illustrating the spectacle lens according to Example 14 of the present invention.
Figure 61:
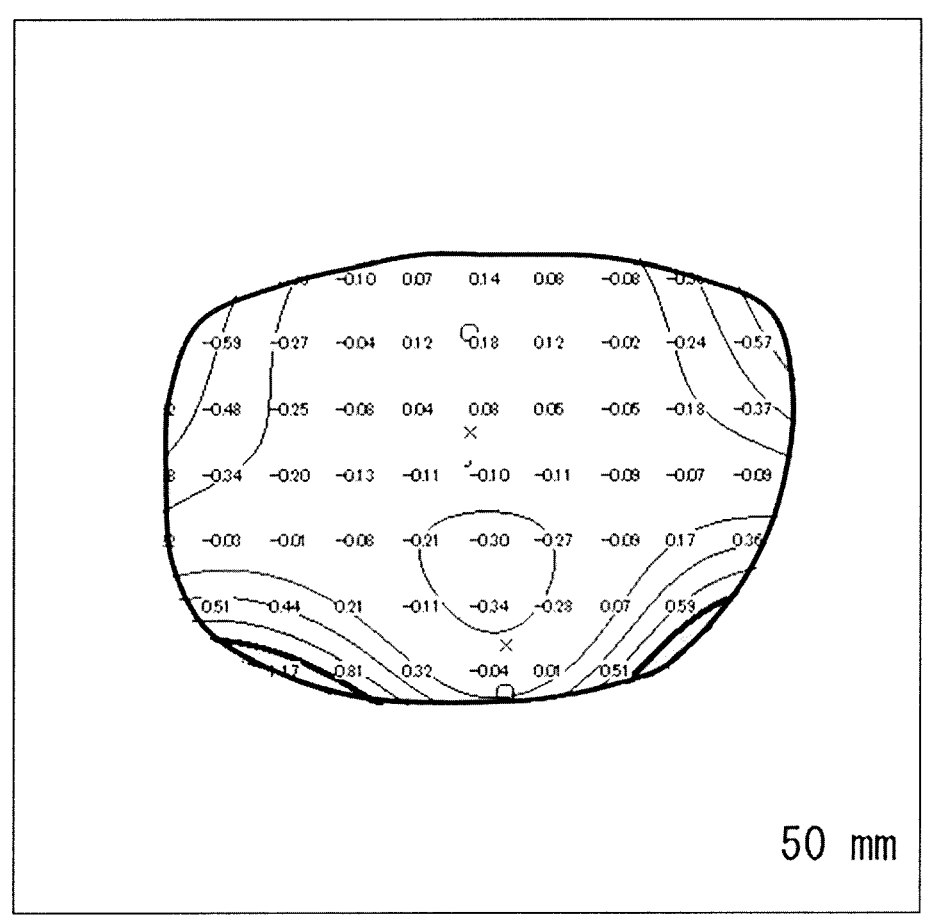
FIG. 61 is a drawing similar to FIG. 49 illustrating the spectacle lens according to Example 14 of the present invention.
Figure 62:
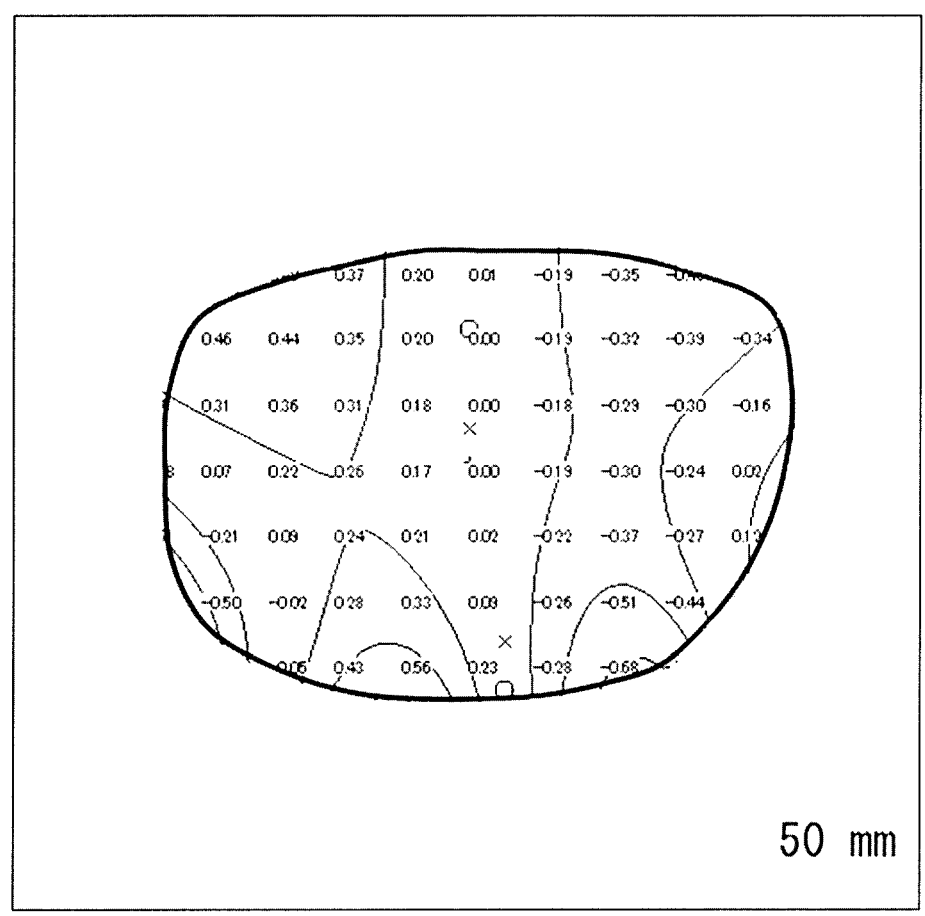
FIG. 62 is a drawing similar to FIG. 50 illustrating the spectacle lens according to Example 14 of the present invention.

The scalar quantity of the prismatic power in Example 14 is the same as that of FIG. 25 in Example 4. FIG. 59 is a drawing illustrating the distortion evaluation value $E_d$ in Example 14. FIG. 60 is a drawing illustrating the shaking evaluation value $E_s$ in Example 14. FIG. 61 and FIG. 62 are drawings similar to FIG. 49 and FIG. 50 regarding the lens shape processing in Example 14.

The curve value of the front surface GLF of the spectacle lens GL of Example 14 is 4.00.

The spectacle lens GL of Example 14 is entirely reduced in average dioptric power of the spectacle lens GL of Example 13, and an arrangement of the near portion and a change pattern of focal point in Example 14 are similar to those of Example 13. Accordingly, the distortion evaluation value $E_d$ and the shaking evaluation value $E_s$ in Example 14 are further reduced compared with Example 13.

Example 15 is described below.

The spectacle lens GL of Example 15 relates to a progressive-power lens, and is configured similarly to Example 12-2 excluding the design and the progressive band length. The refractive index, the S power, the addition power, and the front curve of the spectacle lens GL of Example 15 are the same as those of Example 12-2.

Figure 63:
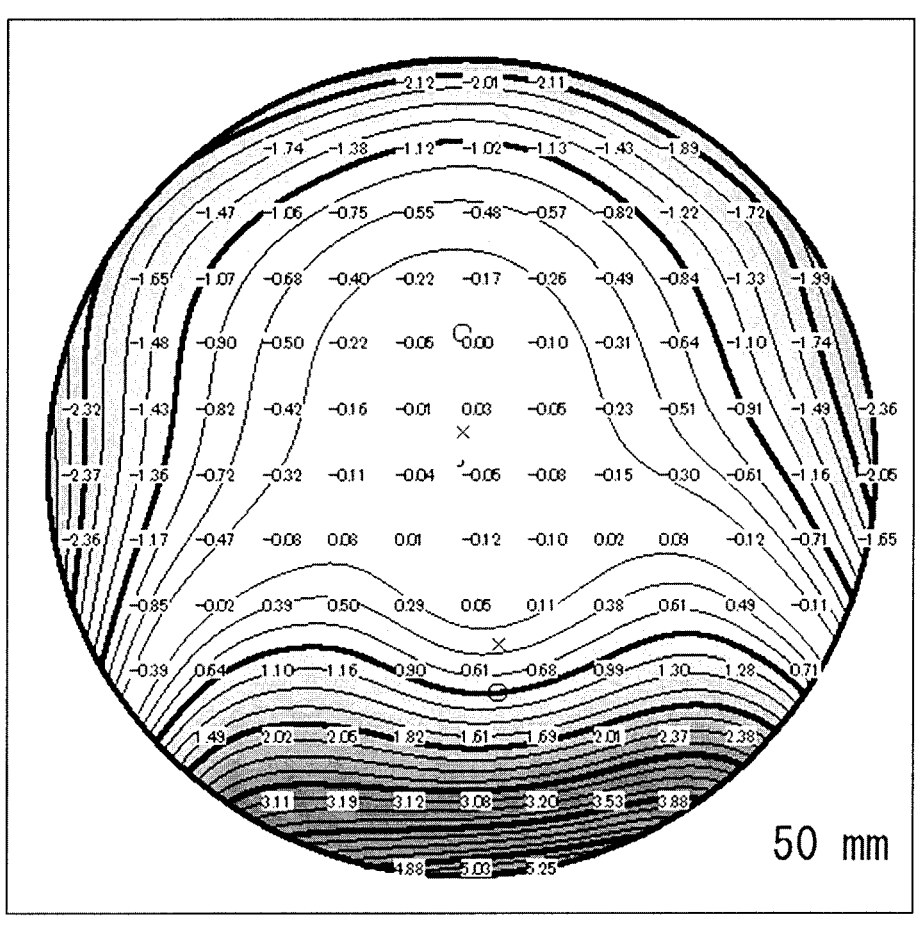
FIG. 63 is a drawing similar to FIG. 4 illustrating a spectacle lens according to Example 15 of the present invention.
Figure 64:
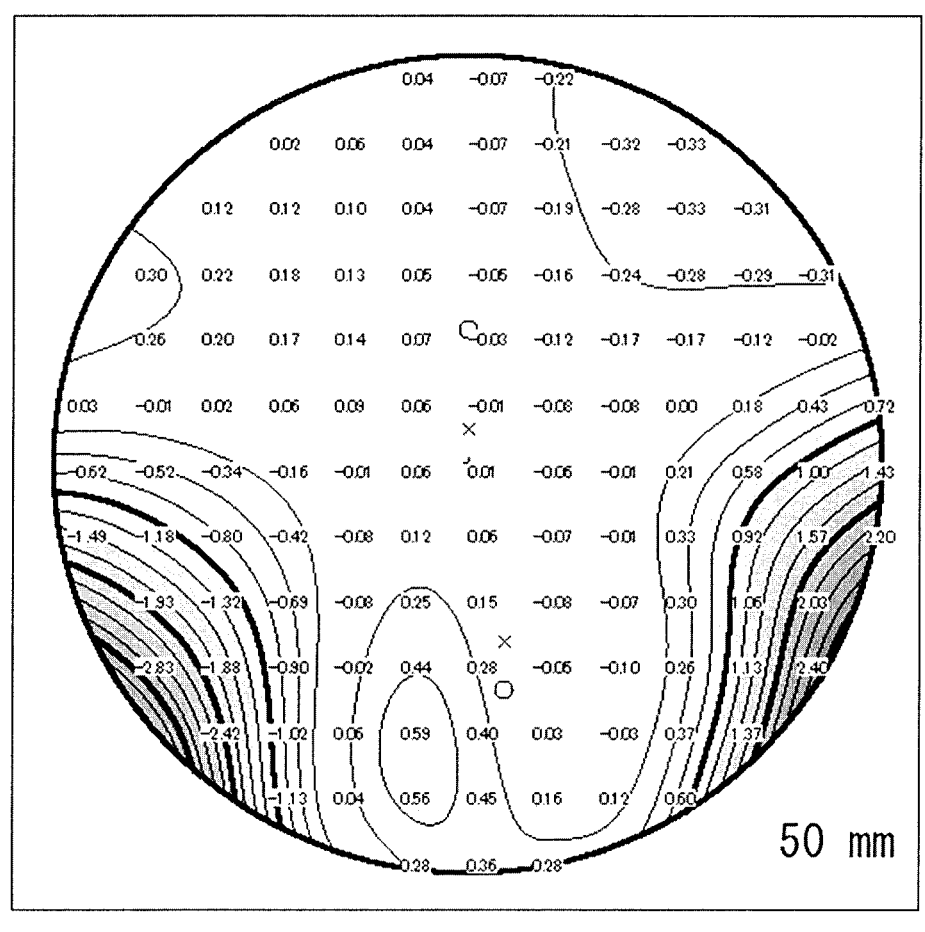
FIG. 64 is a drawing similar to FIG. 5 illustrating the spectacle lens according to Example 15 of the present invention.
Figure 65:
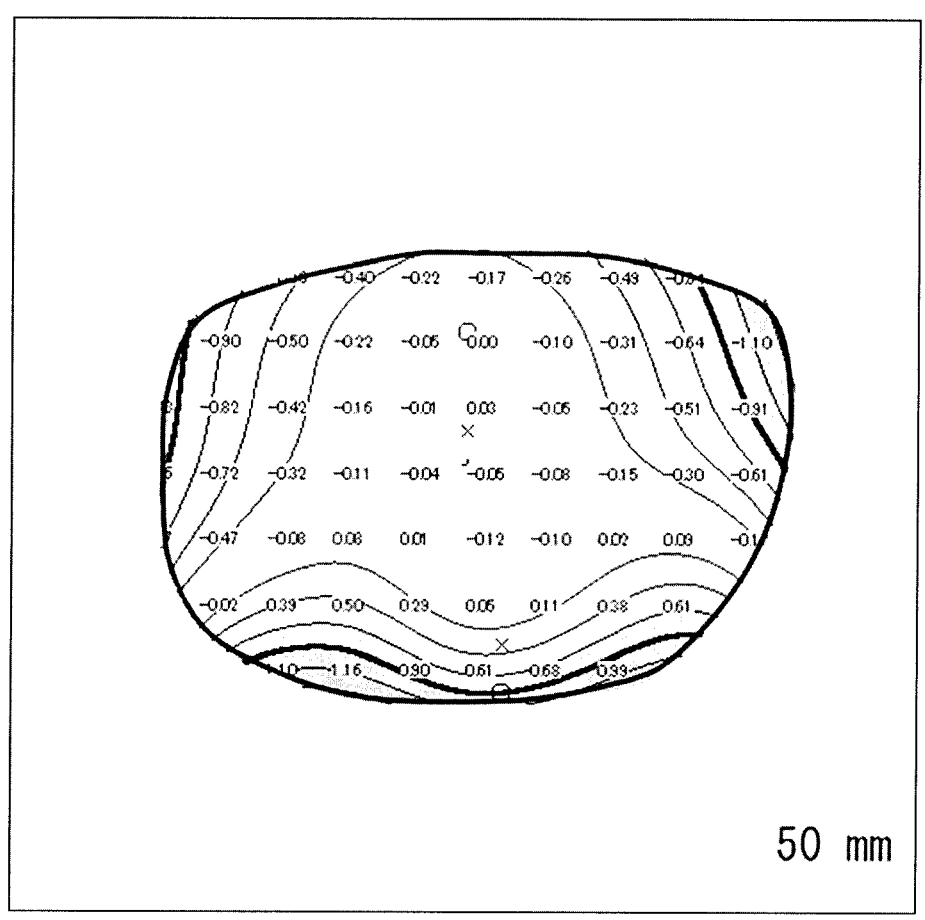
FIG. 65 is a drawing similar to FIG. 49 illustrating the spectacle lens according to Example 15 of the present invention.
Figure 66:
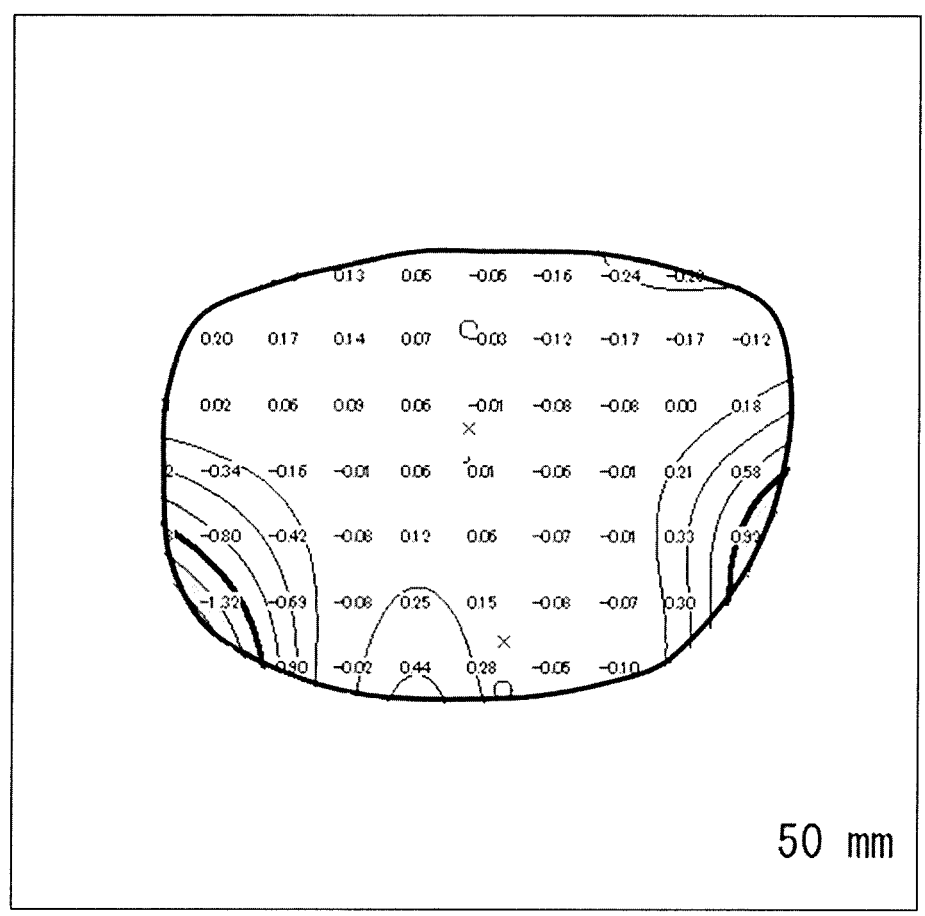
FIG. 66 is a drawing similar to FIG. 50 illustrating the spectacle lens according to Example 15 of the present invention.

The scalar quantity of the prismatic power in Example 15 is the same as that of FIG. 30 in Example 5. FIG. 63 is a drawing illustrating the distortion evaluation value $E_d$ in Example 15. FIG. 64 is a drawing illustrating the shaking evaluation value $E_s$ in Example 15. FIG. 65 and FIG. 66 are drawings similar to FIG. 49 and FIG. 50 regarding the lens shape processing in Example 15.

The curve value of the front surface GLF of the spectacle lens GL of Example 15 is 4.40, and the progressive band length is 9 mm.

The spectacle lens GL of Example 15 is also reduced in the distortion evaluation value $E_d$ and the shaking evaluation value $E_s$ especially after the lens shape processing, and can be evaluated to be reduced in distortion and shaking.

As described above, Examples 16 and 17 are unused numbers.

Example 18 is described below.

Example 18 is a single-vision lens the same as Example 1 evaluated by the performance evaluation device of the fifth embodiment.

Figure 67:
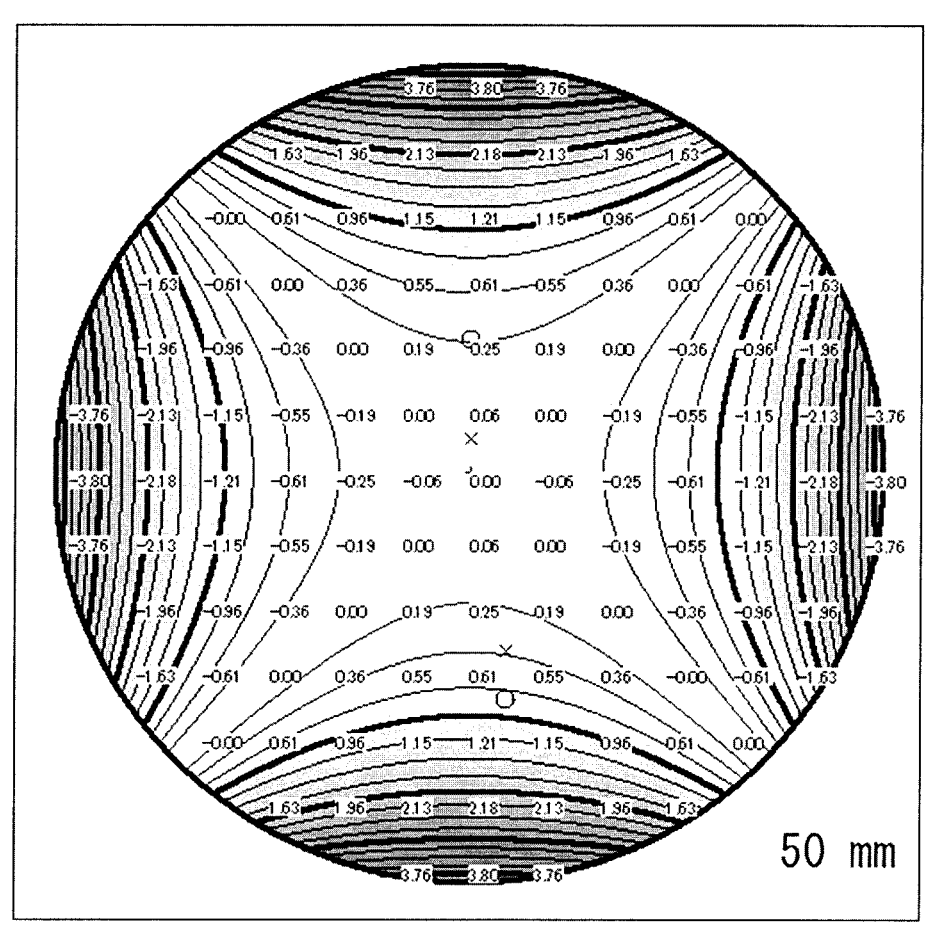
FIG. 67 is a drawing similar to FIG. 4 illustrating a spectacle lens according to Example 18 of the present invention.
Figure 68:
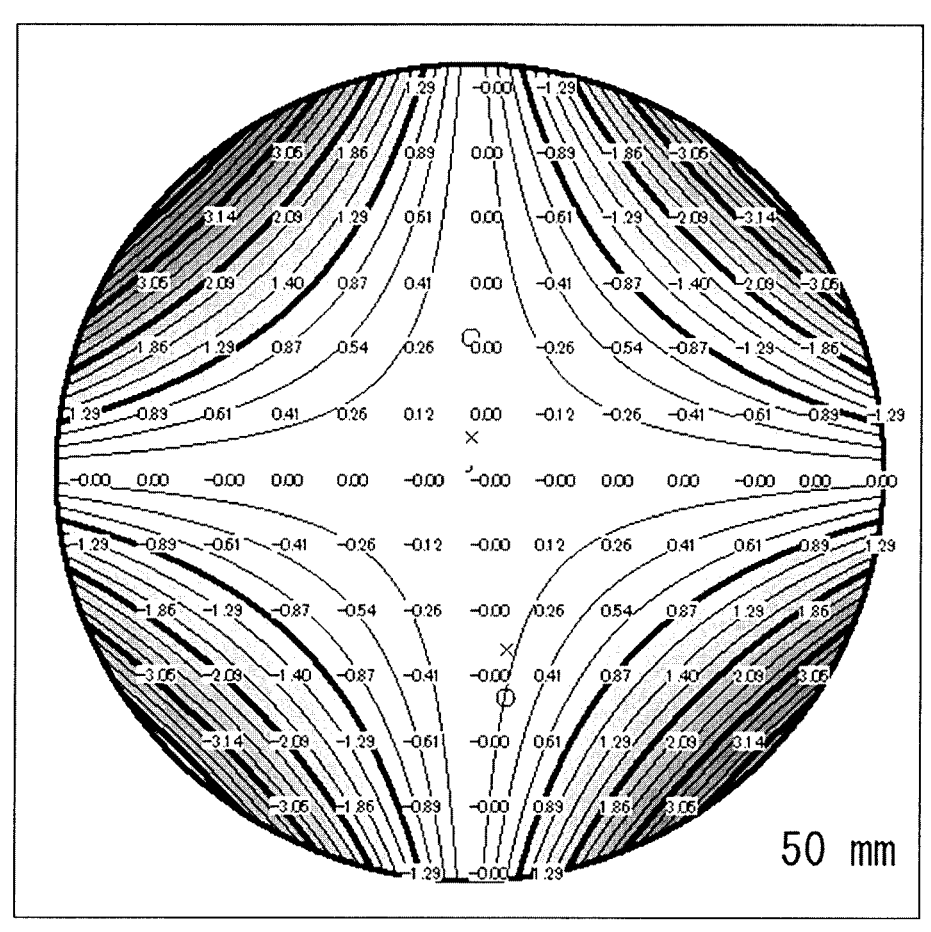
FIG. 68 is a drawing similar to FIG. 5 illustrating the spectacle lens according to Example 18 of the present invention.

The scalar quantity of the prismatic power in Example 18 is the same as that of FIG. 41 in Example 8. FIG. 67 is a drawing illustrating the distortion evaluation value $E_d$ in Example 18. FIG. 68 is a drawing illustrating the shaking evaluation value $E_s$ in Example 18.

The distortion evaluation value $E_d$ is calculated by the formula (14), and its absolute value increases corresponding to the distance from the origin O in up-down and right-left directions. This is consistent with that a wearer of the single-vision lens feels the distortion more strongly toward a periphery of the visual field.

The shaking evaluation value $E_s$ is calculated by the formula (15), and its absolute value increases corresponding to the distance from the origin O in a diagonal direction from upper right to lower left and a diagonal direction from upper left to lower right. This is consistent with that a wearer of the single-vision lens who feels the shaking easily recognizes the shaking more strongly toward a periphery of the visual field.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A method for evaluating and quantifying performance characteristics of a spectacle lens, comprising:

providing a spectacle lens to be evaluated;

arranging the spectacle lens in a measurement position corresponding to an orientation for wearing;

measuring the spectacle lens with a measurement device to produce measurement data; and providing an evaluation device including a computer having a display, an input, storage means, communications means and control means to evaluate the measurement data;

wherein the control means sequentially reads a performance evaluation program stored in the storage means, and performs a quantitative evaluation of the performance characteristics of the spectacle lens based on the measurement data obtained by the measurement device by calculating a measured change rate of a first component and a measured change rate of a second component to calculate at least one of a distortion evaluation value and a shaking evaluation value, the first component being a component in a first direction of a prism refractive index, the second component being a component in a second direction of the prism refractive index, the distortion evaluation value being a value for evaluating a distortion regarding a spectacle lens, and the shaking evaluation value being a value for evaluating a shaking regarding the spectacle lens;

wherein the control means calculates the distortion evaluation value at any point (x, y) of the spectacle lens according to formula (A) stored in the storage means, $$E_d = \frac{\partial P_h}{\partial x} + \frac{\partial P_v}{\partial y}. \tag{A}$$

wherein an X-axis is taken in a horizontal direction (nose-ear direction) as the first direction, and a Y-axis is taken in an up-down direction as the second direction when the spectacle lens is arranged in the measurement position, while $P_h$ is a horizontal prismatic power as the first component that is the prismatic power in the X-axis direction, and $P_y$ is a vertical prismatic power as the second component that is the prismatic power in the Y-axis direction;

wherein the horizontal prismatic power $P_h$ is calculated according to the following formulas, $P_x=(Ato\_x−Mae\_x)*0.1$ $Ato\_x=x+\{1000+m\_CT+CalcUrSag(x,y)\}*AtoWx$ $Mae\_x=x+\{1000+CalcOmSag(x,y)\}*MaeWx$ wherein the vertical prismatic power $P_y$ is calculated according to the following formulas, $P_y=(Ato\_y−Mae\_y)*0.1$ $Ato\_y=y+\{1000+m\_CT+CalcUrSag(x,y)\}*AtoWy$ $Mae\_y=y+\{1000+CalcOmSag(x,y)\}*MaeWy$ wherein Ato_x and Ato_y are tangents regarding the X-axis and Y-axis, respectively, with respect to an optical axis in incident locus LC3, Mae_x and Mae_y are tangents regarding the X-axis and Y-axis, respectively, with respect to an optical axis incident locus LC1, m_CT is a thickness at a center of the spectacle lens, and CalcOmSag(x,y) is an amount of sag calculated at a point (x,y) on a front surface of the spectacle lens.

2. A method for evaluating and quantifying performance characteristics of a spectacle lens comprising:

providing a spectacle lens to be evaluated;

arranging the spectacle lens in a measurement position corresponding to an orientation for wearing;

measuring the spectacle lens with a measurement device to produce measurement data; and providing an evaluation device including a computer having a display an input storage means, communications means and control means to evaluate the measurement data:

wherein the control means sequentially reads a performance evaluation program stored in the storage means, and performs a quantitative evaluation of the performance characteristics of the spectacle lens based on the measurement data obtained by the measurement device by calculating a measured change rate of a first component and a measured change rate of a second component to calculate at least one of a distortion evaluation value and a shaking evaluation value, the first component being a component in a first direction of a prism refractive index, the second component being a component in a second direction of the prism refractive index, the distortion evaluation value being a value for evaluating a distortion regarding a spectacle lens, and the shaking evaluation value being a value for evaluating a shaking regarding the spectacle lens, wherein the control means calculates the shaking evaluation value at any point (x, y) of the spectacle lens according to formula (B) stored in the storage means, $$E_s = \frac{\partial P_v}{\partial x} - \frac{\partial P_h}{\partial y} \tag{B}$$

wherein an X-axis is taken in a horizontal direction (nose-ear direction) as the first direction, and a Y-axis is taken in an up-down direction as the second direction when the spectacle lens is arranged in the measurement position, while $P_h$ is a horizontal prismatic power as the first component that is the prismatic power in the X-axis direction, and $P_v$ is a vertical prismatic power as the second component that is the prismatic power in the Y-axis direction, wherein the horizontal prismatic power Pa is calculated according to the following formulas, $P_x=(Ato\_x−Mae\_x)*0.1$ $Ato\_x=x+\{1000+m\_CT+CalcUrSag(x,y)\}*AtoWx$ $Mae\_x=x+\{1000+CalcOmSag(x,y)\}*MaeWx$ wherein the vertical prismatic power $P_y$ is calculated according to the following formulas, $P_y=(Ato\_y−Mae\_y)*0.1$ $Ato\_y=y+\{1000+m\_CT+CalcUrSag(x,y)\}*AtoWy$ $Mae\_y=y+\{1000+CalcOmSag(x,y)\}*MaeWy,$ and wherein Ato_x and Ato_y are tangents regarding the X-axis and Y-axis, respectively, with respect to an optical axis in incident locus LC3, Mae_x and Mae_y are tangents regarding the X-axis and Y-axis, respectively, with respect to an optical axis incident locus LC1, m_CT is a thickness at a center of the spectacle lens, and CalcOmSag(x,y) is an amount of sag calculated at a point (x,y) on a front surface of the spectacle lens.

3. The method for evaluating and quantifying performance characteristics of a spectacle lens according to claim 1, wherein the control means calculates the distortion evaluation value by calculating a first derivation of the prismatic power.

4. The method for evaluating and quantifying performance characteristics of a spectacle lens according to claim 1, wherein the control means calculates the shaking evaluation value by calculating a second derivation of the prismatic power.

5. A method for evaluating and quantifying performance characteristics of a spectacle lens comprising:

providing a spectacle lens to be evaluated;

arranging the spectacle lens in a measurement position corresponding to an orientation for wearing;

measuring the spectacle lens with a measurement device to produce measurement data; and providing an evaluation device including a computer having a display, an input, storage means, communications means and control means to evaluate the measurement data;

wherein the control means sequentially reads a performance evaluation program stored in the storage means, and performs a quantitative evaluation of the performance characteristics of the spectacle lens based on the measurement data obtained by the measurement device by calculating a measured change rate of a first component and a measured change rate of a second component to calculate at least one of a distortion evaluation value and a shaking evaluation value, the first component being a component in a first direction of a prism refractive index, the second component being a component in a second direction of the prism refractive index, the distortion evaluation value being a value for evaluating a distortion regarding a spectacle lens, and the shaking evaluation value being a value for evaluating a shaking regarding the spectacle lens, wherein the control means calculates the distortion evaluation value at any point (x, y) of the spectacle lens according to formula (C) stored in the storage means, $$E_d = \frac{\partial P_h}{\partial x} - \frac{\partial P_v}{\partial y} \tag{C}$$

wherein an X-axis is taken in a horizontal direction (nose-ear direction) as the first direction, and a Y-axis is taken in an up-down direction as the second direction when the spectacle lens is arranged in the measurement position, while $P_h$ is a horizontal prismatic power as the first component that is the prismatic power in the X-axis direction, and $P_v$ is a vertical prismatic power as the second component that is the prismatic power in the Y-axis direction, wherein the horizontal prismatic power Pi is calculated according to the following formulas, $P_x=(Ato\_x-Mae\_x)*0.1$ $Ato\_x=x+\{1000+m\_CT+CalcUrSag(x,y)\}*AtoWx$ $Mae\_x=x+\{1000+CalcOmSag(x,y)\}*MaeWx$ wherein the vertical prismatic power $P_h$ is calculated according to the following formulas, $P_y=(Ato\_y-Mae\_y)*0.1$ $Ato\_y=y+\{1000+m\_CT+CalcUrSag(x,y)\}*AtoWy$ $Mae\_y=y+\{1000+CalcOmSag(x,y)\}*MaeWy$, and wherein Ato_x and Ato_y are tangents regarding the X-axis and Y-axis, respectively, with respect to an optical axis in incident locus LC3, Mae_x and Mae_y are tangents regarding the X-axis and Y-axis, respectively, with respect to an optical axis incident locus LC1, m_CT is a thickness at a center of the spectacle lens, and CalcOmSag(x,y) is an amount of sag calculated at a point (x,y) on a front surface of the spectacle lens.

6. A method for evaluating and quantifying performance characteristics of a spectacle lens comprising:

providing a spectacle lens to be evaluated;

arranging the spectacle lens in a measurement position corresponding to an orientation for wearing;

measuring the spectacle lens with a measurement device to produce measurement data; and providing an evaluation device including a computer having a display, an input, storage means, communications means and control means to evaluate the measurement data;

wherein the control means sequentially reads a performance evaluation program stored in the storage means, and performs a quantitative evaluation of the performance characteristics of the spectacle lens based on the measurement data obtained by the measurement device by calculating a measured change rate of a first component and a measured change rate of a second component to calculate at least one of a distortion evaluation value and a shaking evaluation value, the first component being a component in a first direction of a prism refractive index, the second component being a component in a second direction of the prism refractive index, the distortion evaluation value being a value for evaluating a distortion regarding a spectacle lens, and the shaking evaluation value being a value for evaluating a shaking regarding the spectacle lens, wherein the control means calculates the shaking evaluation value at any point (x, y) of the spectacle lens according to formula (D) stored in the storage means, $$E_s = \frac{\partial P_v}{\partial x} + \frac{\partial P_h}{\partial y} \tag{D}$$

wherein an X-axis is taken in a horizontal direction (nose-ear direction) as the first direction, and a Y-axis is taken in an up-down direction as the second direction when the spectacle lens is arranged in the measurement position, while $P_h$ is a horizontal prismatic power as the first component that is the prismatic power in the X-axis direction, and $P_v$ is a vertical prismatic power as the second component that is the prismatic power in the Y-axis direction, wherein the horizontal prismatic power Pi is calculated according to the following formulas, $P_x=(Ato\_x-Mae\_x)*0.1$ $Ato\_x=x+\{1000+m\_CT+CalcUrSag(x,y)\}*AtoWx$ $Mae\_x=x+\{1000+CalcOmSag(x,y)\}*MaeWx$ wherein the vertical prismatic power $P_y$ is calculated according to the following formulas, $P_y=(Ato\_y-Mae\_y)*0.1$ $Ato\_y=y+\{1000+m\_CT+CalcUrSag(x,y)\}*AtoWy$ $Mae\_y=y+\{1000+CalcOmSag(x,y)\}*MaeWy$, and wherein Ato_x and Ato_y are tangents regarding the X-axis and Y-axis respectively, with respect to an optical axis in incident locus LC3, Mae_x and Mae_y are tangents regarding the X-axis and Y-axis, respectively, with respect to an optical axis incident locus LC1, m_CT is a thickness at a center of the spectacle lens, and CalcOmSag(x,y) is an amount of sag calculated at a point (x,y) on a front surface of the spectacle lens.

* * * * *